(12) United States Patent
Rofougaran et al.

(10) Patent No.: US 9,118,217 B2
(45) Date of Patent: Aug. 25, 2015

(54) PORTABLE COMPUTING DEVICE WITH WIRELESS POWER DISTRIBUTION

(75) Inventors: Ahmadreza (Reza) Rofougaran, Newport Coast, CA (US); Maryam Rofougaran, Rancho Palos Verdes, CA (US); Brima B. Ibrahim, Laguna Hills, CA (US); Hooman Darabi, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 706 days.

(21) Appl. No.: 13/336,583

(22) Filed: Dec. 23, 2011

(65) Prior Publication Data

US 2012/0091799 A1    Apr. 19, 2012

Related U.S. Application Data

(63) Continuation-in-part of application No. 12/895,547, filed on Sep. 30, 2010, now Pat. No. 8,913,951.

(60) Provisional application No. 61/551,045, filed on Oct. 25, 2011.

(51) Int. Cl.
*H01F 38/14* (2006.01)
*H02J 17/00* (2006.01)
*H02J 1/10* (2006.01)
*H02J 7/34* (2006.01)

(52) U.S. Cl.
CPC . *H02J 17/00* (2013.01); *H02J 1/10* (2013.01); *H02J 7/34* (2013.01); *Y10T 307/352* (2015.04); *Y10T 307/391* (2015.04); *Y10T 307/625* (2015.04)

(58) Field of Classification Search
CPC ....... H04B 17/0045; H04B 1/18; G01S 13/24
See application file for complete search history.

(56) References Cited

U.S. PATENT DOCUMENTS

| | | | |
|---|---|---|---|
| 6,359,897 B1* | 3/2002 | Hessel et al. ............... | 370/429 |
| 6,405,018 B1* | 6/2002 | Reudink et al. ............. | 455/20 |
| 6,539,052 B1* | 3/2003 | Hessel et al. ............... | 375/225 |
| 6,807,237 B1* | 10/2004 | Yamaguchi et al. ......... | 375/328 |
| 7,321,316 B2* | 1/2008 | Hancock et al. ........... | 340/870.02 |
| 2002/0012336 A1* | 1/2002 | Hughes et al. .............. | 370/347 |
| 2003/0031279 A1* | 2/2003 | Blount et al. ............... | 375/346 |
| 2004/0120708 A1* | 6/2004 | Hirt et al. ................... | 398/26 |
| 2005/0130588 A1* | 6/2005 | Pratt et al. .................. | 455/11.1 |
| 2008/0267142 A1* | 10/2008 | Mushkin et al. ........... | 370/338 |
| 2010/0036773 A1* | 2/2010 | Bennett ...................... | 705/67 |

(Continued)

*Primary Examiner* — Bobbak Safaipour
(74) *Attorney, Agent, or Firm* — Garlick & Markison; Kevin L. Smith

(57) ABSTRACT

A core module for a portable computing device includes a wireless power receiver module, a battery power module, a power supply module, a processing module, and an RF link interface. The wireless power receiver module, when operable, receives a wireless power transmit signal and converts it into a supply voltage. The battery power module, when operable, outputs a battery voltage. The power supply module, when operable, converts the supply voltage or the battery voltage into one or more power supply voltages. The processing module is operable to select one of the battery voltage, the supply voltage, and one of the one or more power supply voltages to produce a selected voltage. The RF link interface outputs the selected voltage on to an RF link of the portable computing device for providing power to one or more multi mode RF units within the portable computing device.

20 Claims, 72 Drawing Sheets

(56) References Cited

U.S. PATENT DOCUMENTS

| | | | |
|---|---|---|---|
| 2010/0041341 A1* | 2/2010 | Stratford | 455/67.14 |
| 2010/0202557 A1* | 8/2010 | Harris | 375/295 |
| 2011/0127952 A1* | 6/2011 | Walley et al. | 320/108 |
| 2011/0127953 A1* | 6/2011 | Walley et al. | 320/108 |
| 2011/0237182 A1* | 9/2011 | Stratford et al. | 455/7 |
| 2011/0298672 A1* | 12/2011 | Otto et al. | 343/703 |
| 2012/0082069 A1* | 4/2012 | Rofougaran et al. | 370/280 |
| 2012/0083207 A1* | 4/2012 | Rofougaran et al. | 455/41.2 |
| 2012/0083225 A1* | 4/2012 | Rofougaran et al. | 455/88 |
| 2012/0083233 A1* | 4/2012 | Rofougaran et al. | 455/269 |
| 2012/0083306 A1* | 4/2012 | Rofougaran et al. | 455/509 |
| 2012/0091799 A1* | 4/2012 | Rofougaran et al. | 307/24 |
| 2012/0155514 A1* | 6/2012 | Fruh | 375/219 |
| 2012/0309325 A1* | 12/2012 | Carbone et al. | 455/73 |
| 2014/0225560 A1* | 8/2014 | Walley et al. | 320/108 |

* cited by examiner

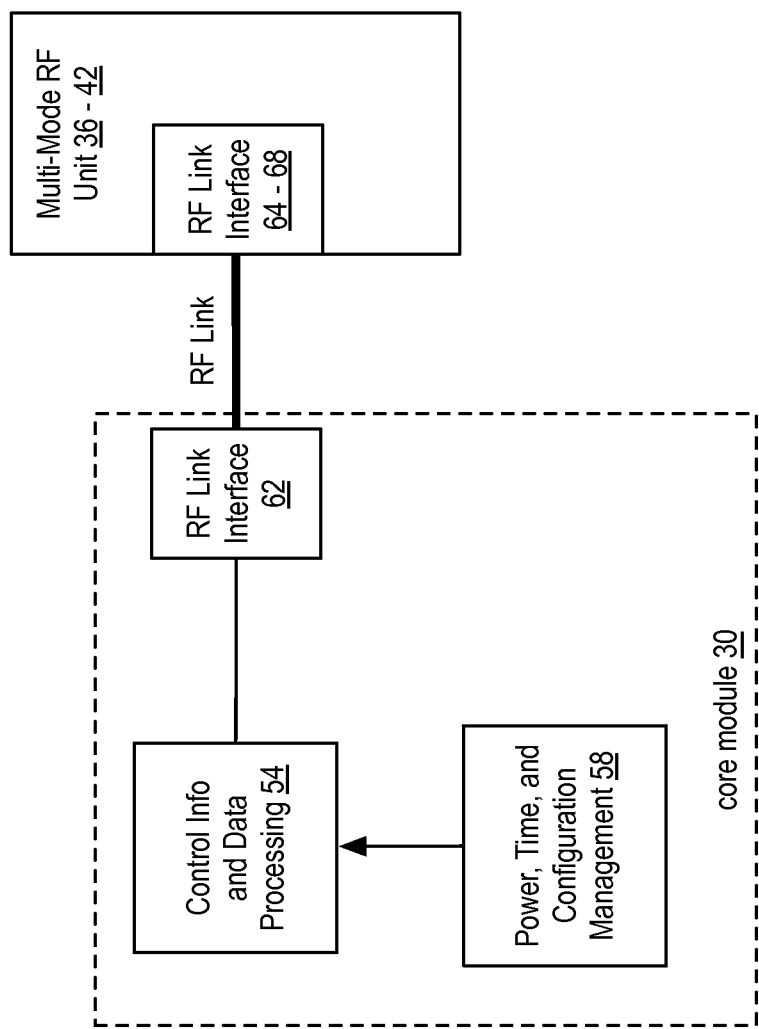

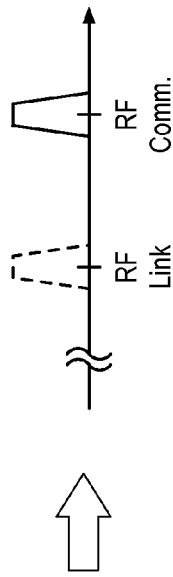
FIG. 36
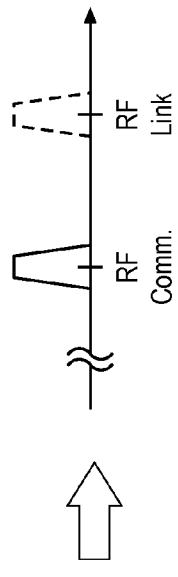
FIG. 37
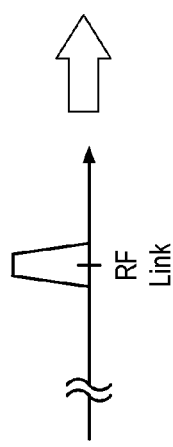
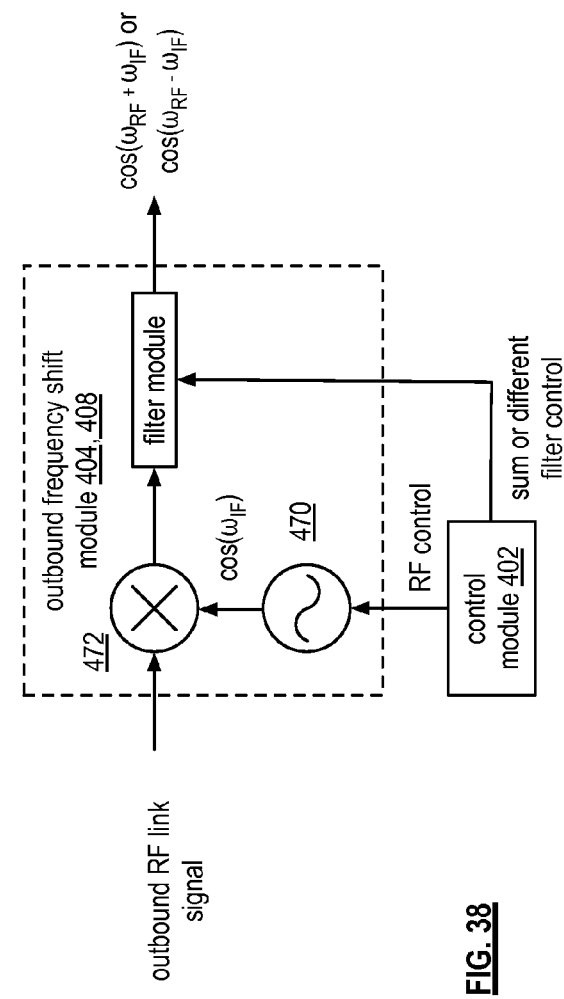
FIG. 38

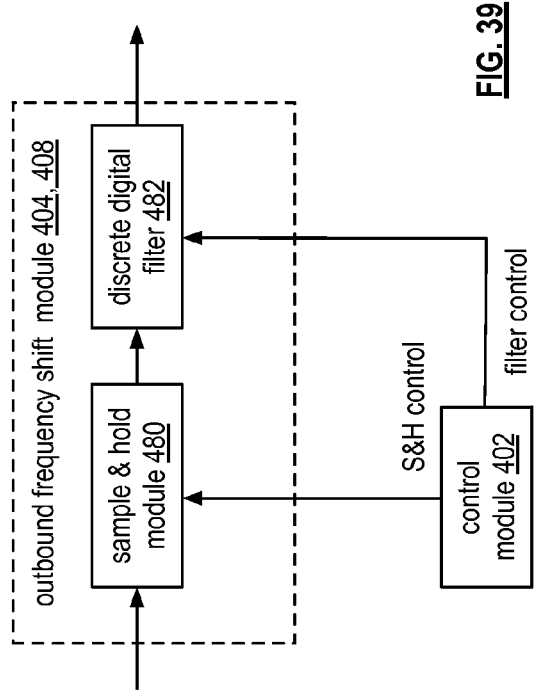
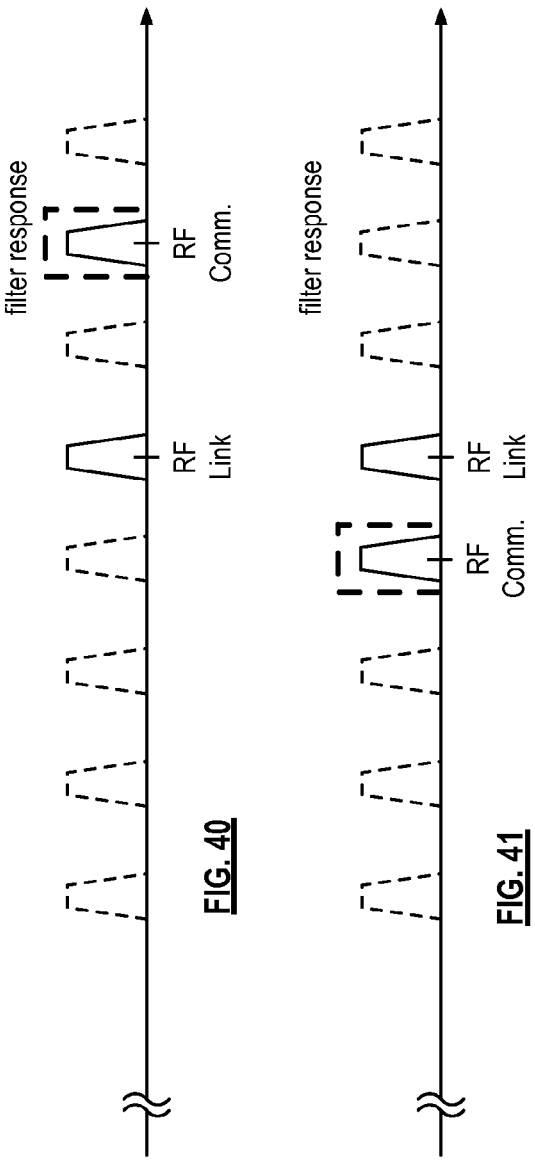
FIG. 39
FIG. 40
FIG. 41

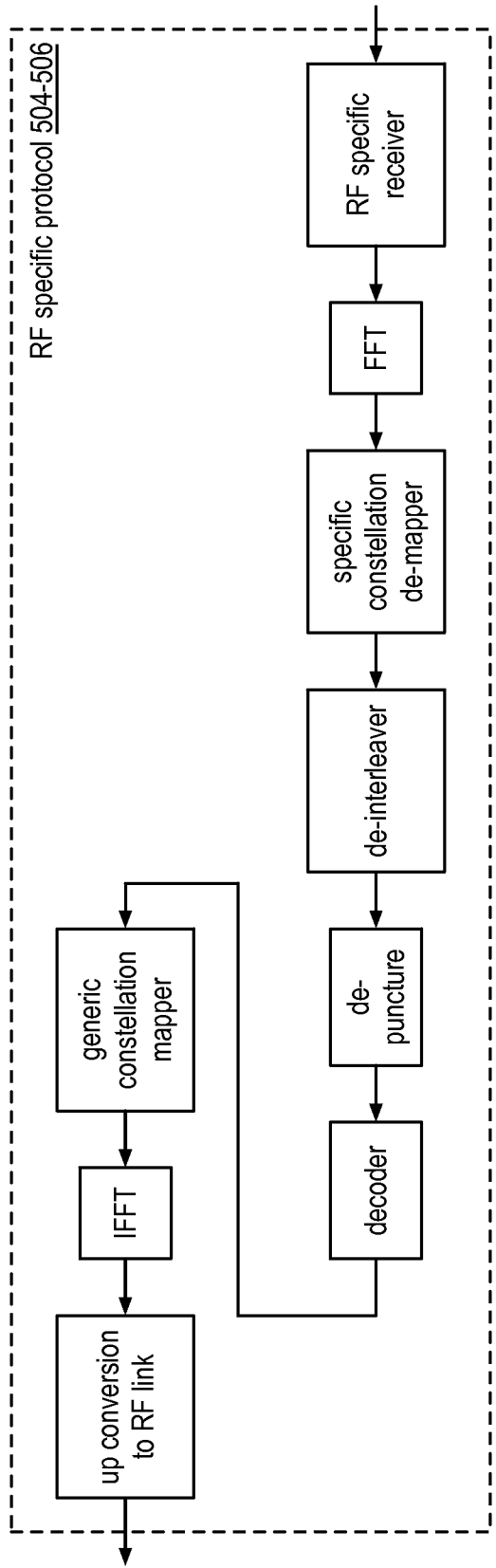
FIG. 50
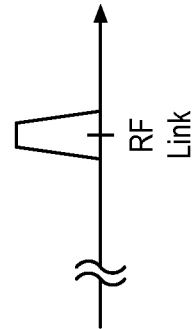
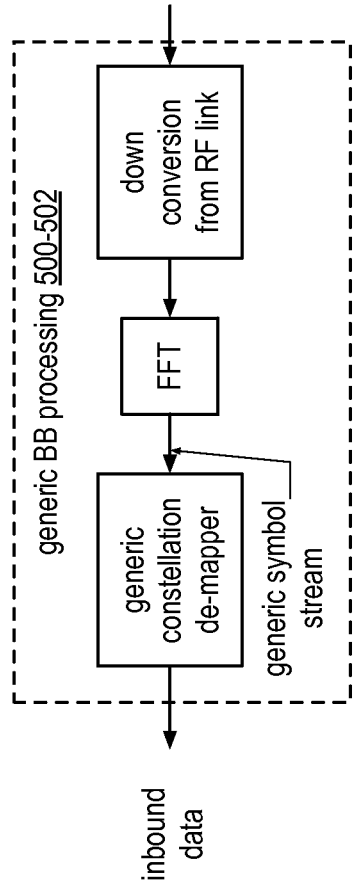
FIG. 51

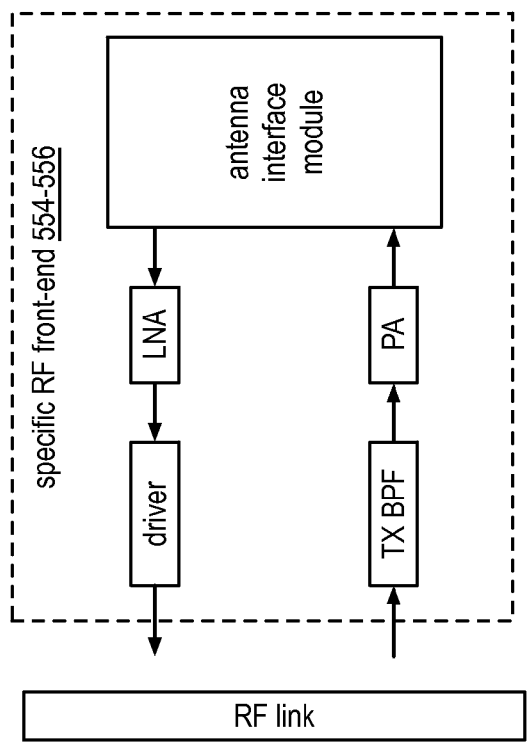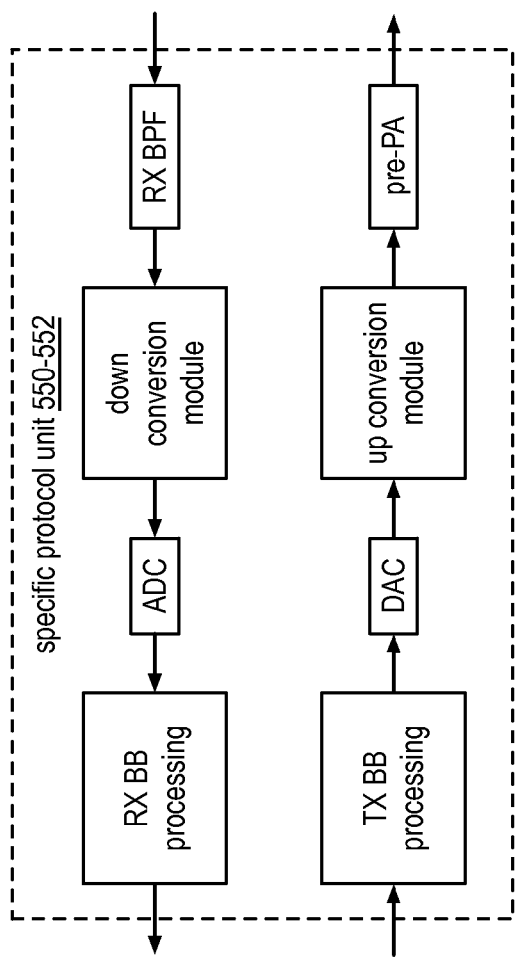
FIG. 53

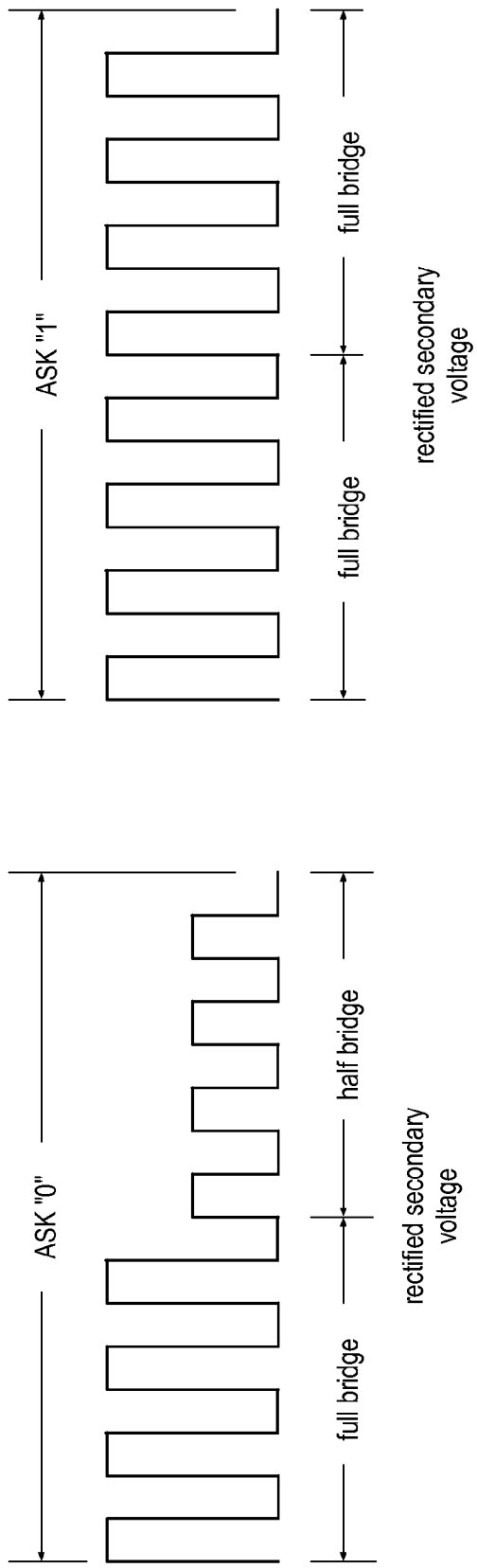
FIG. 73
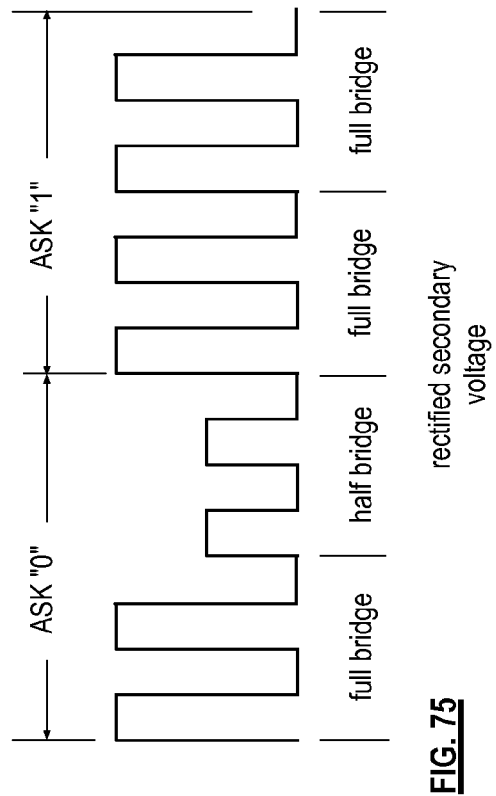
FIG. 74
FIG. 75 ded by reference herein in its entirety; and is claiming priority under 35 USC §120 as a continuation-in-part patent application of co-pending patent application entitled METHOD AND SYSTEM FOR 60 GHZ DISTRIBUTED COMMUNICATION UTILIZING A MESH NETWORK OF REPEATERS, having a filing date of Sep. 30, 2010, and a serial number of Ser. No. 12/895,547, now issued as U.S. Pat. No. 8,913,951, on Dec. 16, 2014, which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and computers and more particularly to portable computing devices.

2. Description of Related Art

Portable computing devices include laptop computers, tablet computers, cellular telephones, video gaming devices, audio/video recording and playback devices, etc. In general, a portable computing device includes a central processing unit (CPU), an operating system, one or more user inputs (e.g., keyboard, mouse, microphone), one or more user output (e.g., display, speakers), memory, a network card (e.g., Ethernet and/or wireless local area network), and a battery.

In particular, a tablet computer includes a flat touch screen, a CPU, an operating system, a WLAN transceiver, a cellular data transceiver, a Bluetooth transceiver, a global positioning satellite (GPS) receiver, memory (e.g., solid state memory), connectors, and a rechargeable battery (e.g., lithium polymer). The flat touch screen includes capacitive touch screen technology to provide a virtual keyboard, a passive stylus pen (e.g., one touch selection based on X-Y coordinates of the touch), two-dimensional touch commands (e.g., sensing touch of the screen by one or more fingers and detecting movement in the X-Y dimensions of the one or more fingers), and provides the display.

The connectors connect the tablet computer to a power source to recharge the battery, to exchange data (e.g., audio files, video files, etc.) with another computing device (e.g., a personal computer (PC)), and/or to update software. In addition or in the alternative, the WLAN transceiver or the data cellular transceiver may be used to update the tablet computer's software. Further, the Bluetooth transceiver may be used to exchange data with another computing device.

BRIEF DESCRIPTION OF THE SEVERAL VIEWS OF THE DRAWING(S)

FIG. 19 is a schematic block diagram of an embodiment of a portion of a portable computing device in accordance with the present invention;

FIG. 36 is a diagram of an example of an up frequency shift from an RF link of a portable computing device in accordance with the present invention;

FIG. 37 is a diagram of an example of a down frequency shift from an RF link of a portable computing device in accordance with the present invention;

FIG. 38 is a schematic block diagram of an embodiment of an outbound frequency shift module in accordance with the present invention;

FIG. 39 is a schematic block diagram of another embodiment of an outbound frequency shift module in accordance with the present invention;

FIG. 40 is a diagram of another example of an up frequency shift from an RF link of a portable computing device in accordance with the present invention;

FIG. 41 is a diagram of another example of a down frequency shift from an RF link of a portable computing device in accordance with the present invention;

FIG. 50 is a schematic block diagram of an embodiment of a receive path RF specific protocol unit within an MM RF unit in accordance with the present invention;

FIG. 51 is a schematic block diagram of an embodiment of a receive path generic baseband core module in accordance with the present invention;

FIG. 53 is a schematic block diagram of another embodiment of a baseband specific protocol unit and a specific RF front-end in accordance with the present invention;

FIG. 73 is a diagram of an example of decoding a rectified secondary winding waveform within an MM RF unit in accordance with the present invention;

FIG. 74 is a diagram of another example of decoding a rectified secondary winding waveform within an MM RF unit in accordance with the present invention;

FIG. 75 is a diagram of another example of decoding a rectified secondary winding waveform within an MM RF unit in accordance with the present invention;

DETAILED DESCRIPTION OF THE INVENTION

Figure 1:
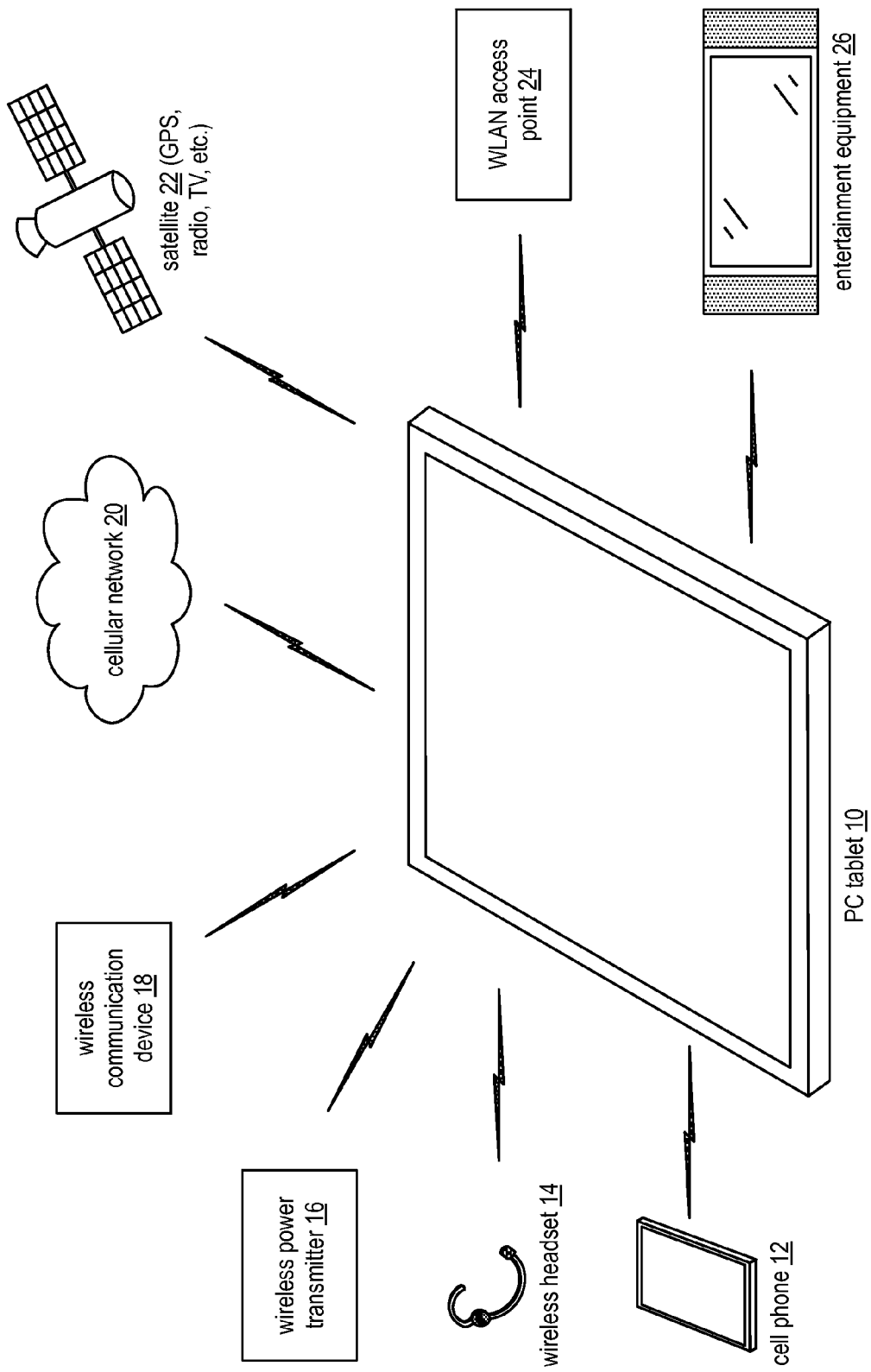
FIG. 1 is a schematic block diagram of an embodiment of a portable computing device in a communication environment in accordance with the present invention.

FIG. 1 is a schematic block diagram of an embodiment of a portable computing device 10 in a communication environment. The portable computing device 10 (e.g., a laptop computer, a tablet computer, a cellular telephone, a video gaming device, an audio/video recording and playback device, etc.) may communicate concurrently, or separately, with one or more of a cellular telephone 12, a wireless headset 14, a wireless power transmitter 16, a wireless communication device 18 (e.g., a tablet computer, a keyboard, a projector, a home appliance, a printer, a personal computer, a laptop computer, etc.), a cellular network 20 (voice and/or data), a satellite network 22 (e.g., GPS, satellite radio, satellite television, satellite telephone, etc.), a WLAN access point, 24 and/or entertainment equipment 26.

Figure 2:
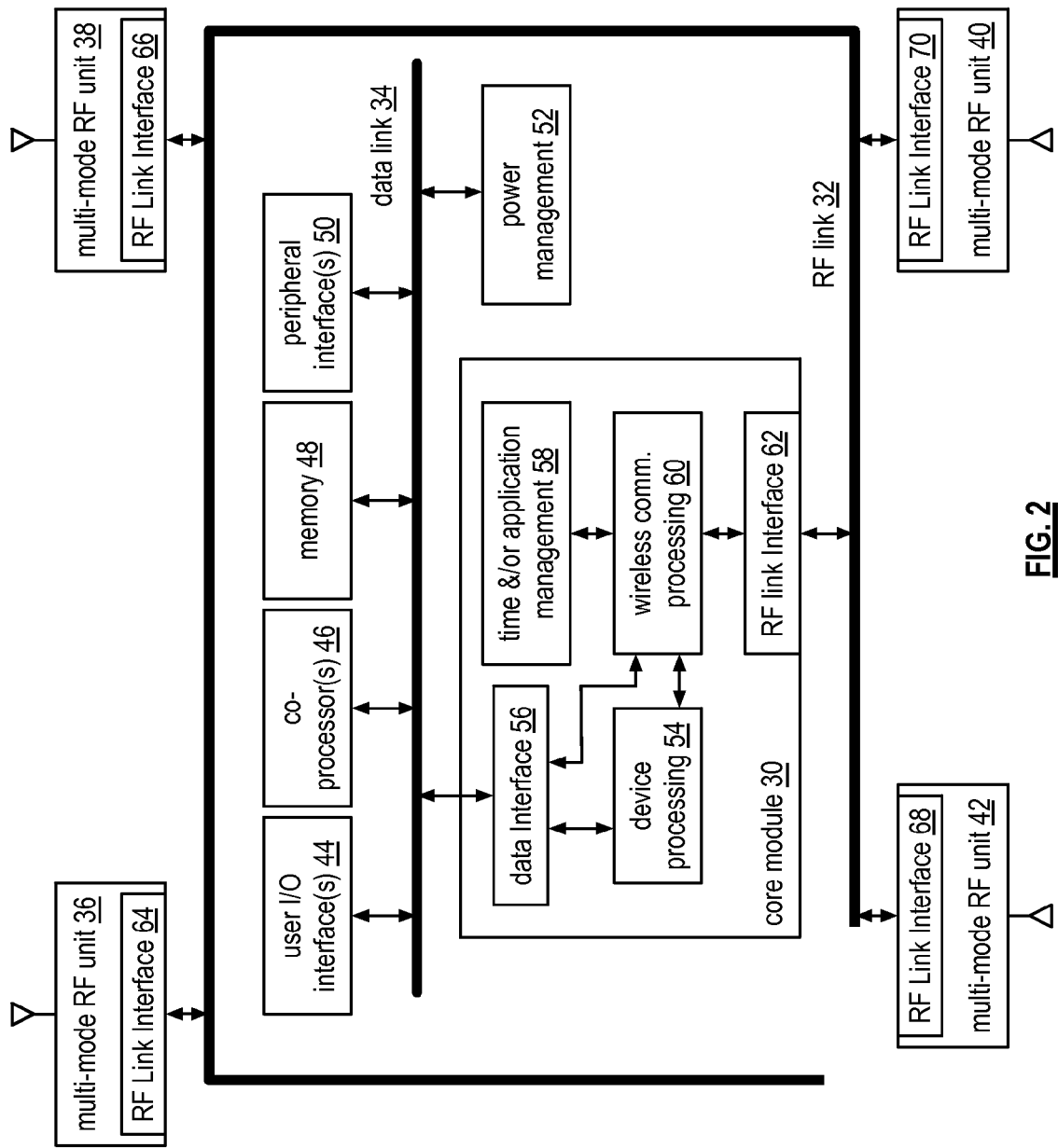
FIG. 2 is a schematic block diagram of an embodiment of a portable computing device in accordance with the present invention.

FIG. 2 is a schematic block diagram of an embodiment of a portable computing device that includes a core module 30, a radio frequency (RF) link 32, a data link 34, a plurality of multi-mode RF units 36-42, a power management module 52, one or more user I/O interfaces 44 (e.g., one or more of a flat screen touch panel, a microphone, speakers, etc.), one or more co-processors 46, memory 48 (e.g., cache memory, main memory, solid state memory, etc.), and more one or more peripheral device interfaces 50 (e.g., USB, headset jack, etc). The core module 30 includes one or more of an RF link interfaces 62, a data link interface 56, a device processing module 54, a wireless communication processing module 60, and a time and/or application management module 58. Each of the multimode RF units 36-42 includes an RF link interface 64-70 and one or more radio transceivers, or portions thereof. The one or more transceivers, or portions thereof, may support one or more wireless communication standards such as Bluetooth, IEEE 802.11 (WLAN), 60 GHz, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), extensions thereof, and/or variations thereof.

The data link 34 may include one or more of a twisted-pair, coaxial cable, a bus structure, fiber optics, etc. For example, if the data link includes one or more twisted pairs, communication via the twisted pair(s) would be in accordance with one or more twisted pair signaling protocols (e.g., Cat 5 (10Base-TX & 100Base-T), Cat 5e (10Base-TX & 100Base-T), Cat 6a (10 GBase-T), EIA-485, secure transfer protocol, 1.430, Controller Area Network, Sony/Philips Digital Interconnect Format, etc.). As another example, if the data link includes one or more bus structures (e.g., an address bus, a control bus, and/or a data bus), communication via the bus structure would be in accordance with one or more computer type bus protocols (e.g., universal serial bus, peripheral component interconnect (PCI), PCI express, FireWire, S.-100 bus, Unibus, VAXBI, MBus, STD Bus, SMBUS, Q-Bus, ISA, Zorro, CAMAC, FASTBUS, LPC, Precision Bus, EISA, VME, VIX, NuBus, TURBOchannel, MCA, SBus, VLB, PXI, GSC bus, CoreConnect, InifiBand, UPA, PCI-X, AGP, QuickPath, HyperTransport, PC Card, ExpressCard, ST-506, ESDI, SMD, Parallel ATA, DMA, SSA, HIPPI, MSC, Serial ATA, SCSI, SCSI parallel, SCSI Serial, Fibre channel, iSCSI, ATAoE, MIDI, MultiBus, RS-232, DMX512-A, IEEE-488, EIA/RS-422, IEEE-1284, UNI/O, ACCESS.bus, 1-Wire, $I^2C$, SPI, etc.).

Each of the devices 44-50 coupled to the data link includes a data link interface. The data link interface performs the corresponding protocol conversion for accessing the data link. Note that each of the devices coupled to the data link may include the same data link interfaces or different data link interfaces. For example, the memory may include a different type of data link interface than a user input or output device.

The RF link 32 may include one or more of a coaxial cable, a fiber optics cable, a wireless channel, a waveguide, etc. Each device that couples to the RF link includes an RF link interface that performs one or more RF link protocol conversions as disclosed herein.

The device processing module 54 includes one more processing modules and performs a variety of functions. For example, the device processing module performs various user applications and system level applications of the portable computing device. In particular, the data processing module performs user applications such as a word processing application, a spreadsheet application, a contacts and calendar application, a plurality of games, one more web browsers, e-mail, a system set-up application, a file sharing application, etc. In performing these user applications, the data processing module may shift one or more sub-functions to one or more of the coprocessors for execution therein. As another particular, example, the data processing module also performs system level applications such as the operating system.

The time &/or application management 58 includes one more processing modules and performs a variety of functions to manage the resources of the portable computing device (e.g., the device processing module, the wireless communication processing module, the RF link, and the MM RF units). For example, the time and/or application management module monitors the various applications being executed and the corresponding needs for wireless communications. Based on these factors, the time and/or application management module balances the resources of the portable communication device with the current active applications and power consumption to optimize performance.

The wireless communication processing module 60 includes one more processing modules and performs a variety of communication related functions. For example, when the device processing module is performing an application that requires a wireless communication, the wireless communication processing module processes the corresponding data in accordance with one or more communication protocols (e.g., Bluetooth, IEEE 802.11, cellular data, cellular voice, 60 GHz, etc.). The wireless communication processing module places the process communication data on the RF link for subsequent transmission by one or more of the multimode RF units.

For incoming communication data, one or more of the multimode RF units receives a wireless signal and converts it into an inbound signal in accordance with the RF link protocol. The wireless communication processing module receives the inbound signal from the RF link and performs the corresponding receive a portion of the appropriate communication protocol to extract the inbound data. Various embodiments and examples of the wireless communication processing module, the RF link, and the multimode RF units are described in one or more of the remaining figures.

Figure 3:
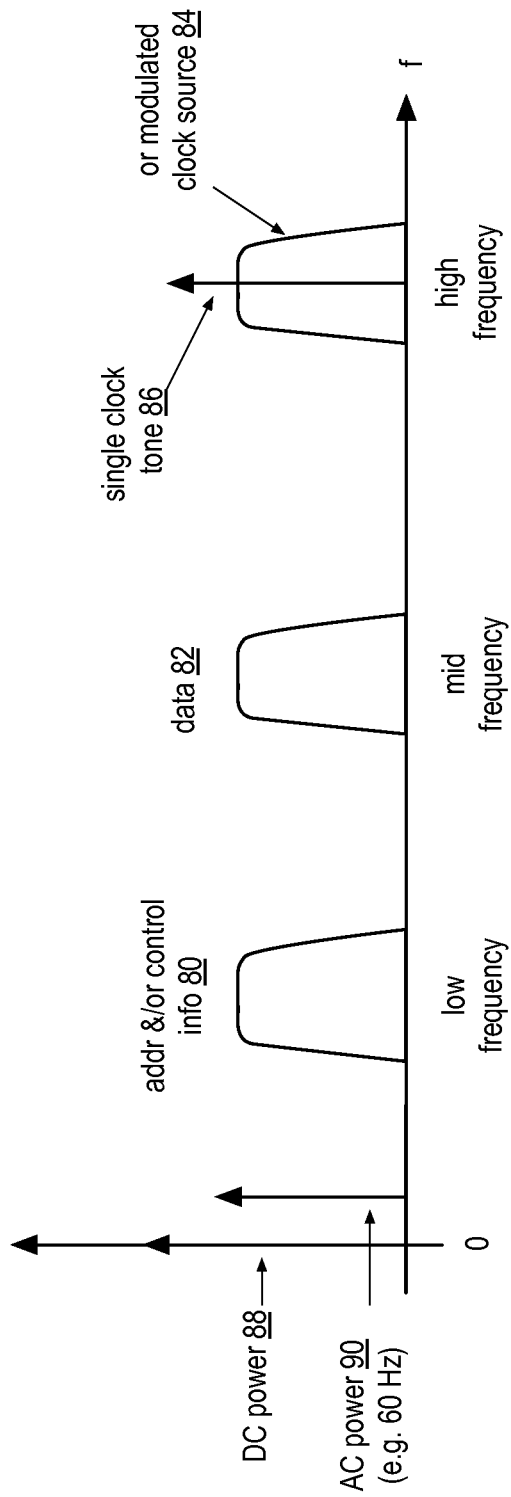
FIG. 3 is a diagram of an example of frequency band allocation within a portable computing device in accordance with the present invention.

FIG. 3 is a diagram of an example of frequency band allocation of the RF link within a portable computing device. In this example, the frequency spectrum of the RF link is divided into three frequency bands: one for address and/or control information 80, a second for data 82, and a third for clock signals 84. In addition, power may be communicated via the RF link to the multimode RF units at DC 88 or at a low AC frequency 90 (e.g., 60 Hz). Each of the frequency bands may be divided into a plurality of channels and may utilize one or more of a variety of multiplexing access protocols (e.g., time division multiple access, frequency division multiple access, code division multiple access (CDMA), orthogonal frequency division multiplexing, etc.) to carry data.

In this example, a low-frequency band (e.g., hundreds of kilohertz to hundreds of megahertz) is used for conveying address and/or control information. A mid frequency band (e.g., hundreds of megahertz to tens of gigahertz) is used for conveying data (e.g., voice, text, audio files, video files, graphics, etc.). A high-frequency band (e.g., ten gigahertz to hundreds of gigahertz) is used to carry a clock tone or a modulated clock signal. As a specific example, when the wireless communication processing module and one or more of the multimode RF units have control and/or address information to exchange, they do so via the frequency band allocated to such communications. As another specific example, when the wireless communication processing module and one or more of the multimode RF units have data to exchange, they do so via the frequency band allocated to a data communications. As yet another specific example, the wireless communication processing module generates a clock tone and/or a modulated clock signal and transmits it via the RF link to the multimode RF units using the frequency band allocated to the clock. Each of the multimode RF units utilizes the clock tone or modulated clock signal to generate one or more clocks for use therein.

Figure 4:
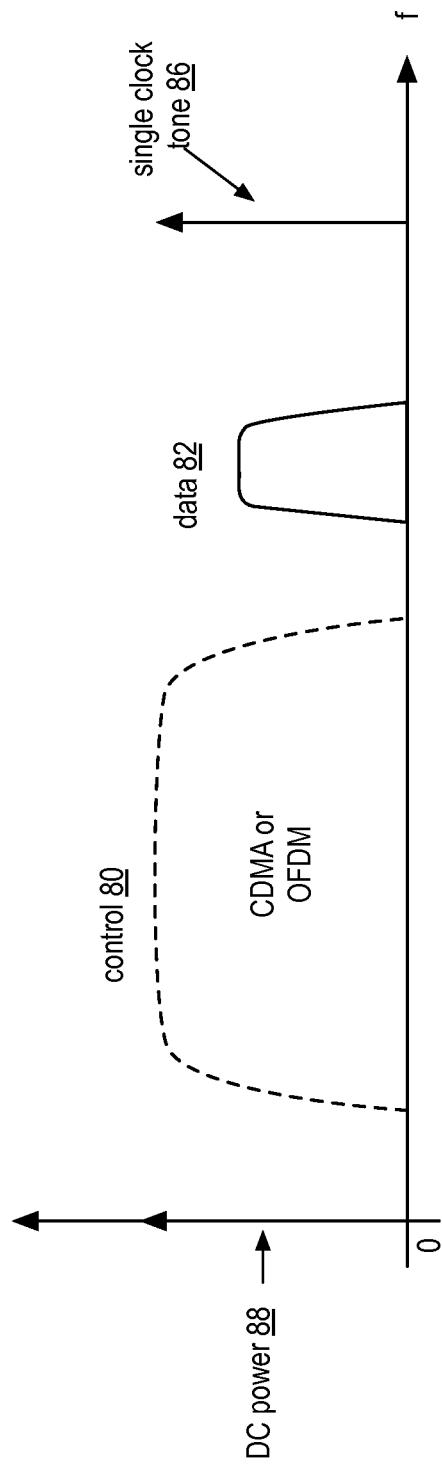
FIG. 4 is a diagram of another example of frequency band allocation within a portable computing device in accordance with the present invention.

FIG. 4 is a diagram of another example of frequency band allocation of the RF link within a portable computing device. In this example, the frequency spectrum of the RF link is divided into three frequency bands: one for address and/or control information 80, a second for data 82, and a third for clock signals 86. In addition, power 88 may be communicated via the RF link to the multimode RF units at DC. In this example, the control information frequency band utilizes CDMA to support multiple concurrent, or overlapping, control information communications. Note that each MM RF unit may have its own code for accessing the control information frequency band. In the alternative, a code may be assigned to an MM RF unit when it is involved in a control information communication.

Figure 5:
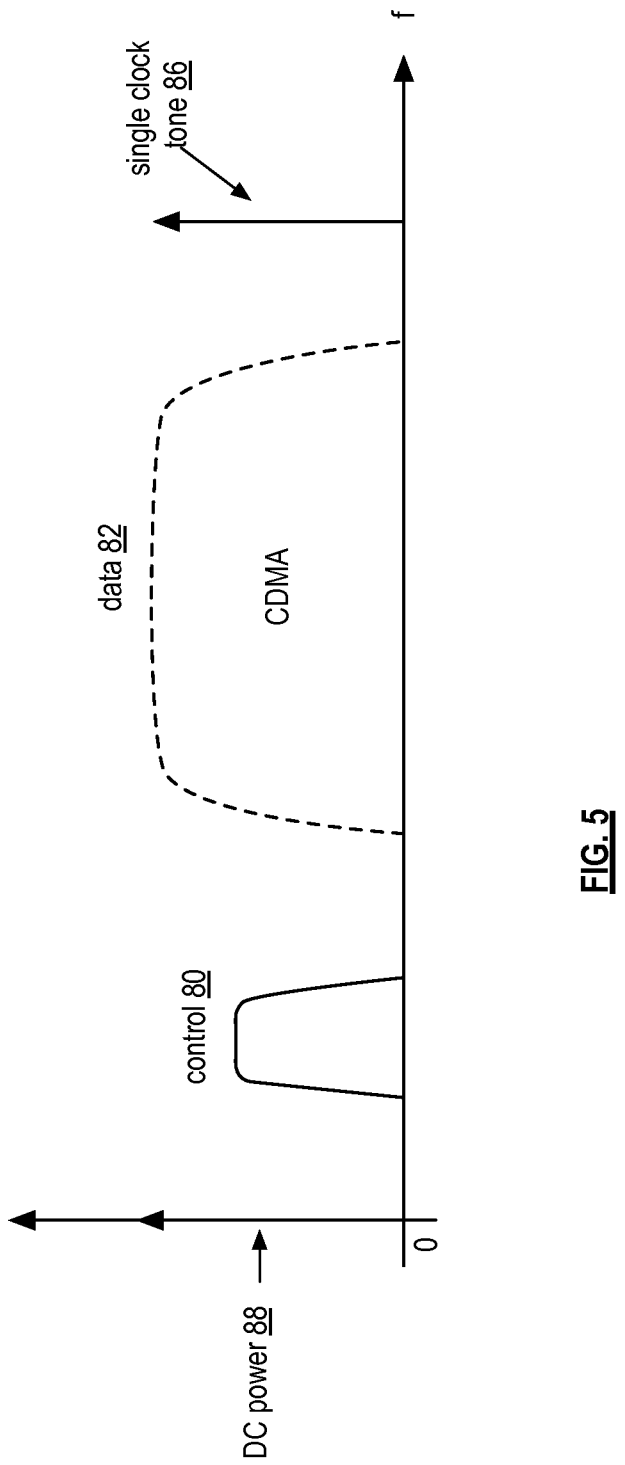
FIG. 5 is a diagram of another example of frequency band allocation within a portable computing device in accordance with the present invention.

FIG. 5 is a diagram of another example of frequency band allocation of the RF link within a portable computing device. In this example, the frequency spectrum of the RF link is divided into three frequency bands: one for address and/or control information 80, a second for data 82, and a third for clock signals 86. In addition, power may be communicated via the RF link to the multimode RF units at DC. In this example, the data frequency band utilizes CDMA to support multiple concurrent, or overlapping, data communications. Note that each MM RF unit may have its own code for accessing the control information frequency band. In the alternative, a code may be assigned to an MM RF unit when it is involved in a control information communication.

Figure 6:
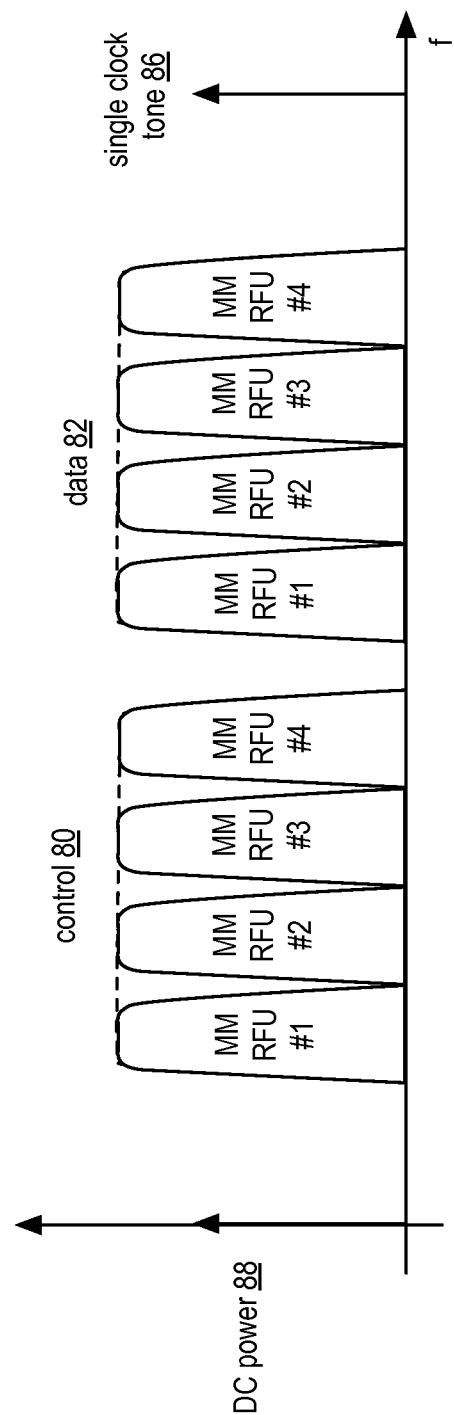
FIG. 6 is a diagram of another example of frequency band allocation within a portable computing device in accordance with the present invention.

FIG. 6 is a diagram of another example of frequency band allocation of the RF link within a portable computing device. In this example, each of the control information frequency band 80 and data frequency band 82 are divided into a plurality of channels. Each channel within each frequency band is assigned to a particular multimode RF unit. For example, multimode RF unit number one is allocated a first channel (or multiple channels) within the control information frequency band and is also allocated one or more channels within the data frequency band.

A channel within a given frequency band may be assigned for transmitting data from the core module to the assigned multimode RF unit; it may be assigned for transmitting data from the assigned multimode RF unit to the core module; or it may be shared for transceiving data between the core module and the assign multimode RF unit. Note that the allocation of a channel to a particular multi-mode RF unit may be a static allocation and/or a dynamic allocation. For example, a multimode RF unit may have a static allocation of one or more channels within the control information frequency band and may be dynamically allocated one or more channels within the data frequency band. In the latter case, a multi-mode RF unit may be allocated one or more channels for each communication of data that it is supporting.

Figure 7:
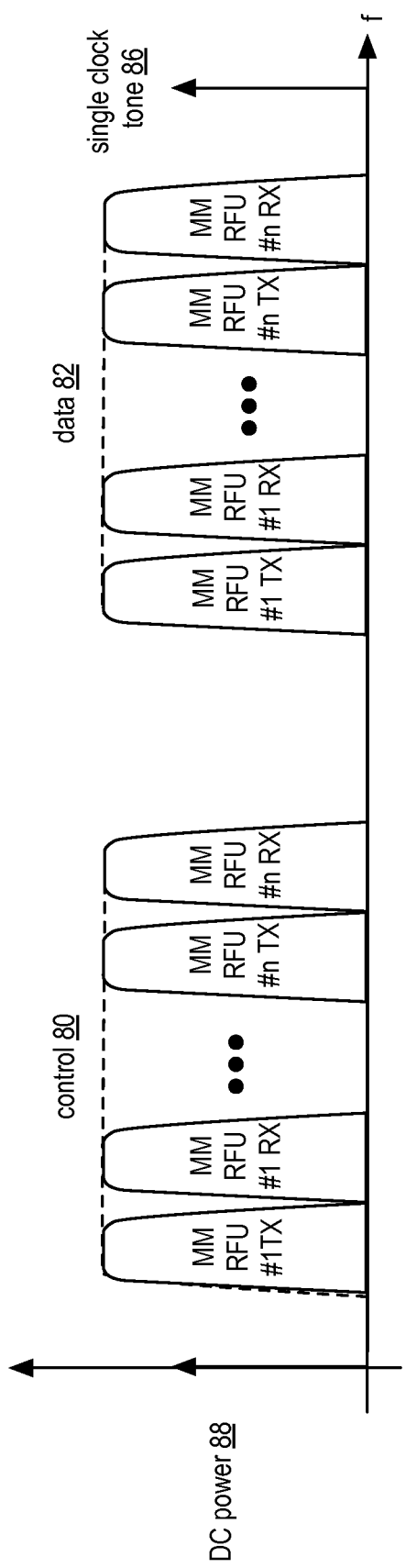
FIG. 7 is a diagram of another example of frequency band allocation within a portable computing device in accordance with the present invention.

FIG. 7 is a diagram of another example of frequency band allocation of the RF link within a portable computing device. In this example, each of the control information frequency band 80 and data frequency band 82 are divided into a plurality of channels. Each channel within each frequency band is assigned to a particular multimode RF unit for transmitting or receiving. For example, multimode RF unit number one is allocated a transmit channel (or multiple channels) and a receive channel(s) within the control information frequency band and is also allocated one or more transmit channels and one or more receive channels within the data frequency band.

The allocation of a channel to a particular multi-mode RF unit may be a static allocation and/or a dynamic allocation. For example, a multi-mode RF unit may have a static allocation of one or more transmit and receive channels within the control information frequency band and may be dynamically allocated one or more transmit and receive channels within the data frequency band. In the latter case, a multi-mode RF unit may be allocated one or more transmit and receive channels for each communication of data that it is supporting.

Figure 8:
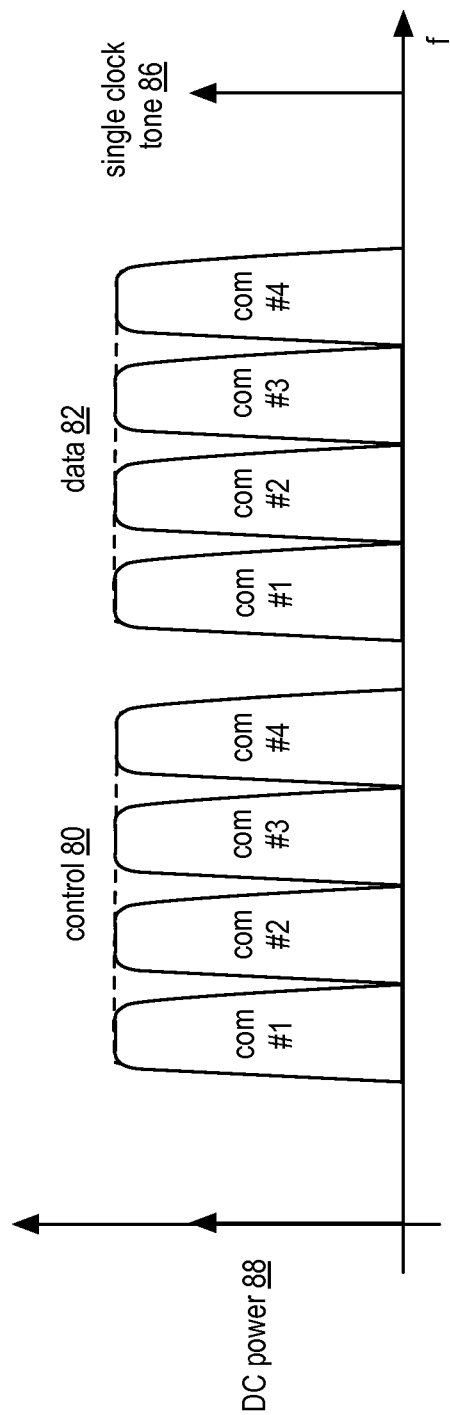
FIG. 8 is a diagram of another example of frequency band allocation within a portable computing device in accordance with the present invention.

FIG. 8 is a diagram of another example of frequency band allocation of the RF link within a portable computing device. In this example, each of the control information frequency band 80 and data frequency band 82 are divided into a plurality of channels. Each channel within each frequency band is assigned to a particular communication between the core module and one or more multimode RF units. For example, a first communication is allocated a first channel (or multiple channels) within the control information frequency band and is also allocated one or more channels within the data frequency band.

A channel within a given frequency band may be assigned for transmitting data from the core module to the one or more multimode RF units; it may be assigned for transmitting data from the one or more multimode RF units to the core module; or it may be shared for transceiving data between the core module and the one or more multimode RF units. Allocation of a channel to a particular communication may be a static allocation and/or a dynamic allocation. For example, a particular type of communication (e.g., WLAN access, cellular voice, cellular data, Bluetooth, 60 GHz) may have a static allocation of one or more channels within the control information frequency band and may be dynamically allocated one or more channels within the data frequency band. In the latter case, a communication may be allocated one or more channels for each MM RF unit that is supporting the communication.

Figure 9:
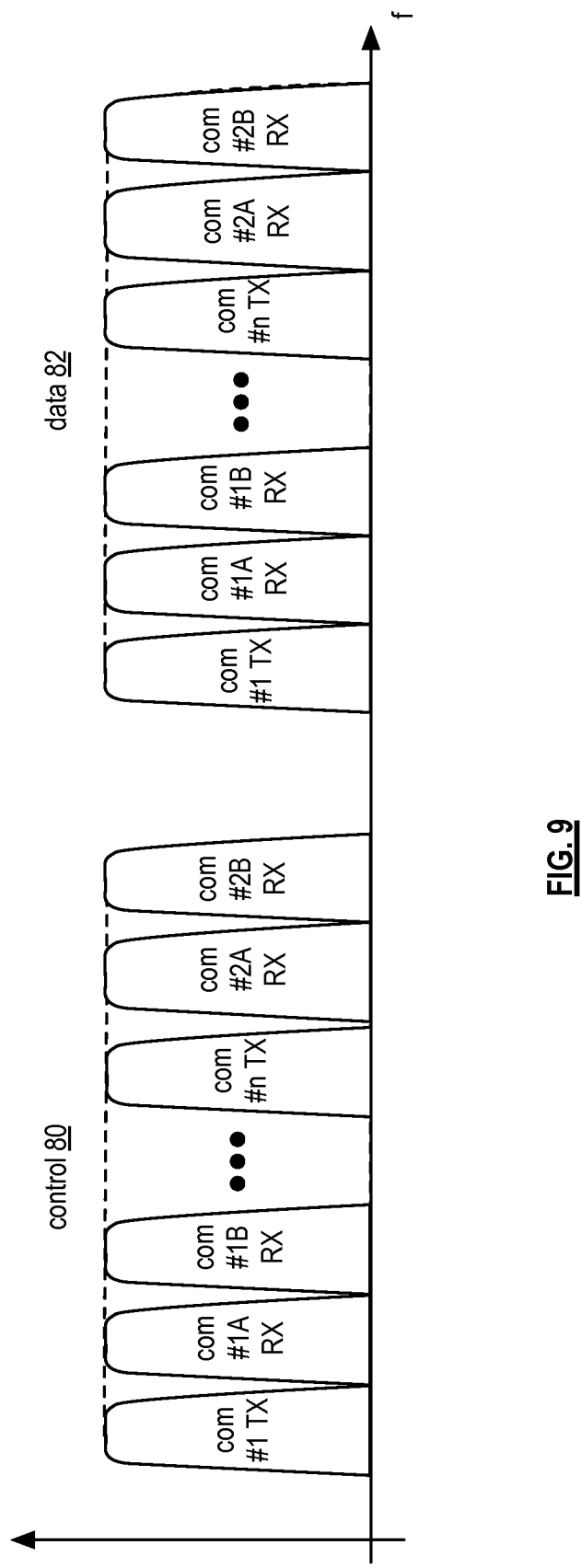
FIG. 9 is a diagram of another example of frequency band allocation within a portable computing device in accordance with the present invention.

FIG. 9 is a diagram of another example of frequency band allocation of the RF link within a portable computing device. In this example, each of the control information frequency band 80 and data frequency band 82 are divided into a plurality of channels. Each channel within each frequency band is assigned to a particular communication for transmitting or receiving. For example, a first communication is allocated a transmit channel (or multiple channels) and a receive channel(s) within the control information frequency band and is also allocated one or more transmit channels and one or more receive channels within the data frequency band.

The allocation of a channel to a particular communication may be a static allocation and/or a dynamic allocation. For example, a particular type of communication may have a static allocation of one or more transmit and receive channels within the control information frequency band and may be dynamically allocated one or more transmit and receive channels within the data frequency band. In the latter case, a communication may be allocated one or more transmit and receive channels for each MM RF unit that is supporting the communication.

Figure 10:
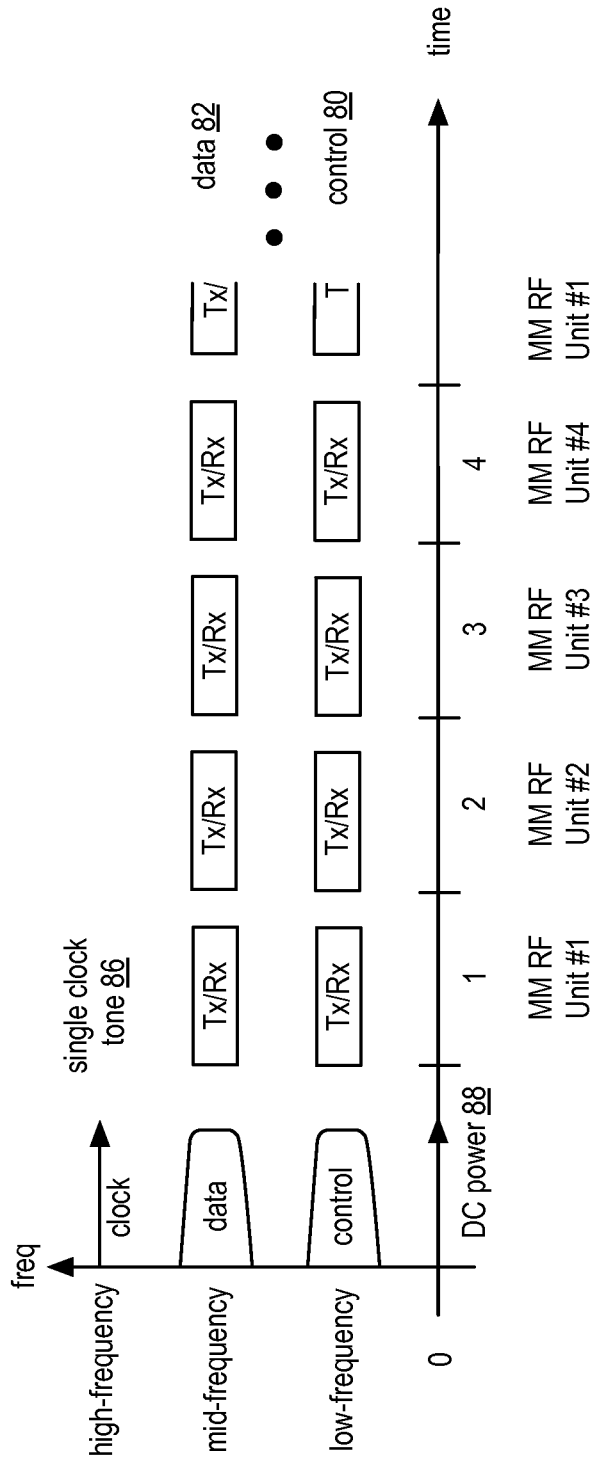
FIG. 10 is a diagram of another example of frequency band allocation within a portable computing device in accordance with the present invention.

FIG. 10 is a diagram of another example of frequency band allocation of the RF link within a portable computing device. In this example, the control information frequency band 80 and the data frequency band 82 are each time shared. For instance, a multimode RF unit is granted access to a frequency band for a given duration (e.g., a timeslot). In a specific example, each multimode RF unit is granted an equal number of timeslots and each time slot is of substantially the same duration. In another specific embodiment, the timeslot durations may be of different lengths and each multimode RF unit may have a different number of timeslot allocated to it. In yet another example, the timeslot duration in the control frequency band may be of a different duration than a timeslot within the data frequency band. As yet another specific example, the allocation of time slots may be dynamically allocated to support communications between an MM RF unit and the core module.

Figure 11:
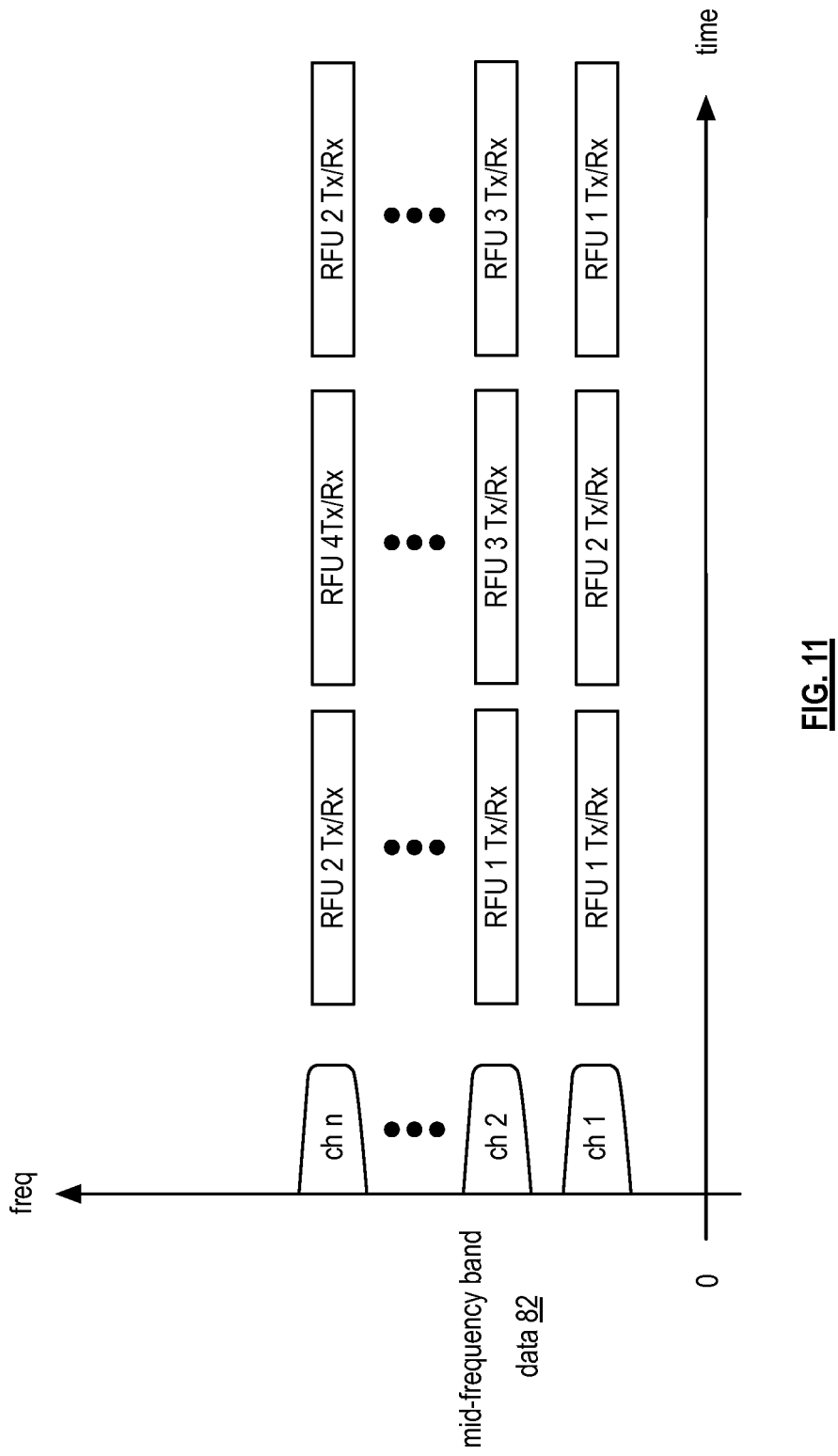
FIG. 11 is a diagram of another example of frequency band allocation within a portable computing device in accordance with the present invention.

FIG. 11 is a diagram of another example of frequency band allocation of the RF link within a portable computing device. In this example, the data frequency band 82 is divided into a plurality of channels (e.g., ch. 1 through ch. n). One or more of the multimode RF units shares each channel. For example, RF unit #1 and RF unit #2 share channel one. As another example, RF units #1 and #3 share the second channel. Accordingly, the data frequency band is frequency multiplexed and time multiplex to support the various data communications between the multimode RF units and the core module.

Figure 12:
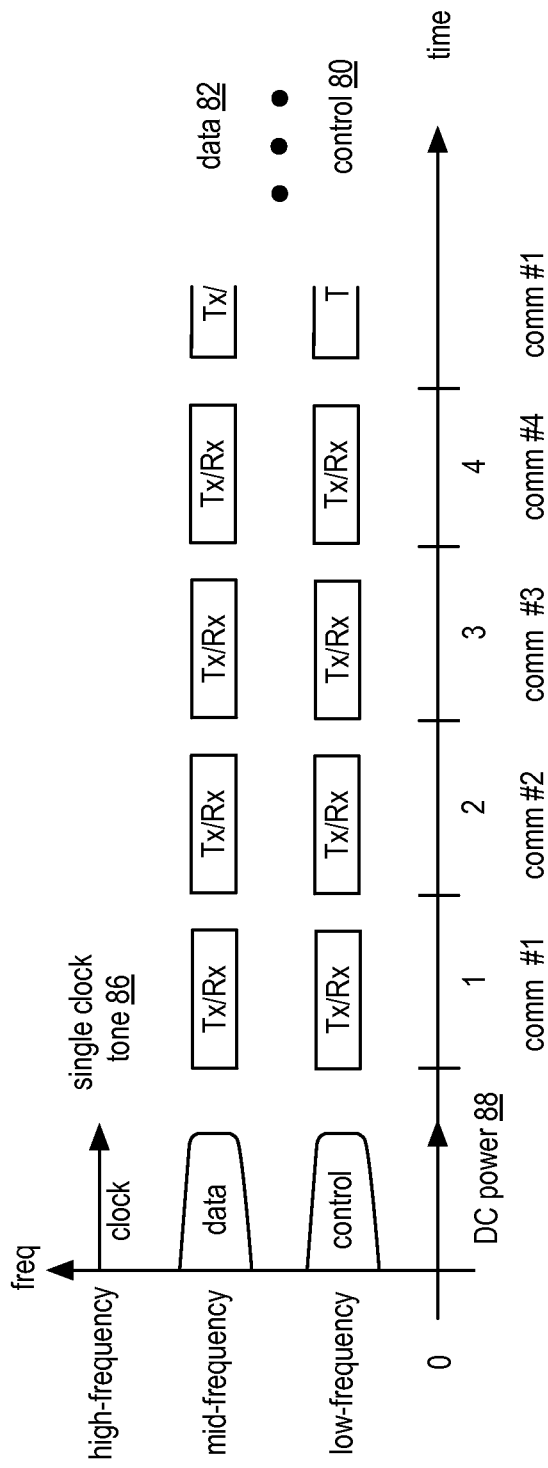
FIG. 12 is a diagram of another example of frequency band allocation within a portable computing device in accordance with the present invention.

FIG. 12 is a diagram of another example of frequency band allocation of the RF link within a portable computing device. In this example, the control information frequency band 80 and the data frequency band 82 are each time shared. For instance, a communication is allocated to a frequency band for a given duration (e.g., a timeslot). In a specific example, each communication (active or idle) is granted an equal number of timeslots and each time slot is of substantially the same duration. In another specific embodiment, the timeslot durations may be of different lengths and each communication may have a different number of timeslot allocated to it. In yet another example, the timeslot duration in the control frequency band may be of a different duration than a timeslot within the data frequency band. As yet another specific example, the allocation of time slots may be dynamically allocated to support the communications between an MM RF unit and the core module.

Figure 13:
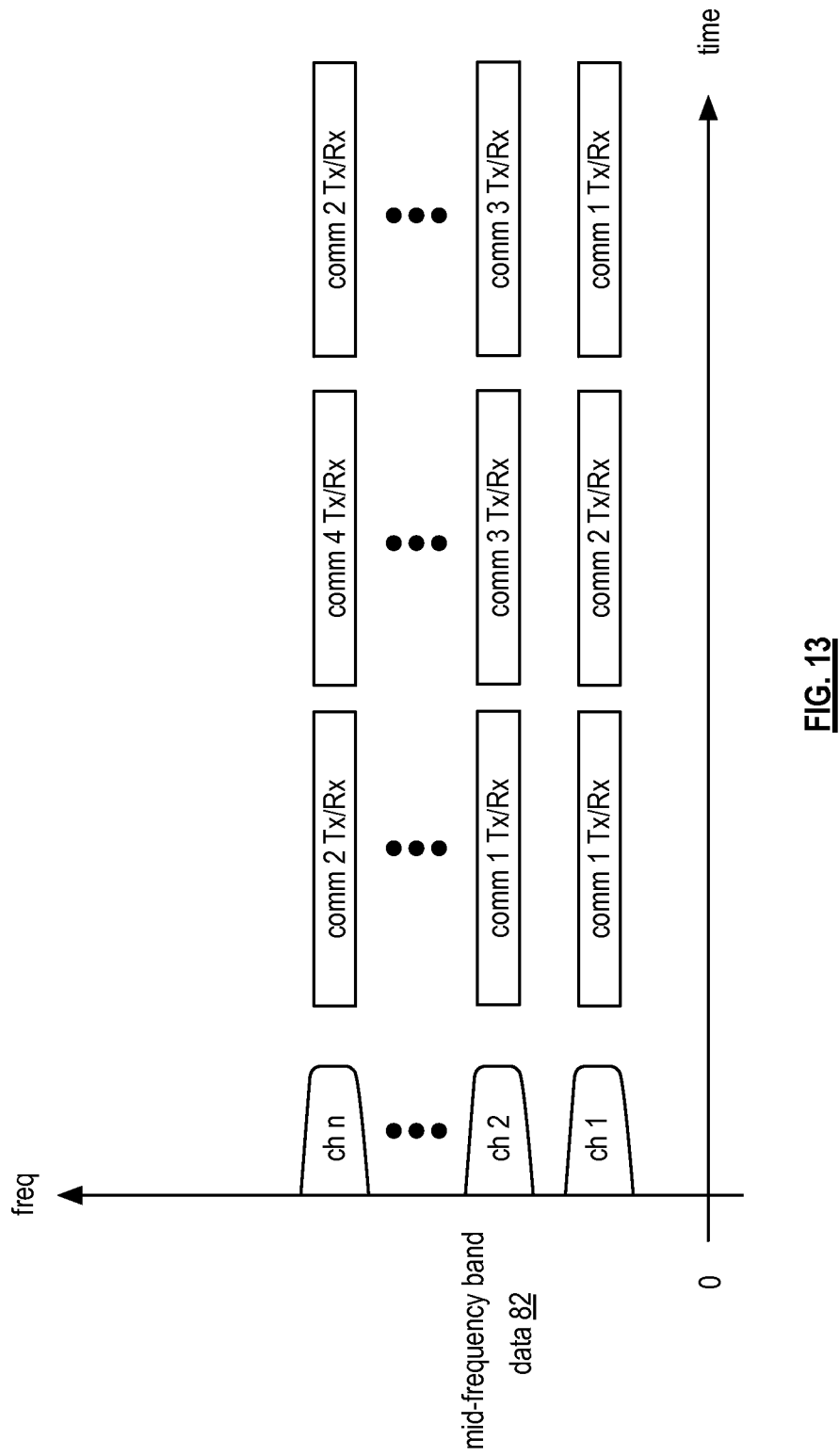
FIG. 13 is a diagram of another example of frequency band allocation within a portable computing device in accordance with the present invention.

FIG. 13 is a diagram of another example of frequency band allocation of the RF link within a portable computing device. In this example, the data frequency band 82 is divided into a plurality of channels (e.g., ch. 1 through ch. n). One or more of the communications share each channel. For example, communications #1 and #2 share channel one. As another example, communications #1 and #3 share the second channel. Accordingly, the data frequency band is frequency multiplexed and time multiplex to support the various data communications between the multimode RF units and the core module. Note that the control frequency band 80 may also be frequency shared.

Figure 14:
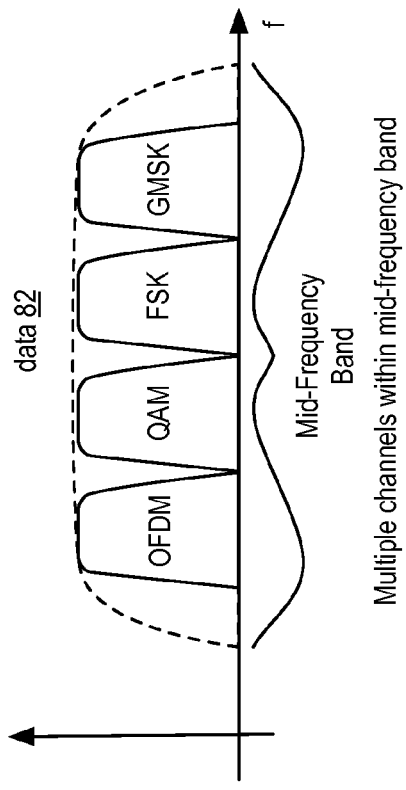
FIG. 14 is a diagram of another example of frequency band allocation within a portable computing device in accordance with the present invention.

FIG. 14 is a diagram of another example of frequency band allocation of the RF link within a portable computing device. In this example, the data frequency band 82 is divided into a plurality of channels. Each channel may support a different type of data modulation for transceiving data between the core module and one or more of the MM RF units. For example, one channel may support an OFDM (orthogonal frequency division multiplexing) data modulation scheme, QAM (quadrature amplitude modulation), FSK (frequency shift keying), GMSK (Gaussian minimum shift keying), etc. The use of a particular data modulation scheme over a particular channel may be a static determination (e.g., pre-assigned) or a dynamic allocation (e.g., selected for a given communication).

Figure 15:
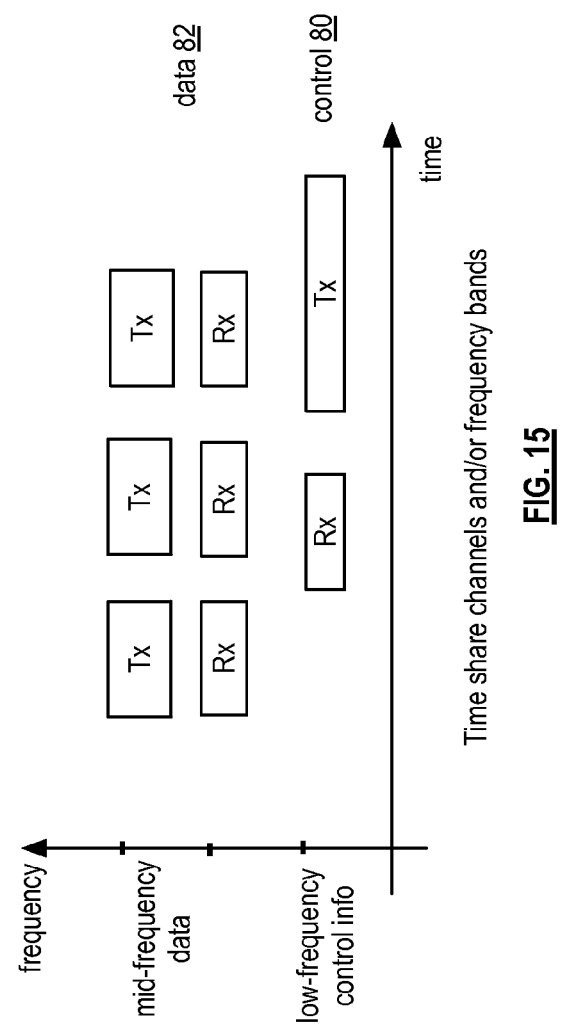
FIG. 15 is a diagram of another example of frequency band allocation within a portable computing device in accordance with the present invention.

FIG. 15 is a diagram of another example of frequency band allocation of the RF link within a portable computing device. In this example, the control frequency band (e.g. the low frequency band) 82 is time shared between transmitting and receiving. Accordingly, the frequency band has one or more repeating transmit time slots and one or more repeating receive time slots. Each time slot may be allocated to a particular MM RF unit or to a particular communication. Alternatively, the MM RF units share the time slot using a collision avoidance technique or other shared channel access protocol.

The data frequency band 82 is divided into two channels: one for transmitting (e.g., TX—the core module transmits to an MM RF unit) and another for receiving (e.g., RX—the core module receives from an MM RF unit). Each channel is divided into time slots. Each time slot of each of the RX and TX channels may be allocated to a particular MM RF unit or to a particular communication. Alternatively, the MM RF units share the time slots of each of the RX and TX channels using a collision avoidance technique or other shared channel access protocol.

Figure 16:
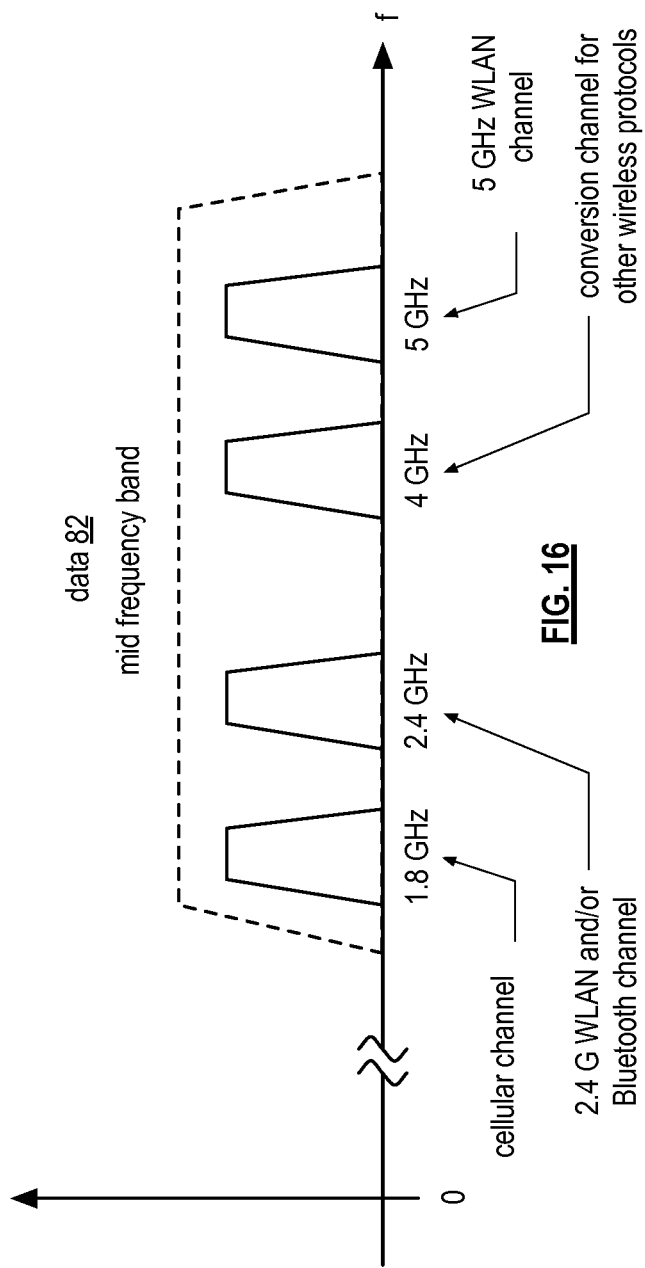
FIG. 16 is a diagram of another example of frequency band allocation within a portable computing device in accordance with the present invention.

FIG. 16 is a diagram of another example of frequency band allocation of the RF link within a portable computing device. In this example, the data frequency band 82 is divided into a plurality of channels. Some of the channels correspond to a particular carrier frequency of a particular communication protocol. For example, one channel is centered at 1.8 GHz and has a channel width of 10-100 MHz for cellular type communications. As another example, another channel is centered at 2.4 GHz and has a channel width of 10-100 MHz for WLAN and/or Bluetooth type communications. As yet another example, a channel is centered at 5 GHz and has a channel width of 10-100 MHz for WLAN type communications.

As a further example, a channel may be centered at 4 GHz (or other non-standard use frequency) for other types of communications. For instance, the generic channel may be used to support a 60 GHz communication. In particular, the wireless communication processing module converts outbound data into an outbound symbol stream that it modulates to 4 GHz. The modulated outbound symbol stream is transmitted to an MM RF unit via the RF link. The MM RF unit up-converts the modulated outbound symbol stream to produce the desired 60 GHz transmit signal.

Figure 17:
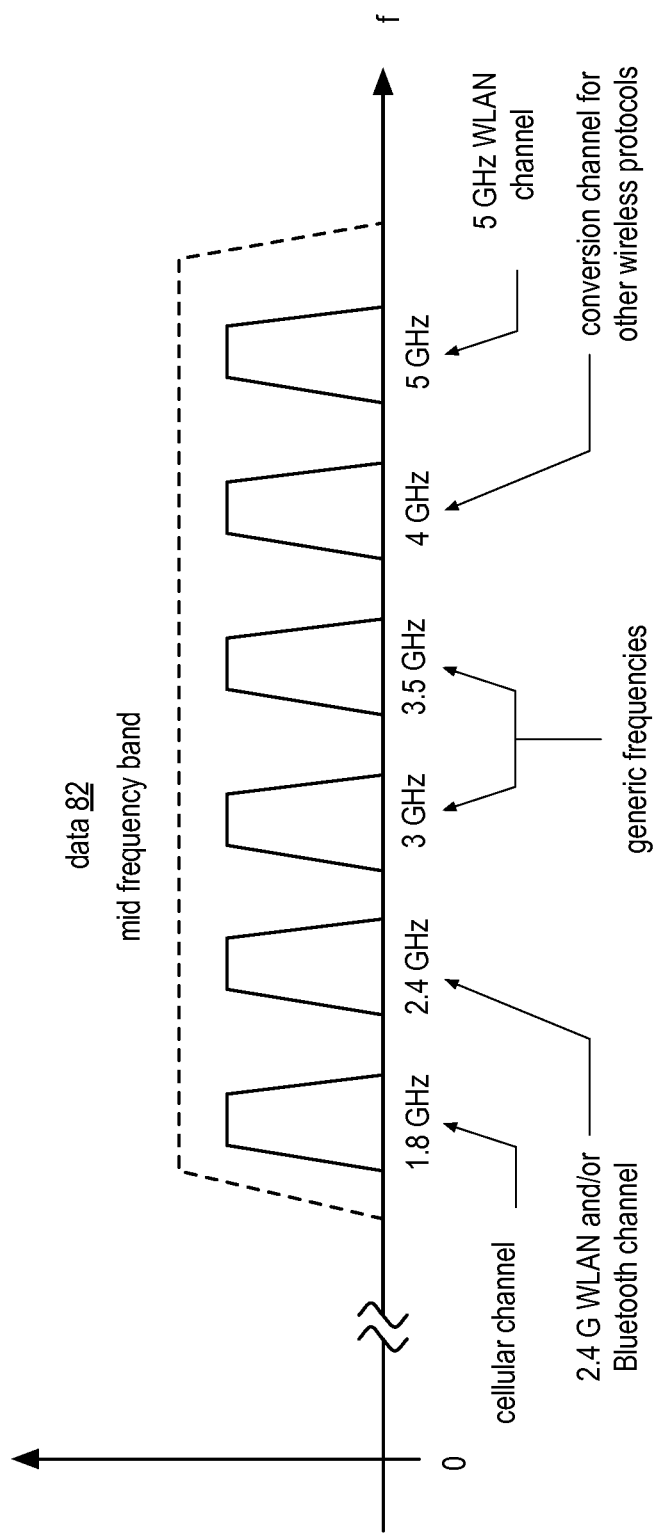
FIG. 17 is a diagram of another example of frequency band allocation within a portable computing device in accordance with the present invention.

FIG. 17 is a diagram of another example of frequency band allocation of the RF link within a portable computing device. In this example, the data frequency band 82 is divided into a plurality of channels. Some of the channels correspond to a particular carrier frequency of a particular communication protocol. For example, one channel is centered at 1.8 GHz and has a channel width of 10-100 MHz for cellular type communications. As another example, another channel is centered at 2.4 GHz and has a channel width of 10-100 MHz for WLAN and/or Bluetooth type communications. As yet another example, a channel is centered at 5 GHz and has a channel width of 10-100 MHz for WLAN type communications. The channel centered at 4 GHz is used to support carrier frequency conversion for a given protocol (e.g., 60 GHz).

In this example, the data frequency band 82 further includes two channels at generic frequencies. The generic channels are assigned a center frequency within the frequency band based on available spectrum. For instance, the generic channels may be at 3 GHz and 3.5 GHz. A generic channel may be used in a similar fashion as the 4 GHz channel (e.g., carrier frequency conversion). Note that more or less generic channels may be allocated within the data frequency band.

Figure 18:
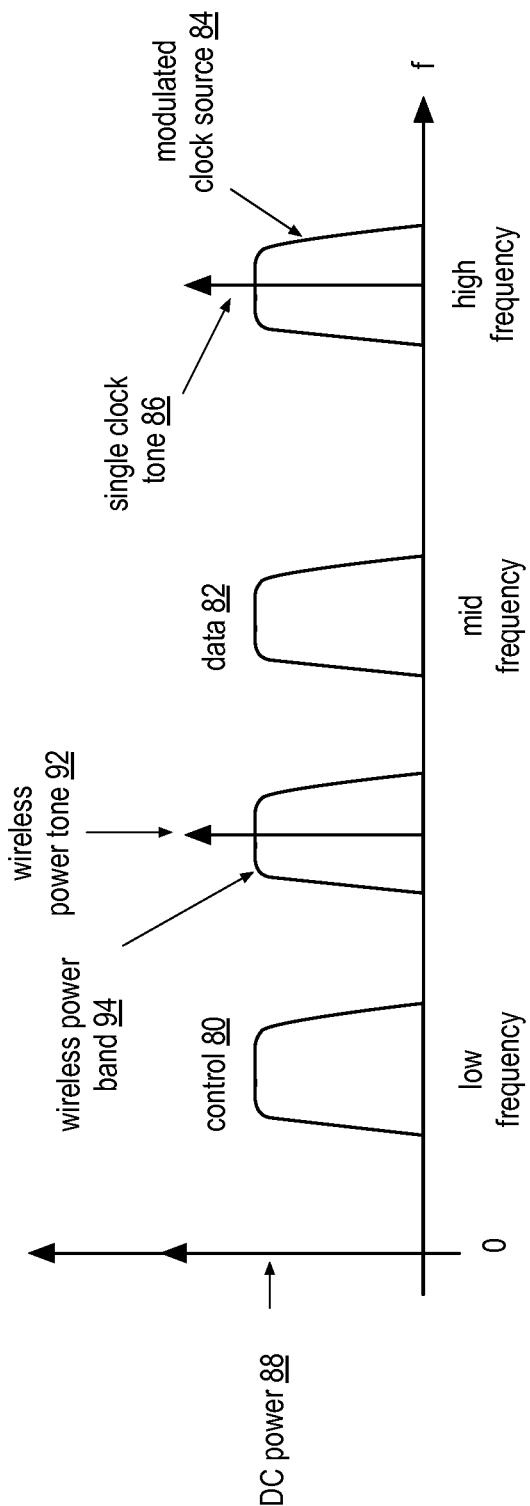
FIG. 18 is a diagram of another example of frequency band allocation within a portable computing device in accordance with the present invention.

FIG. 18 is a diagram of another example of frequency band allocation of the RF link within a portable computing device. In this example, the frequency spectrum of the RF link is divided into four sections: a first for a frequency band of address and/or control information 80, a second for wireless power 94, a third for a frequency band of data 82, and a fourth for clock signals 84. In addition, power may be communicated via the RF link to the multimode RF units at DC. The control frequency band, the data frequency band, and the clock frequency band (or clock tone) may be divided into channels as previously discussed.

The wireless power frequency section 94 may include a wireless power tone 92 or a wireless power frequency band 94. If the wireless power section includes a wireless power tone 92, the core module includes a wireless power receiver tuned to the wireless power tone. An external wireless power transmitter transmits a wireless power signal at a frequency corresponding to the wireless power tone, which the wireless power receiver converts into a supply voltage. The core module conveys the power supply voltage, or a supply voltage derived there from, to the multimode RF units via the RF link.

If the wireless power section includes a wireless power frequency band 92, the frequency band may be divided into a plurality of channels. In this instance, one of the channels is for a wireless power receiver within the core module to receive a wireless power signal from an extra wireless power transmitter. Remaining channels are used to convey a wireless power signal from the core module, via a wireless power transmitter therein, to wireless power receivers within each of the multimode RF units. One or more embodiments and/or examples of utilizing wireless power will be described in one or more of the subsequent figures.

Figure 18A:
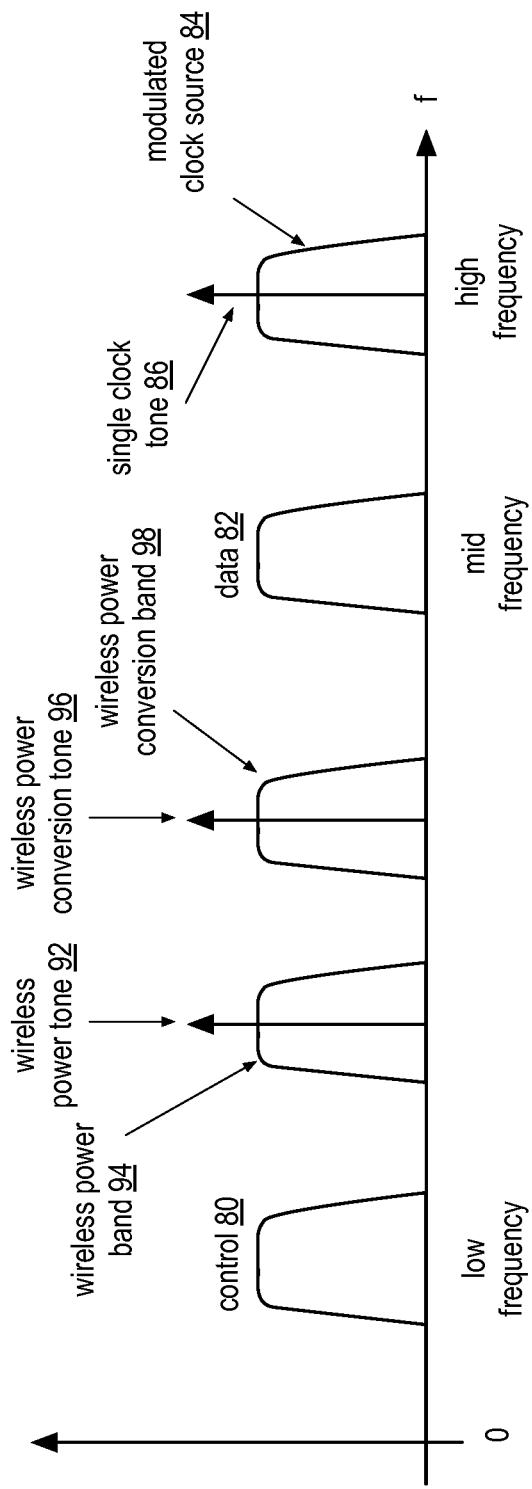
FIG. 18A is a diagram of another example of frequency band allocation within a portable computing device in accordance with the present invention.

FIG. 18A is a diagram of another example of frequency band allocation of the RF link within a portable computing device. In this example, the frequency spectrum of the RF link is divided into five sections: a first for a frequency band of address and/or control information 80, a second for wireless power 94, a third for wireless power conversion 98, a fourth for a frequency band of data 82, and a fifth for clock signals 84. The control frequency band, the data frequency band, the wireless power section, and the clock frequency band (or clock tone 86) may be utilized as previously discussed.

The wireless power conversion section may include a wireless power conversion tone 96 or a wireless power conversion frequency band 98. If the wireless power conversion section includes a wireless power conversion tone 96, the core module includes a DC-DC converter to generate one or more supply voltages from the wireless power receiver (or battery) and also to generate a wireless power conversion signal at a frequency corresponding to the wireless power conversion tone. For example, the wireless power conversion signal corresponds to a voltage induced in a secondary winding of a transformer within the DC-DC converter. The core module transmits the power conversion and signal to the multi-mode RF units via the RF link.

If the wireless power conversion section includes a wireless power conversion frequency band, the core module, via one or more DC-DC converters, generates a plurality of wireless power conversion signals at different frequencies. Each of the wireless power conversion signals may correspond to a different voltage level or may be individually created for each of the multimode RF units. The core module transmits the plurality of wireless power conversion signals within the wireless power conversion frequency band to the multimode RF units. One or more embodiments and/or examples of wireless power conversion will be described with reference to one or more of the subsequent figures.

Figure 18B:
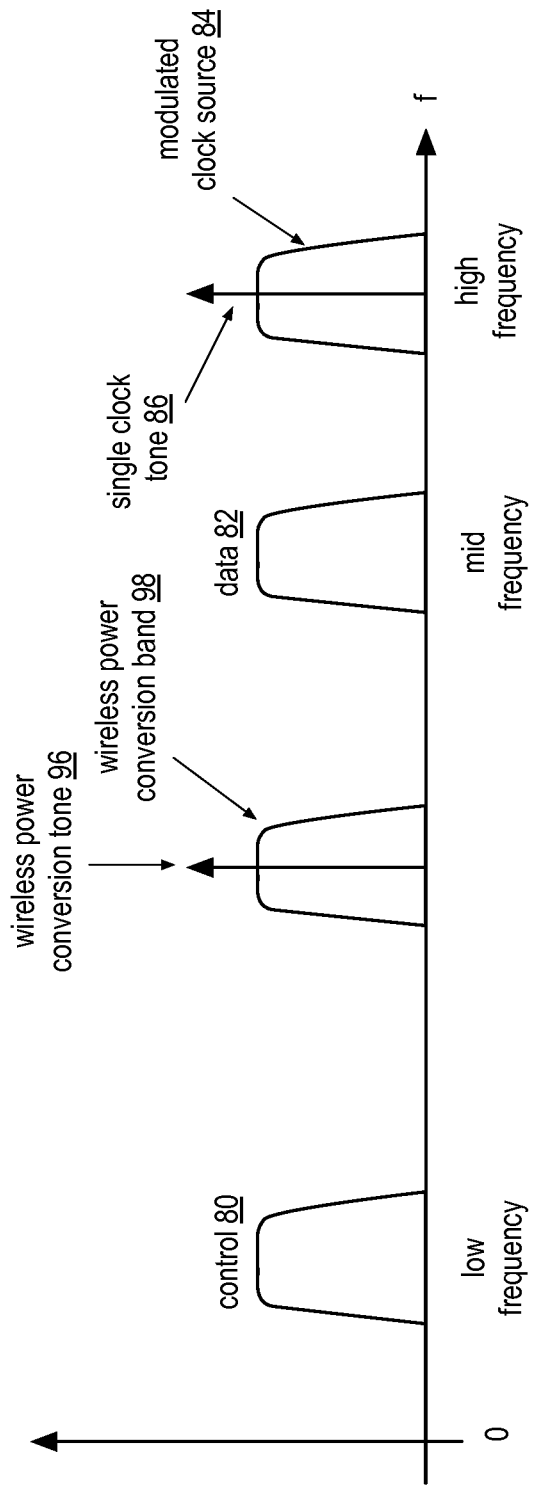
FIG. 18B is a diagram of another example of frequency band allocation within a portable computing device in accordance with the present invention.

FIG. 18B is a diagram of another example of frequency band allocation of the RF link within a portable computing device. In this example, the frequency spectrum of the RF link is divided into four sections: a first for a frequency band of address and/or control information 80, a second for wireless power conversion 98, a third for a frequency band of data 82, and a fourth for clock signals 84. Each of these sections may be utilized as previously discussed.

FIG. 19 is a schematic block diagram of an embodiment of a portion of a portable computing device that includes the core module 30, the RF link, and one of the multimode RF units 36-42. The core module 30 includes a power, time, and configuration management module 58 (e.g., the power management module and the time and/or application management module of FIG. 2), a control information and data processing module 54 (e.g., the device processing module of FIG. 2), and an RF link interface 62. The multi-mode RF unit includes an RF link interface. The MM RF unit 36-42 includes an RF link interface 64-68.

In general, the power, time, and configuration management module 58 (i.e., management module) manages the applications being run on the portable computing device, the circuitry within the core module (e.g., of the control info and data processing module) and in one or more of the multimode RF units to support the applications, power consumption of the circuitry, sharing of the circuitry, and/or configuration of the circuitry. In this manner, power consumption is reduced, die size of corresponding integrated circuits is reduced, and performance is enhanced.

The management module 58 may configure and/or enable various circuits within the core module and/or one or more of the multi-mode modules utilizing hardware switches, software, and/or reprogrammable firmware. Accordingly, the management module may turn off circuits that are not needed at a particular time to reduce their power consumption. In addition, the management module determines which circuits to enable for the various applications being run and at what levels (e.g., supply voltage, clock rate, data rate, etc.). One more embodiments and/or examples of managing resources of the portable computing device will be discussed in one or more of the subsequent figures.

Figure 20:
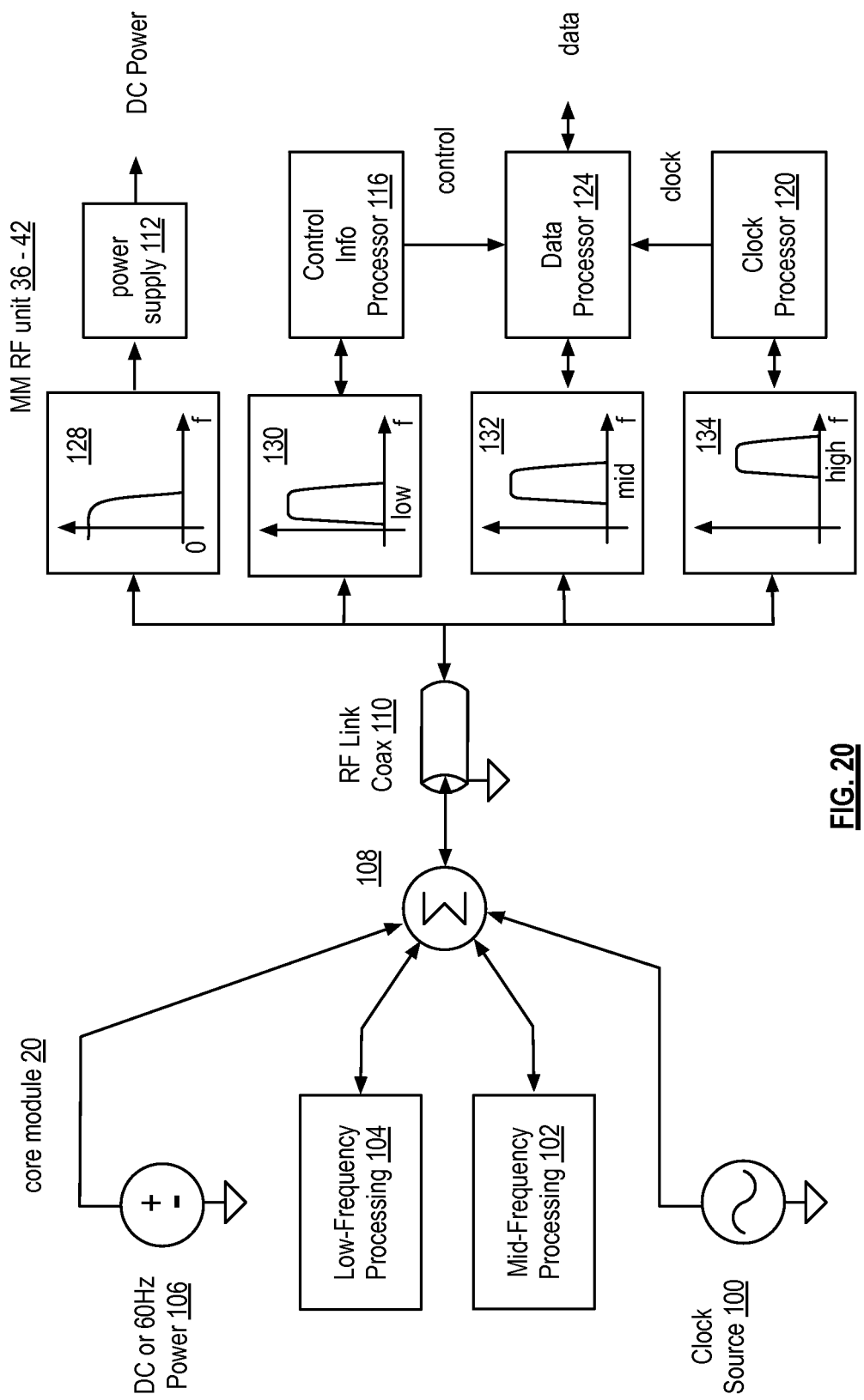
FIG. 20 is a schematic block diagram of another embodiment of a portion of a portable computing device in accordance with the present invention.

FIG. 20 is a schematic block diagram of another embodiment of a portion of a portable computing device that includes a high-level implementation of the core module 30 and one of the multimode RF units 36-42. The core module 30 includes a power source 106 (e.g., DC or 60 Hz power), a low-frequency band processing module 104 (e.g., control information), a mid-frequency band processing module 102 (e.g., data), a summing module 108, and a clock source 100 (e.g., the crystal oscillator, a phase locked loop, a frequency synthesizer, etc.). The multi-mode RF unit 36-42 includes a low pass filter 128, a low-frequency bandpass filter 130, a mid-frequency bandpass filter 132, a high frequency bandpass filter 134, a power supply 112, a control information processor 116, a data processor 124, and a clock processor 120.

In an example of operation of the core module, the power source 106 generates one or more power supply voltages that are provided to the summing module 108. The low-frequency processing module 104, which may be part of the device processing module and/or of the wireless communication processing module of FIG. 2 and/or a separate processing module, generates control information regarding the interoperation of the core module and one or more multimode RF units. The control information may include, but is not limited to, allocation of access to the RF link information, an indication of a type of wireless communication, activation of one or more transceivers within a multi-mode RF unit, an indication of a wireless communications standard being supported, data processing information, filter parameter settings (e.g., bandwidth, gain, corner frequencies, attenuation rate, etc.) for the various filters within an multimode RF unit, and power saving information. The low frequency processing module provides the control information to the summing module.

The mid-frequency processing module 102, which may be part of the wireless communication processing module of FIG. 2 and/or a separate processing module, processes data regarding one or more applications being run on the portable computing device that is to be transmitted or received via a wireless communication. The mid-frequency processing module provides the processed data to the summing module.

The clock source 100 generates a clock signal that is provided to the summing module 108. The summing module, which may be an adder, a combiner, a multiplexor, a switching network, a common node, etc., combines the one or more power supply voltages, the control information, the data, and the clock signal to produce a composite signal. The summing module transmits the composite signal onto the RF link 110, which is subsequently received by one or more of the multi-mode RF units.

Within the multimode RF unit, the low pass filter filters 128 out the one or more power supply voltages and provide them to the power supply module 112. The power supply module 112, which may be a capacitor, a series of capacitors, a DC-DC converter, and/or a linear regulator, generates one or more local supply voltages from the received power supply voltage(s). The high-frequency bandpass filter 134 filters out the clock signal from the composite signal and provides it to a clock processor 120. The clock processor 120, which may include a phase locked loop, frequency divider, frequency multiplier, frequencies synthesizer, etc., generates one or more local clock signals from the received clock signal.

The low frequency bandpass filter 130 filters the control information out of the composite signal and provides it to the control information processor 116. The control information processor 116 processes control information to produce control information for the multimode RF unit. The mid frequency bandpass filter 132 filters the data from the composite signal and provides it to the data processor 124. The data processor processes the data in accordance with the recovered control information to generate one or more outbound RF signals, which includes the data.

For incoming data, a multi-mode RF unit receives an inbound RF signal, which includes the data. The data processor 124 processes the inbound RF signal in accordance with the control information to produce a processed inbound signal. The data processor 124 outputs the processed inbound signal to the mid-frequency bandpass filter 132, which filters it and outputs it on to the RF link. The summing module 108, which may include a splitter, a de-combiner, a demultiplexor, etc., provides the processed inbound signal to the mid-frequency processing module 102. The mid-frequency processing module 102 processes the inbound signal to produce inbound data, which it provides to the device processing module and/or to another module coupled to the data link.

As a specific example, the portable computing device is executing a web browser application, which is running on the device processing module within the core module. User inputs are received via a touchscreen, or like input device, and are provided to the device processing module via the corresponding user I/O interface and the data link. The data processing module interprets the users inputs (e.g., a search engine request) to produce data (e.g., the search engine request for a particular item using a particular search engine). The data processing module provides the data to the wireless communication processing module.

The wireless communication processing module, based on control information received from the management module, processes the data in accordance with a wireless communication protocol (e.g., WLAN, cellular data, etc.) to produce one or more outbound signals. The outbound signal is further processed in accordance with the control information from the management module for transmission via the RF link to one or more of the multimode RF units. For example, the outbound signal may be up converted to a particular frequency within the mid-frequency band, which may be done within the wireless litigation processing module and order within the RF link interface of the core module. In addition, the outbound signal will include a header section that identifies one or more of the multimode RF units that are to further process the outbound signal. The outbound signal may be transmitted in one or more packets using a Ethernet protocol, a collision avoidance protocol, and or some other shared medium transgene protocol.

Each of the multimode RF units receives the outbound signal from the RF link and interprets the signal to determine whether it is to further process the outbound signal. When the multimode RF unit is to further process the outbound signal, it configures itself in accordance with the selected wireless communication protocol to convert the outbound signal into one or more outbound RF signals.

If the outbound RF signals include a search engine request (e.g., as its data payload), one or more of the multimode RF units will receive a response RF signal (e.g., a response to the search engine request as its data payload). The data processor of the multimode RF unit processes the received inbound RF signal in accordance with the selected wireless communication protocol to convert it into an inbound signal. The data processor and/or the RF link interface processes the inbound signal in accordance with the selected RF link interface protocol (e.g., a selected channel within the mid-frequency band, a data modulation scheme, packet formatting, frame formatting, RF link access protocol, etc.).

The mid-frequency processing module of the core module receives the amount signal via the RF link and the summing module and processes the inbound signal in accordance with the selected wireless to medication protocol to produce inbound data. The device processing module receives the inbound data and processes it according to the request. For example, the device processing module may generate a graphic and/or text message based on the inbound data that is provided to the display of the portable computing device.

Figure 21:
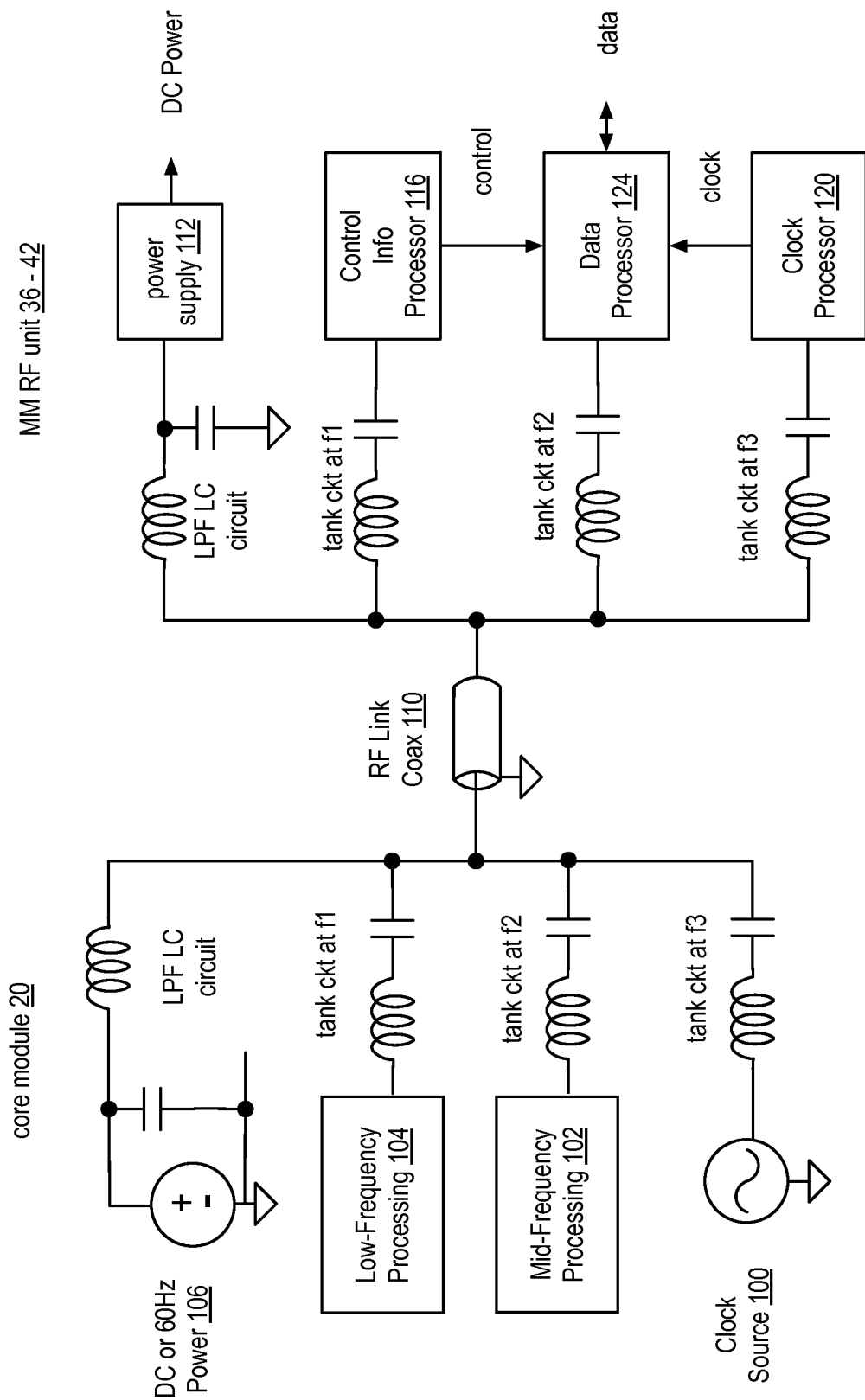
FIG. 21 is a schematic block diagram of another embodiment of a portion of a portable computing device in accordance with the present invention.

FIG. 21 is a schematic block diagram of another embodiment of a portion of a portable computing device that includes a core module 30 and one multimode RF unit 36-42. The core module 30 includes a power source 106 (e.g., DC or 60 Hz power), a low-frequency band processing module 104 (e.g., control information), a mid-frequency band processing module 102 (e.g., data), a clock source 100 (e.g., the crystal oscillator, a phase locked loop, a frequency synthesizer, etc.), and a plurality of tank circuits (e.g., f1-f3). The multi-mode RF unit 36-42 includes a plurality of tank circuits (e.g., f1-f3), a power supply 112, a control information processor 116, a data processor 124, and a clock processor 120.

The tank circuits within each of the core module and the multimode RF unit function to isolate the various frequency bands used to communicate information between the core module and the multimode RF units. For example, the tank circuit coupled to the low frequency processing module resonates at a first frequency, which corresponds to the low frequency band; the tank circuit coupled to the mid frequency processing module resonates at a second frequency, which corresponds to the mid frequency band; and the tank circuit coupled to the clock source resonates at a third frequency, which corresponds to the high frequency band. The corresponding tank circuits within the multimode RF units are tuned to resonate at the first frequency, the second frequency, and the third frequency, respectively. The power source and the corresponding power supply signals are isolated from the other signals on the RF link via an inductor, which has a high impedance at frequencies at and above the first frequency.

Figure 22:
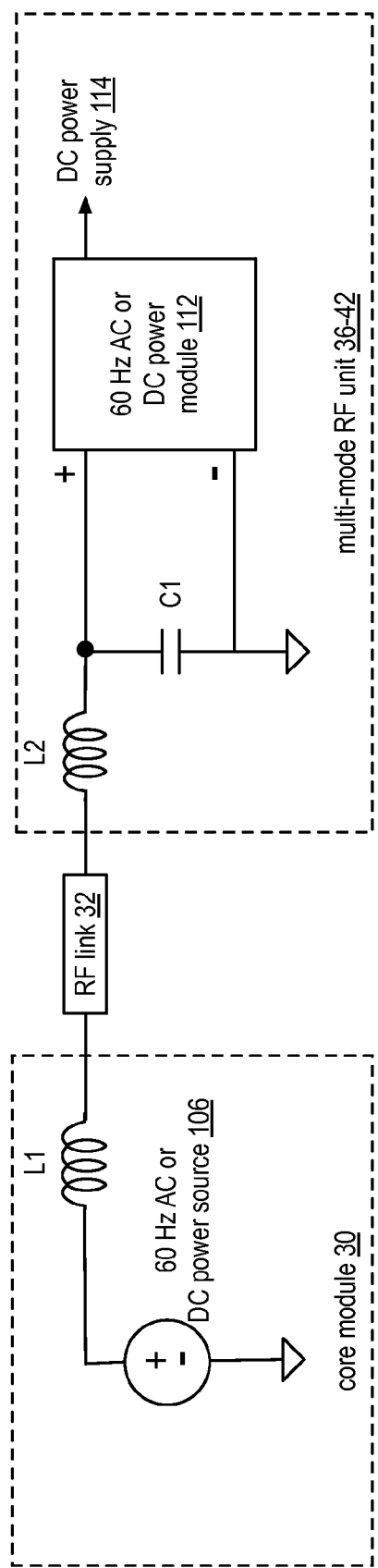
FIG. 22 is a schematic block diagram of another embodiment of a portion of a portable computing device in accordance with the present invention.

FIG. 22 is a schematic block diagram of an embodiment of a power supply portion of a portable computing device. The core module 30 includes a DC power source and or a low-frequency (e.g., 60 Hz) AC power source 106 to produce one or more supply voltages. These supply voltages are coupled through an inductor (L1) to the RF link. The multimode RF unit 36-42 includes an inductor (L2), the capacitor (C1), and a power module 112 (e.g., DC or low-frequency AC). The power module 112 may include one or more DC to DC converters, one or more linear regulators, one or more filter capacitors, etc. For example, if the power supply voltages received from the core module are at a desired level for supplying circuitry within the multimode RF unit, the power module would include a filter capacitor to filter the one or more power supply voltages.

Figure 23:
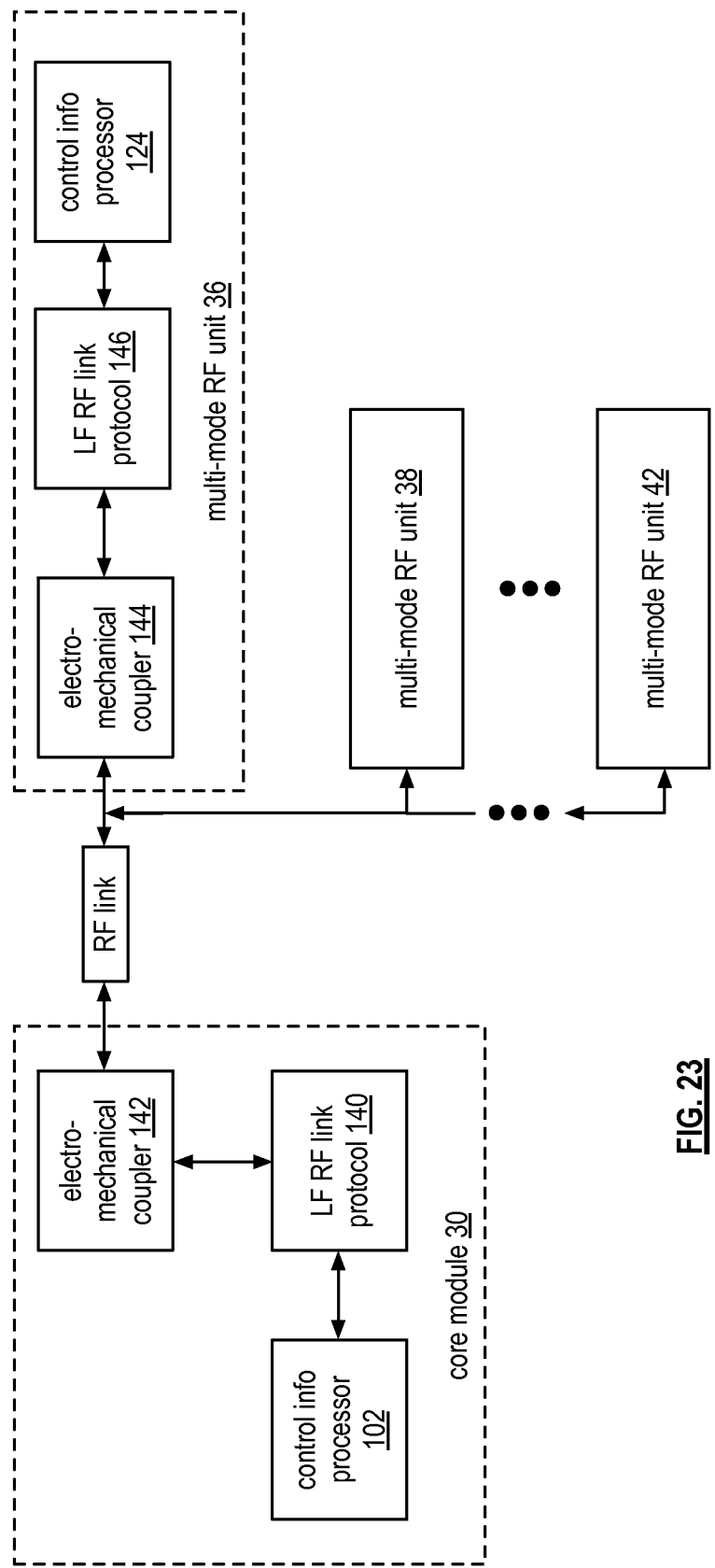
FIG. 23 is a schematic block diagram of another embodiment of a portion of a portable computing device in accordance with the present invention.

FIG. 23 is a schematic block diagram of another embodiment of a low frequency (e.g., control information) processing portion of a portable computing device that includes a core module 30 and a plurality of multi-mode RF units 36-42. The core module 30 includes the control information processor 102, a low-frequency (LF) RF link protocol module 140, and an electro-mechanical coupler 142 (e.g., a multi-in connector, an optical coupler, a coaxial coupler, etc.). Each of the MM RF units 36-42 includes an electro-mechanical coupler 144, an LF RF link protocol module 146, and the control information processor 124.

In an example of operation, the control information processor 102 generates control information regarding the operation of the portable computing device as previously discussed and/or as will be subsequently discussed. The control information processor 102 provides the control information to the low-frequency RF link protocol module 140, which modulates the control information in accordance with an RF link protocol to produce an RF link signal. The RF link protocol may be one of a plurality of RF link protocols that indicates a particular data modulation scheme, carrier frequency, channel assignment, access protocol (e.g., Ethernet, FDMA, TDMA, CDMA, collision avoidance, etc.), and packet or frame formatting.

The low-frequency RF and protocol module 146 within the multimode RF unit processes the RF link signal in accordance with the RF link protocol to recapture the control information. The control information processor 124 processes the recaptured control information and utilizes it as previously discussed and/or as will be subsequently discussed.

Figure 23A:
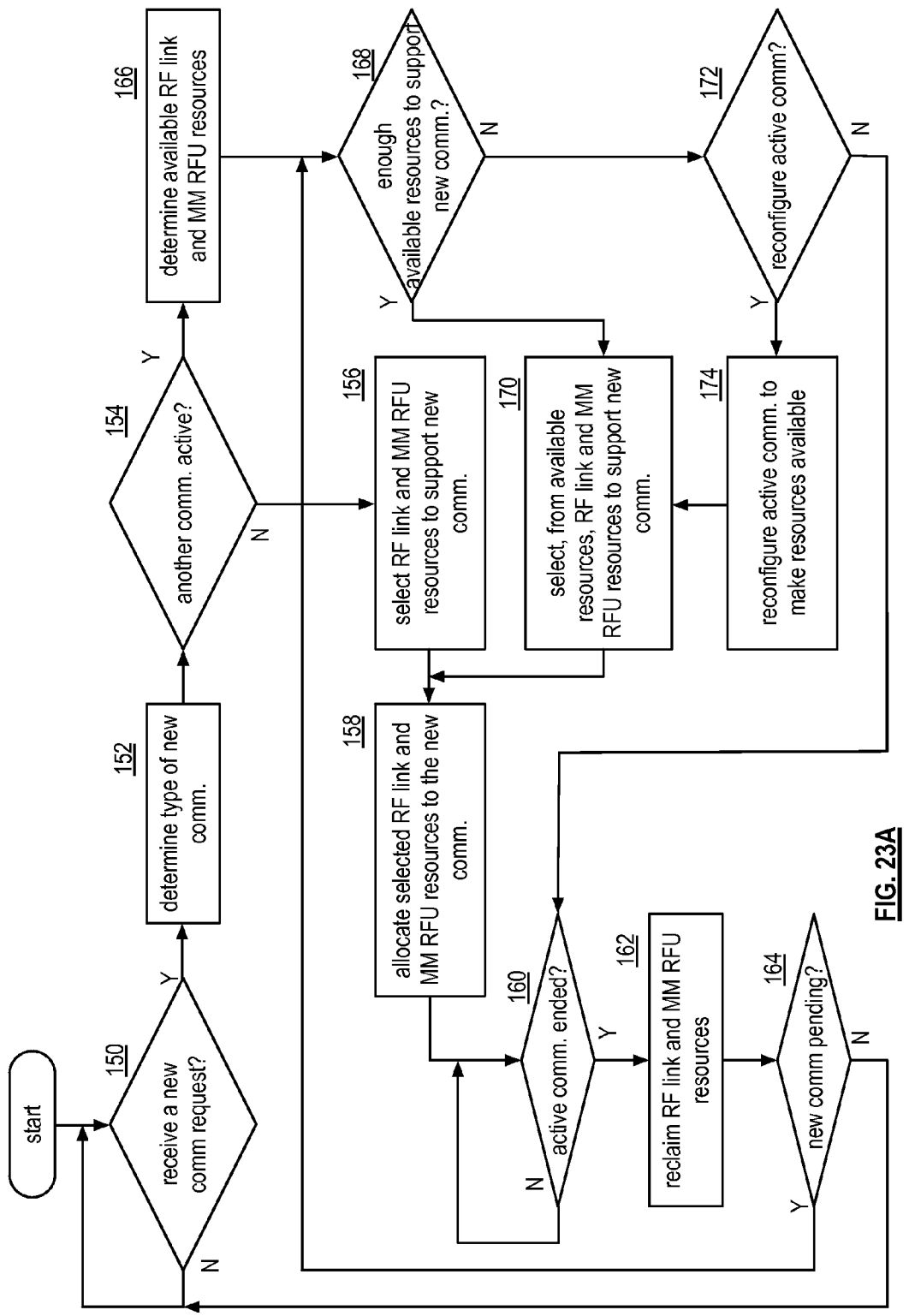
FIG. 23A is a logic diagram of an embodiment of a method of operation of a portable computing device in accordance with the present invention.

FIG. 23A is a logic diagram of an embodiment of a method of operation of a portable computing device that begins at step 150 with the core module determining whether it has a new communication request to process. For example, the core module is determining whether an active application being run on the portable computing device requires a new wireless communication. If yes, the method continues at step 152 by determining the type of wireless communication (e.g., WLAN, Bluetooth, cellular data, cellular voice, 60 GHz, etc.)

The method then continues at step 154 by determining whether another wireless communication is active. If not, the method continues at step 156 where the core module selects RF link and multi-mode RF unit resources to support the new wireless indication. For example, the core module determines an RF link protocol for control information, an RF link protocol for data, a communication protocol, a number of multimode RF units to support the communication, and the corresponding components within the core module to support the communication. The method continues at step 158 where the core module allocates the selected RF link resources and selected multi-mode RF unit resources to the new communication. These resources will remain allocated to the communication until the communication ends or reallocated in subsequent steps.

If another call is active after determining the type of new call, the method continues at step 166 by determining available resources (e.g., RF Link and MM RF units). The method then continues at step 168 by determining whether there are enough available resources to support the resource needs of the new communication. If yes, the method continues at step 170 by selecting resources from the available resources to support the new communication and then allocating the selected resources to support the communication.

If there are not sufficient available resources to support the new communication, the method continues at step 172 by determining whether one or more active communications may be reconfigured to make available more resources without adversely affecting the active communications. If not, the method continues at step 160 by waiting for an active communication to end, which may occur by evoking a communication prioritization scheme. If reconfiguring one or more active communications makes available sufficient resources to support the new communication, the method continues at step 174 by reconfiguring the active communications to make the resources available and then allocating available resources to the new communication.

If the method is waiting for an active communication to end before a new communication can be support, when an active communication ends, the method continues at step 162 by reclaiming the resources of the recently concluded communication. The method continues at step 164 by determining whether the new communication is still pending (e.g., it may have timed out per a prioritization scheme and/or a waiting scheme). If not, the method repeats at the beginning. If the new communication is still pending, the process continues at step 168 by determining whether there are now enough resources available to support the new communication and the method continues as previously described.

Figure 24:
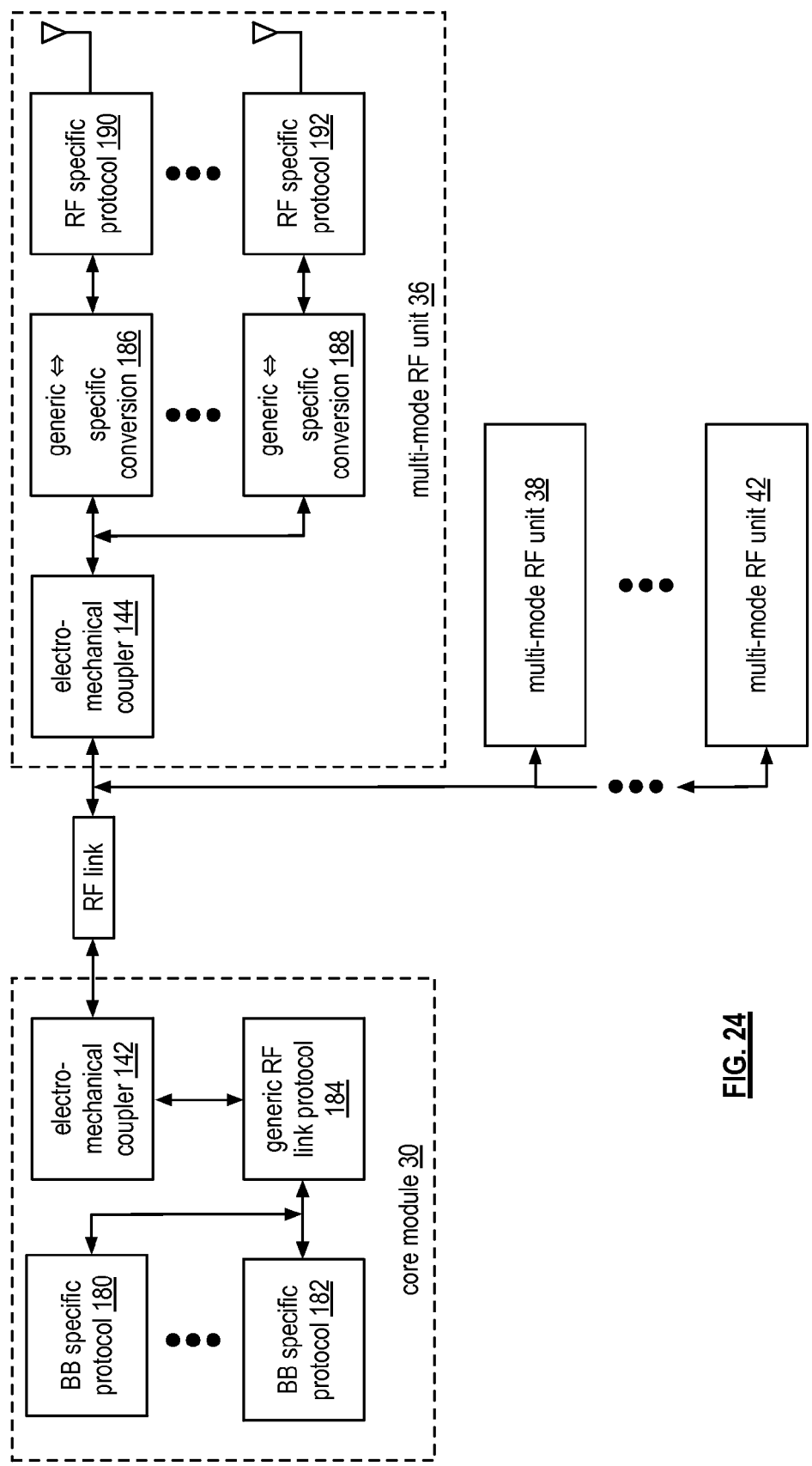
FIG. 24 is a schematic block diagram of another embodiment of a portion of a portable computing device in accordance with the present invention.

FIG. 24 is a schematic block diagram of an embodiment of a mid-frequency band (e.g., data) portion of a portable computing device that includes a core module 30 and a plurality of multimode RF units 36-42. The core module 30 includes a plurality of baseband (BB) specific protocol modules 180-182, one or more generic RF link protocol modules 184, and the electro-mechanical coupler 142. Each of the MM RF units 36-42 includes the electro-mechanical coupler 144, a plurality of generic to/from specific conversion modules 186-188, and a plurality of RF specific protocol modules 190-192.

In an example of operation, the core module 30 selects one of the BB specific protocol modules 180-182 to perform baseband processing of a wireless communication based on the wireless communication protocol of the communication. The wireless communication protocol may be one or more of GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc. For an outbound communication, the selected BB specific protocol module receives outbound data (e.g., voice, text, audio, video, graphics, etc.) from the device processing module or generates the outbound data. The selected BB specific protocol module converts the outbound data into one or more outbound symbol streams in accordance with the corresponding one or more wireless communication standards. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the select baseband specific protocol module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and/or Multiple Input Multiple Output (MIMO) communications.

The selected BB specific protocol module provides the outbound symbol stream to the generic RF link protocol module 184. In accordance with a selected RF link protocol for data communications (e.g., the mid frequency band), the generic RF link protocol module converts the outbound symbol stream into an RF link outbound signal. The RF link protocol module may include a direct conversion topology transmitter or a super heterodyne topology transmitter to convert the outbound symbol stream into the RF link outbound signal.

For a direction conversion, the transmitter section may have a Cartesian-based topology, a polar-based topology, or a hybrid polar-Cartesian-based topology. In a Cartesian-based topology, the transmitter section receives the outbound symbol stream as in-phase (I) and quadrature (Q) components (e.g., $A_I(t)\cos(\omega_{BB}(t)+\phi_I(t))$ and $A_Q(t)\cos(\omega_{BB}(t)+\phi_Q(t))$, respectively) and converts the outbound symbol stream into up-converted signals (e.g., $A(t)\cos(\omega_{BB}(t)+\phi(t))+\omega_{RF}(t)))$. For example, the I and Q components of the outbound symbol stream is mixed with in-phase and quadrature components (e.g., $\cos(\omega_{RF}(t))$ and $\sin(\omega_{RF}(t))$, respectively, where RF corresponds to the center frequency of the assigned channel or of the mid-frequency band) of a transmit local oscillation (TX LO) to produce mixed signals. One or more filters filter the mixed signals to produce the up-converted signals. As another example, the I and Q components of the outbound symbol stream are up-sampled and filtered to produce the up-converted signals. One or more amplifiers amplify the outbound up-converted signal(s) to produce the outbound RF link signal(s).

In a phase polar-based topology, the transmitter section receives the outbound symbol stream in polar coordinates (e.g., $A(t)\cos(\omega_{BB}(t)+\phi(t))$ or $A(t)\cos(\omega_{BB}(t)+/-\Delta\phi)$). In an example, the transmitter section includes an oscillator that produces an oscillation (e.g., $\cos(\omega_{RF}(t))$ that is adjusted based on the phase information (e.g., $+/-\Delta\phi$ [phase shift] and/or $\phi(t)$ [phase modulation]) of the outbound symbol stream(s). The resulting adjusted oscillation (e.g., $\cos(\omega_{RF}(t)+/-\Delta\phi)$ or $\cos(\omega_{RF}(t)+\phi(t))$) may be further adjusted by amplitude information (e.g., $A(t)$ [amplitude modulation]) of the outbound symbol stream(s) to produce one or more up-converted signals (e.g., $A(t)\cos(\omega_{RF}(t)+\phi(t))$ or $A(t)\cos(\omega_{RF}(t)+/-\Delta\phi)$). In another example, the polar coordinate based outbound symbol stream is up-sampled and discrete digitally filtered to produce the one or more up-converted signals. One or more power amplifiers amplify the outbound up-converted signal(s) to produce an outbound RF link signal(s).

In a frequency polar-based topology, the transmitter section receives the outbound symbol stream in frequency-polar coordinates (e.g., $A(t)\cos(\omega_{BB}(t)+f(t))$ or $A(t)\cos(\omega_{BB}(t)+/-\Delta f)$). In an example, the transmitter section includes an oscillator that produces an oscillation (e.g., $\cos(\omega_{RF}(t)$ this is adjusted based on the frequency information (e.g., $+/-\Delta f$ [frequency shift] and/or $f(t)$ [frequency modulation]) of the outbound symbol stream(s). The resulting adjusted oscillation (e.g., $\cos(\omega_{RF}(t)+/-\Delta f)$ or $\cos(\omega_{RF}(t)+f(t))$) may be further adjusted by amplitude information (e.g., $A(t)$ [amplitude modulation]) of the outbound symbol stream(s) to produce one or more up-converted signals (e.g., $A(t)\cos(\omega_{RF}(t)+f(t))$ or $A(t)\cos(\omega_{RF}(t)+/-\Delta f)$). In another example, the frequency-polar coordinate based outbound symbol stream is up-sampled and discrete digitally filtered to produce the one or more up-converted signals. One or more amplifiers amplify the outbound up-converted signal(s) to produce an outbound RF link signal(s).

In a hybrid polar-Cartesian-based topology, the transmitter section receives the outbound symbol stream as phase information (e.g., $\cos(\omega_{BB}(t)+/-\Delta\phi)$ or $\cos(\omega_{BB}(t)+\phi(t))$) and amplitude information (e.g., $A(t)$). In an example, the transmitter section mixes in-phase and quadrature components (e.g., $\cos(\omega_{BB}(t)+\phi_I(t))$ and $\cos(\omega_{BB}(t)+\phi_Q(t))$, respectively) of the one or more outbound symbol streams with in-phase and quadrature components (e.g., $\cos(\omega_{RF}(t))$ and $\sin(\omega_{RF}(t)$, respectively) of one or more transmit local oscillations (TX LO) to produce mixed signals. One or more filters filter the mixed signals to produce one or more outbound up-converted signals (e.g., $A(t)\cos(\omega_{BB}(t)+\phi(t))+\omega_{RF}(t))$). In another example, the polar-Cartesian-based outbound symbol stream is up-sampled and discrete digitally filtered to produce the one or more up-converted signals. One or more amplifiers amplify the outbound up-converted signal(s) to produce an outbound RF link signal(s).

For a super heterodyne topology, the transmitter section includes a baseband (BB) to intermediate frequency (IF) section and an IF to a radio frequency (RF section). The BB to IF section may be of a polar-based topology, a Cartesian-based topology, a hybrid polar-Cartesian-based topology, or a mixing stage to up-convert the outbound symbol stream(s). In the three former cases, the BB to IF section generates an IF signal(s) (e.g., $A(t)\cos(\omega_{IF}(t)+\phi(t))$) and the IF to RF section includes a mixing stage, a filtering stage and the power amplifier driver (PAD) to produce the outbound RF link signal(s).

When the BB to IF section includes a mixing stage, the IF to RF section may have a polar-based topology, a Cartesian-based topology, or a hybrid polar-Cartesian-based topology. In this instance, the BB to IF section converts the outbound symbol stream(s) (e.g., $A(t)\cos((\omega_{BB}(t)+\phi(t)))$ into intermediate frequency symbol stream(s) (e.g., $A(t)$ ($\omega_{IF}(t)+\phi(t)$). The IF to RF section converts the IF symbol stream(s) into the outbound RF link signal(s).

One or more of the multimode RF units 36-42 receives the outbound RF link signal via the electro-mechanical coupler and selects one of the generic to/from specific conversion modules 186-188 (e.g., the one corresponding to the selected wireless communication protocol). Each of the generic—specific conversion modules 186-188 includes a transmitter section that converts the outbound RF link signal(s) into the desired outbound RF signal(s) per the selected wireless communication protocol. The transmitter may be perform an up-conversion process or a down conversion process to adjust the carrier frequency of the RF link signal(s) to the desired carrier frequency of the outbound RF signal(s), which it provides to the RF specific protocol module 190-192.

Each of the RF specific protocol modules 190-192 includes one or more power amplifiers (coupled in series and/or in parallel), an antenna interface module, and may further include one or more outbound RF bandpass filters. The antenna interface module includes one or more a transformer balun, a TX/RX isolation module (e.g., a duplexer, a circulator, a splitter, etc.), an impedance matching circuit, an antenna tuning unit, and a transmission line. The power amplifier(s) and antenna interface unit are particular for a given wireless communication protocol. The antenna interface module processes the RF outbound signal(s) and provides them to the antenna structure (e.g., one or more antennas) for transmission.

For incoming communications, the antenna assembly coupled to one of the RF specific protocol modules receives one or more inbound RF signals and provides it to the RF specific protocol module 190-192. Each of the RF specific protocol modules further includes one or more low noise amplifiers and/or one or more inbound RF bandpass filters. If included, the inbound RF bandpass filter filters the inbound RF signal, which may then be amplified by the low noise amplifier. The amplified inbound RF signal(s) is provided to the corresponding generic to specific conversion module 186-188.

Each of the generic—specific conversion modules 186-188 further includes a receiver section that converts the inbound RF signal(s), which is in accordance with the selected wireless communication protocol, into an inbound RF link signal(s). The receiver section may be perform an up-conversion process or a down conversion process to adjust the carrier frequency of the inbound RF signal(s) to the carrier frequency of the inbound RF link signal(s), which it outputs onto the RF link.

The generic RF link protocol module 184 of the core module 30 receives the inbound RF link signal(s) from the RF link and converts it into an inbound symbol stream. Accordingly, the generic RF protocol module includes a receiver section that has a direct conversion topology or a super heterodyne topology. In particular, the receiver section converts the inbound RF link signal(s) (e.g., $A(t)\cos(\omega_{RF}(t)+\phi(t))$) into one or more inbound symbol streams (e.g., $A(t)\cos((\omega_{BB}(t)+\phi(t)))$.

The corresponding baseband specific processing module 180-182 converts the inbound symbol stream(s) into inbound data (e.g., voice, text, audio, video, graphics, etc.) in accordance with its one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the BB specific protocol module converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

Figure 25:
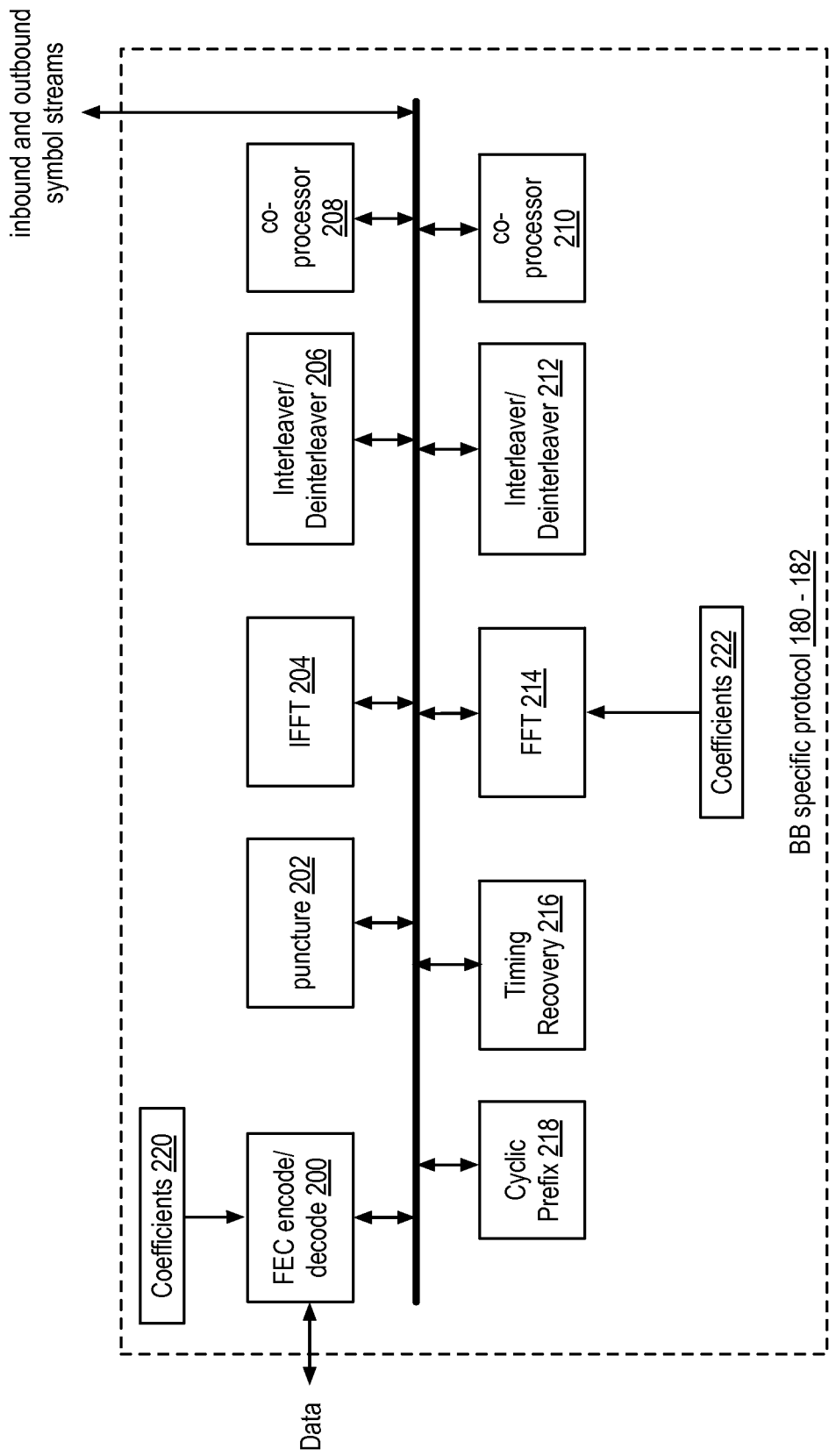
FIG. 25 is a schematic block diagram of an embodiment of a baseband specific protocol module in accordance with the present invention.

FIG. 25 is a schematic block diagram of an embodiment of a baseband specific processing module 180-182 that includes a cyclic prefix module 218, a timing recovery module 216, a puncture module 202, a forward error correction (FEC) encoder/decoder 200, one or more FFT (fast Fourier transform) modules 214, one or more IFFT (inverse fast Fourier transform) modules 204, one or more interleaver/deinterleaving modules 206, 212, one or more coprocessors 208-210, and one or more coefficient memory modules 220-222. Each of the modules is coupled to a bus structure, which may include an address bus, a data bus, and/or a control bus.

In an example of operation, the baseband specific protocol module may be configured to perform the baseband functions for a specific wireless communication protocol or for a set of wireless communication protocols. For instance, the baseband specific protocol module may be configured to perform a wireless LAN baseband function (e.g., IEEE 802.11a, b, g, n, etc.). In this instance, the FEC encode/decode module receives the corresponding coefficients for the wireless LAN baseband function to encode and/or decode data. In addition, the puncture module may be enabled to puncture or de-puncture encoded data in accordance with the wireless communication protocol. For a single output communication, an interleaver, an FFT module, and the cyclic prefix module are enabled to produce an outbound symbol stream. For a multiple output communication, multiple interleavers, multiple FFT modules, and the cyclic prefix module are enabled to produce a plurality of outbound symbol streams.

Figure 26:
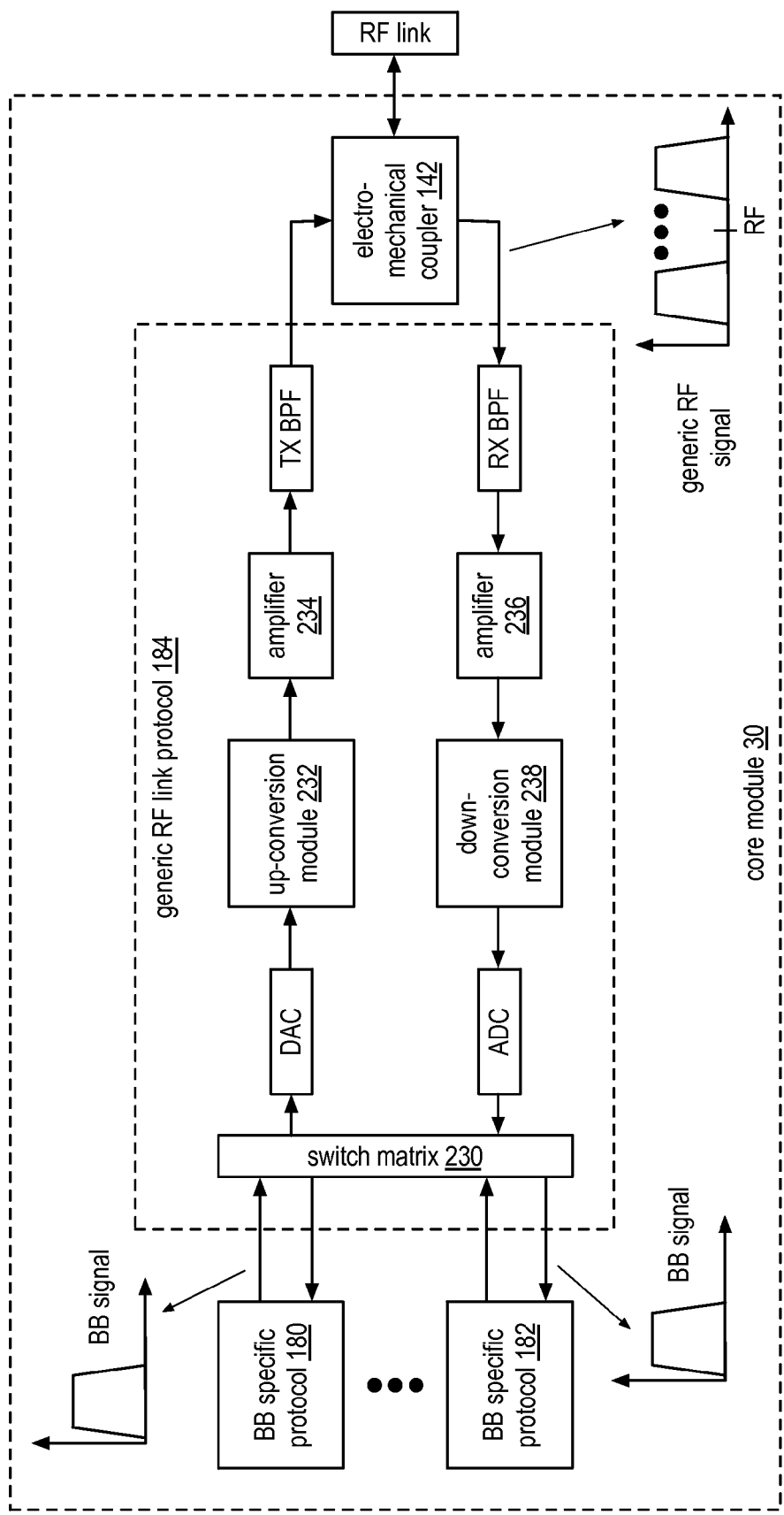
FIG. 26 is a schematic block diagram of an embodiment of core module in accordance with the present invention.

FIG. 26 is a schematic block diagram of an embodiment of core module 30 that includes a plurality of baseband (BB) specific protocol modules 180-182, a generic RF link protocol module 184, and the electro-mechanical coupler 142. The generic RF link protocol module 184 includes a switch matrix 230, a digital to analog converter (DAC), an up-conversion module 232, an amplifier 234, a transmit (TX) bandpass filter (BPF), a receive (RX) BPF, an inbound amplifier 236, a down-conversion module 238, and an analog to digital converter (ADC).

In an example of operation, one or more of the baseband specific protocol modules 180-182 generates a baseband signal. The baseband signal may include, in the analog domain, a single frequency component (e.g., $A(t)\cos(\omega_1+\Phi(t))$; $A(t)\cos(\omega)$; $A\cos(\omega_1+\Phi(t))$) or multiple frequency components (e.g., $A_1(t)\cos(\omega_1+\Phi_1(t))+A_2(t)\cos(\omega_2+\omega_2(t))+\ldots$). The number of frequency components within a baseband signal depends on the type of data modulation. For instance, ASK, PSK, QPSK, FSK, amplitude modulation, and frequency modulation include a single frequency components; while QAM, OFDM, and other complex data modulation schemes include multiple frequency components.

The switch matrix 230 arbitrates access among the baseband specific protocol modules to the transmit path (e.g., DAC, up conversion module, outbound amplifier, and TX bandpass filter) and/or to the receive path (e.g., RX bandpass filter, inbound amplifier, down conversion module, and ADC). The switch matrix may use one of a plurality of arbitration schemes to regulate access to the transmit and receive paths. For example, the switch matrix 230 may utilize a round robin accessing scheme, a token scheme, a first in first out scheme, TDMA, request & response, etc. In addition, the switch matrix may arbitrate access based on real-time communications (e.g., cellular voice, video playback, audio playback) etc. and non-real-time communications (e.g., file exchange, Internet access, cellular data, etc.). Further, the switch matrix may arbitrate access in accordance with a priority scheme based on the type of communication (e.g., cellular voice having priority over other types of real-time communications and non-real time communications).

When the transmit path receives an outbound baseband signal, the DAC converts it into an analog signal. The up conversion module 232 mixes the analog baseband signal with a local isolation (e.g., $\cos(\omega_{RF})$) and filters it to produce an up converted signal (e.g., (BB signal)*$\cos(\omega_{RF})$). The outbound amplifier 234 amplifies the converted signal, which is then filtered by the TX bandpass filter to produce an RF link outbound signal. The electro-mechanical coupler transmits the RF link outbound signal onto the RF link. Note that the up conversion module 232 may use a different local oscillation for each different baseband signal being processed. For example, the up conversion module 232 may use a first local oscillation (e.g., $\cos(\omega_{RF1})$) for a first baseband signal, a second local oscillation (e.g., $\cos(\omega_{RF2})$) for a second baseband signal, etc.

For an RF link inbound signal, the electro-mechanical coupler 142 receives the signal from the RF link and provides it to the receive baseband filter. The receive baseband filter filters the RF link inbound signal, which is then amplified by the inbound amplifier 236. The down conversion module 238 mixes the filtered RF link inbound signal (e.g., (BB signal)*$\cos(\omega_{RF})$) with a receive local oscillation (e.g., $\cos(\omega_{RF})$) and filters it to produce a down converted signal (e.g., $A(t)\cos(\omega_1+\Phi(t))$; $A(t)\cos(\omega)$; $A\cos(\omega_1+\Phi(t))$; or $A_1(t)\cos(\omega_1+\Phi_1(t))+A_2(t)\cos(\omega_1+\Phi_2(t))+\ldots$). The ADC converts the down converted signal into the inbound baseband signal. Note that the down conversion module may use a different local oscillation for each different baseband signal being processed.

Figure 27:
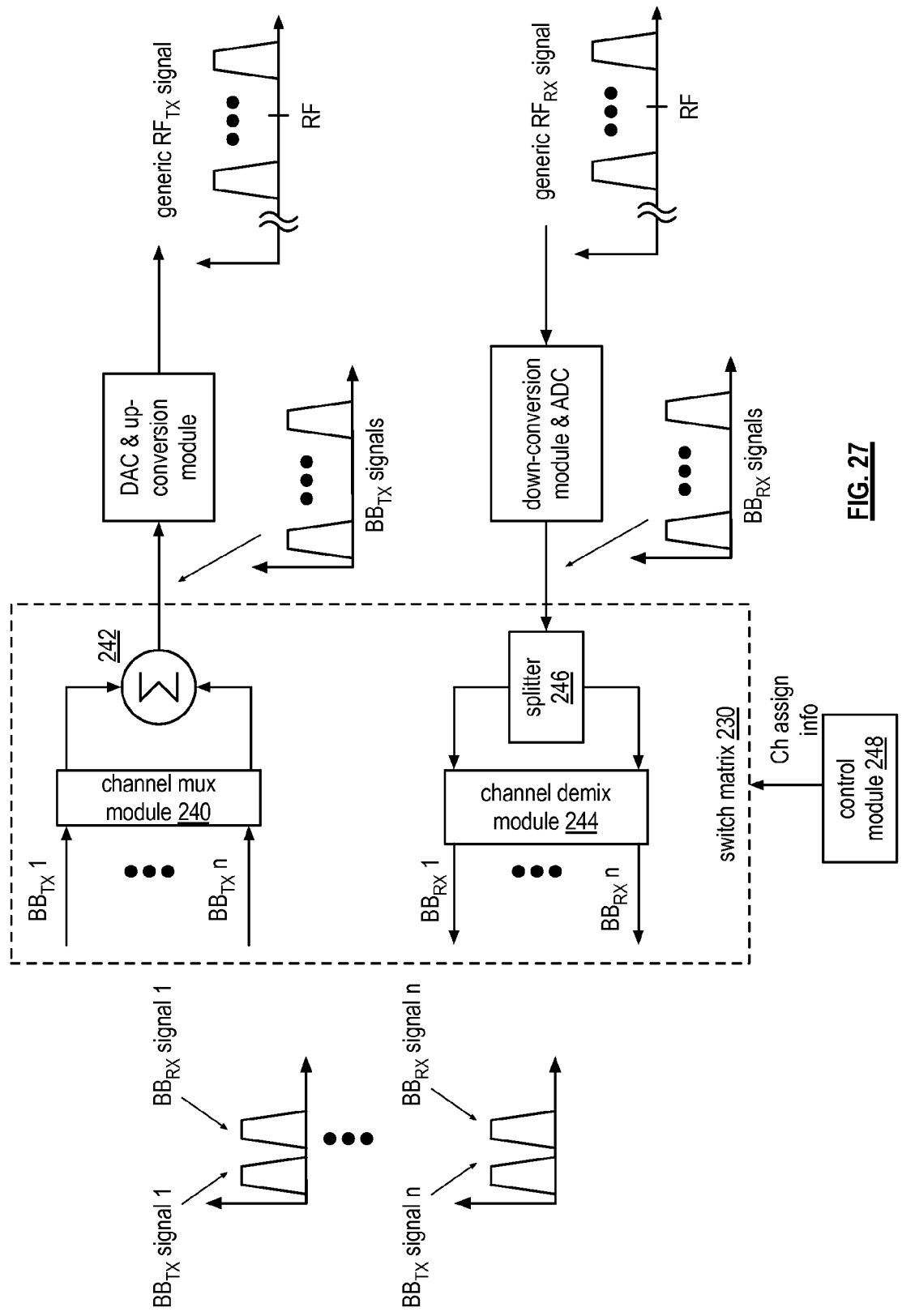
FIG. 27 is a schematic block diagram of an embodiment of switch matrix in accordance with the present invention.

FIG. 27 is a schematic block diagram of an embodiment of switch matrix 230 coupled to the transmit path (e.g., DAC and up-conversion module) and to the receive path (e.g., down-conversion module and ADC). In this embodiment, each of the baseband specific protocol modules outputs its corresponding baseband signal within one of a plurality of baseband channels. As such, each baseband signal is at a different baseband frequency than the other signals. The control module 248 allocates the baseband channels to the plurality of baseband specific protocol modules.

For multiple concurrent outbound baseband signals, the switch matrix 230 includes a channel multiplexing module 240 that outputs the plurality of outbound baseband signals to a summing module 242 that combines them into a composite outbound baseband signal. The transmit path receives the composite outbound baseband signal, where in the up conversion module mixes it with one or more local oscillations. For example, the up conversion module mixes the composite outbound baseband signal (e.g., set of {BBTX_1, . . . BBTX_n}) with a single local oscillation (e.g., LO1; i.e., $\cos(\omega_{RF1})$) and filters it to produce a up-converted signal. Accordingly, the frequency spacing between signal components of the up converted signal is the same frequency spacing that is provided by the baseband channels. If greater frequency spacing is desired for the up converted signal, then the up conversion module mixes the composite outbound baseband signal with a plurality of local oscillations (e.g., LO1, LO2, . . . LOn). Regardless of the local oscillation, or oscillations, used to produce the up converted signal, the outbound amplifier amplifies it and the TX bandpass filter filters it to produce a generic RF link transmit signal.

The generic RF link protocol module receives multiple concurrent inbound signals as a generic RF link receive signal. The receive bandpass filter filters the generic RF link receive signal and the amplifier amplifies it. The down conversion module mixes the filter inbound signal with one or more local oscillations and filters the mixed signal to produce a plurality of inbound signals. Each inbound signal is within an assigned baseband channel and is subject to the converted to a digital signal by the ADC to produce a plurality of inbound baseband signals. The splitter 246 splits the plurality of plurality of inbound baseband signals and the channel demux module 244 provides an inbound baseband signal to the correct BB specific protocol unit 180-182.

Figure 27A:
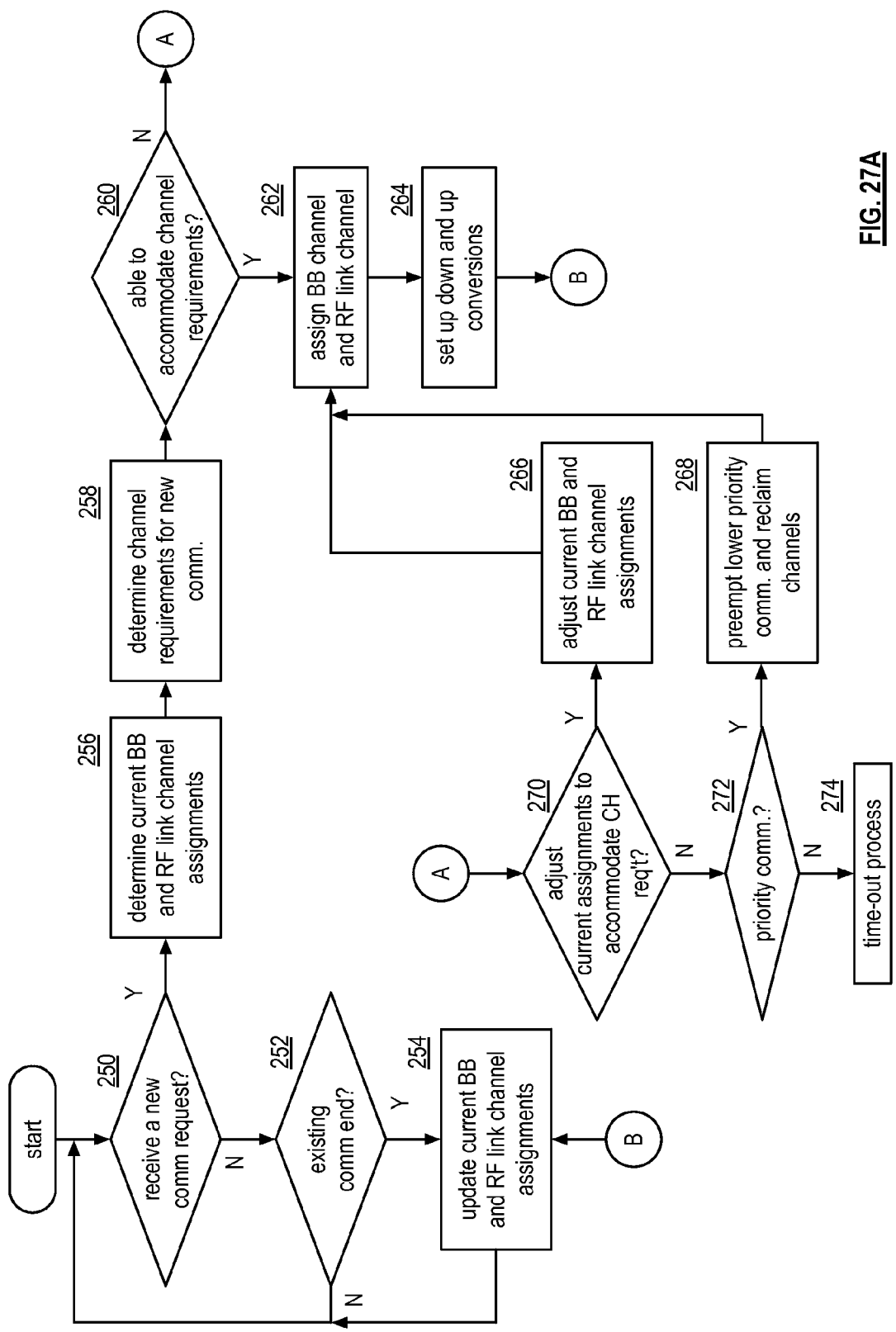
FIG. 27A is a logic diagram of an embodiment of a method of allocating resources within a portable computing device in accordance with the present invention.

FIG. 27A is a logic diagram of an embodiment of a method of allocating resources within a portable computing device that begins at step 250 by determining whether a new communication request has been received. If not, the method continues at step 252 by determining whether an existing communication has ended. If not, the process repeats by waiting for a new communication request or an existing communication to end. If, an existing communication ends, the allocated resources within the core module are reclaimed and the baseband channel assignments and RF link channel assignments are updated accordingly at step 254.

When a new communication request is received, the method continues at step 256 by determining current baseband channel assignments and RF link channel assignments. The method then continues at step 258 by determining the baseband channels and RF link channels required to support the new communication. Factors that affect determining baseband channel and RF link channel requirements include channel isolation, types of communications currently being supported, frequency spacing, transmit requirements, receive requirements, etc.

The method continues at step 260 by determining whether the available channel resources can accommodate the new communication. If yes, the method continues at 262 by assigning one or more baseband channels and one or more RF link channels to the new communication. Note that an assigned channel may be shared for transmit and receive signals (e.g., inbound and outbound baseband signals and inbound and outbound RF link signals) or a channel may be assigned for transmitting and another channel may be assigned for receiving. The method continues at step 264 by setting up the down conversion module and the up conversion module based on the RF link channel assignments and baseband link channel assignments. For example, setting up the conversion modules includes selecting an appropriate local oscillation. The method then continues by updating the current baseband and RF link channel assignments and the process continues as shown.

If, however, the new communication cannot be supported, the method continues at step 270 by determining whether current channel assignments for current communications can be adjusted to accommodate the new communication. If not, the method continues at step 272 by determining whether the new communication has priority over one or more other communications. If not, the new communication waits for channel resources to become available until a timeout process expires at step 274. If, however, the new communication has priority over one or more other communications, the method continues at step 268 by preempting a lower priority communication and reclaiming the channels assigned to it. The method then continues by assigning baseband and RF link channels to the new communication as step 268 and continues as shown.

If, the current assignment of allocated channels can be adjusted, the method continues at step 266 by adjusting the assignment of baseband channels and RF link channels to existing communications to make channels available for the new communication. Having done this, the method continues at step 262 by assigning baseband channels and RF link channels to the new communication and the method continues as shown.

Figure 28:
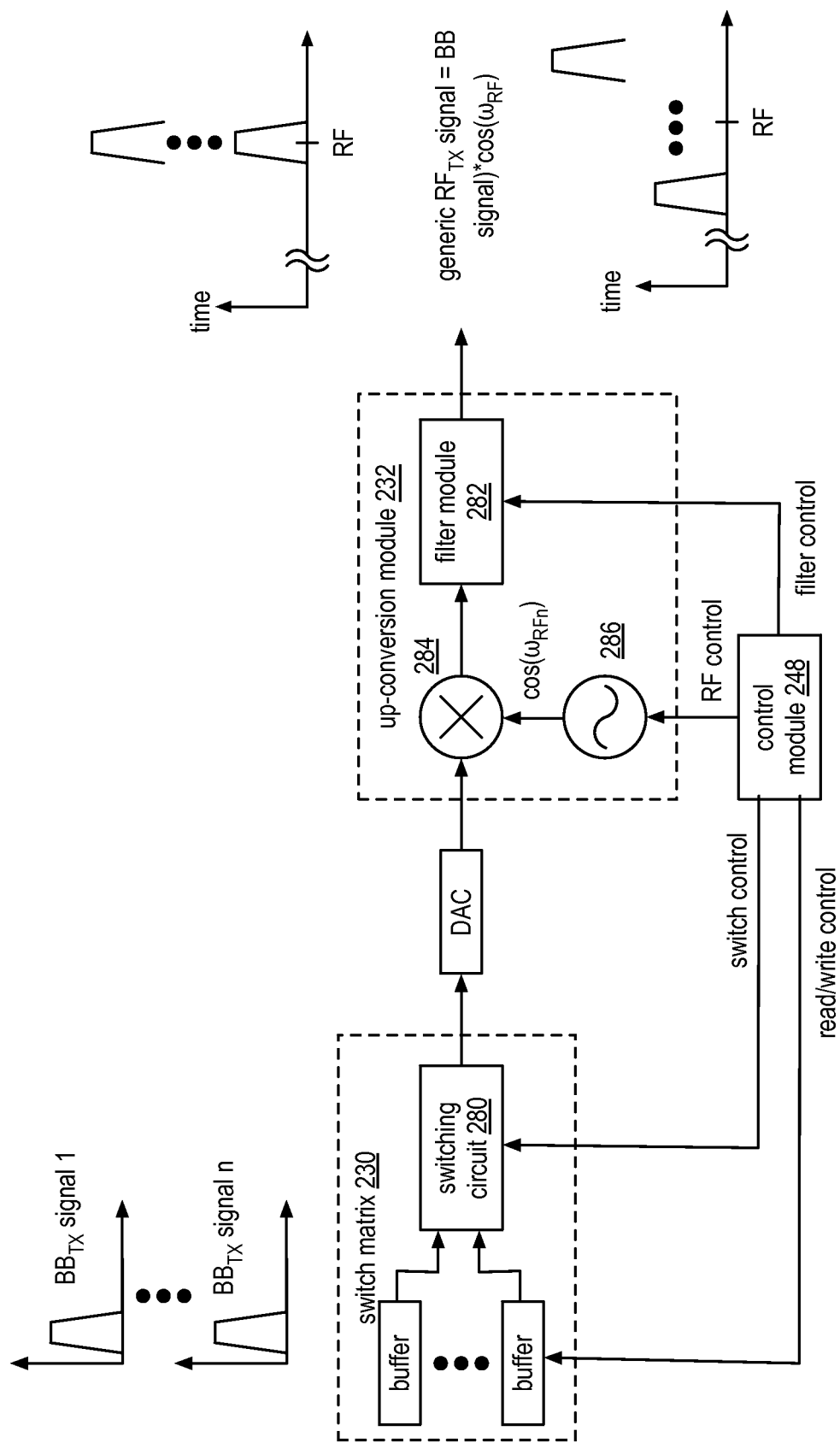
FIG. 28 is a schematic block diagram of an embodiment of switch matrix and up conversion module in accordance with the present invention.

FIG. 28 is a schematic block diagram of an embodiment of switch matrix 230, an up conversion module 232, and a control module 248 within a core module. The switch matrix 230 includes a plurality of buffers and a switching circuit 280. The up-conversion module 232 includes an adjustable oscillator 286, a mixing circuit 284, and a filter module 282.

In an example of operation, one or more buffers of the switch matrix 230 store digital representations of one or more outbound baseband signals (e.g., output of one or more baseband specific protocol modules) in accordance with write control signals from the control module. Each buffer stores one or more packets worth of the outbound baseband signal for its corresponding communication.

Depending on the number of concurrent communications, the priority of them, and the RF link sharing scheme (e.g., first in first out, priority based, etc.), the control module 248 issues read commands to the buffers and a corresponding switch control signal to the switch module. As controlled, the switching circuit 280, which may include a plurality of switches, a switching network, a plurality of multiplexer, etc., outputs the selected outbound baseband signal to the DAC. The DAC converts the selected outbound baseband signal into an analog signal, which it outputs to the up conversion module.

The control module 248 provides an RF control signal to the oscillator 286 to set the local oscillation frequency (cos $(\omega_{RFn})$) for the selected baseband signal. For multiple concurrent communications, the control module 248 may use different local oscillations for one or more of the outbound baseband signals. For example, the control module uses the same local oscillation for each outbound baseband signal. As another example, the control module uses a unique local oscillation for each outbound baseband signal. In yet another example, the control module uses the same local oscillation for some of the outbound baseband signals and uses a unique local oscillation for the other outbound baseband signals.

The mixing module 284 mixes the local oscillation with the selected baseband signal to produce a mixed signal. For example, if the data modulation scheme of the outbound baseband signal is QAM (e.g., $A(t)*\cos(\omega_{BB}+\phi(t))$), then the mixed signal is $\frac{1}{2}A(t)*\cos(\omega_{BB}+\omega_{RFn}+\phi(t))+\frac{1}{2}A(t)*\cos(\omega_{BB}-\omega_{RFn}+\phi(t))$. The filter module 282 attenuates the different term (e.g., $\frac{1}{2}A(t)*\cos(\omega_{BB}-\omega_{RFn}+\phi(t))$) in accordance with a filter control signal (e.g., settings for bandpass region, gain, attenuation rate, etc.) from the control module and passes the sum term (e.g., $\frac{1}{2}A(t)*\cos(\omega_{BB}+\omega_{RFn}+\phi(t))$). If the gain setting of the control signal is two, then the filter module outputs $A(t)*\cos(\omega_{BB}+\omega_{RFn}+\phi(t))$ as the outbound RF link signal. As an alternative to polar coordinates for the outbound baseband signal and local oscillation, Cartesian coordinates or hybrid coordinates may be used.

Figure 29:
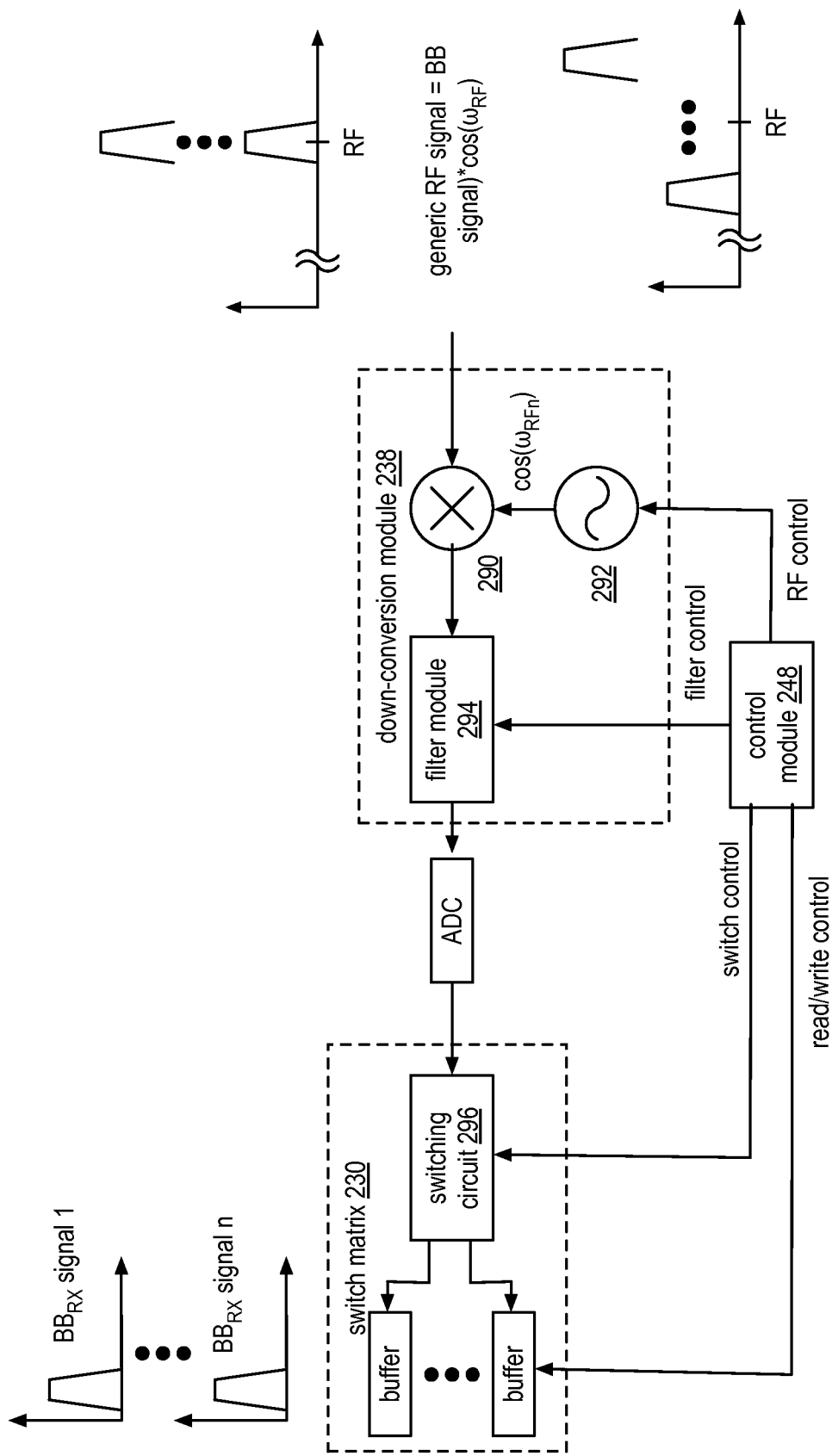
FIG. 29 is a schematic block diagram of an embodiment of switch matrix and down conversion module in accordance with the present invention.

FIG. 29 is a schematic block diagram of an embodiment of switch matrix 230, a down conversion module 238, and a control module 248 within a core module. The switch matrix 230 includes a plurality of buffers and a switching circuit 296. The down conversion module 238 includes an adjustable oscillator 292, a mixing circuit 290, and a filter module 294.

In an example of operation, the mixing module 290 receives an inbound RF link signal within a given time interval of an RF link sharing protocol. The inbound RF link signal has a carrier frequency (e.g., $\cos(\omega_{RFn})$) at a particular RF link frequency. The control module 248 generates an RF control signal to set the frequency of the oscillator to the carrier frequency of the inbound RF link signal to produce a local oscillation. Note that the down conversion module 238 may further include a bandpass filter, prior to mixing module, to filter the inbound RF link signal.

The mixing module 290 mixes the local oscillation with the inbound RF link signal to produce a mixed signal. For example, if the data modulation scheme of the inbound RF link signal baseband signal is QAM (e.g., $A(t)*\cos(\omega_{RF}+\omega_{BB}+\phi(t))$), then the mixed signal is $\frac{1}{2}A(t)*\cos(\omega_{RF}+\omega_{BB}+\omega_{LO}+\phi(t))+\frac{1}{2}A(t)*\cos(\omega_{LO}+\omega_{BB}-\omega_{RFn}+\phi(t))$. The filter module 294 attenuates the sum term (e.g., $\frac{1}{2}A(t)*\cos(\omega_{RF}+\omega_{BB}+\omega_{LO}+\phi(t))$) in accordance with a filter control signal (e.g., settings for bandpass region, gain, attenuation rate, etc.) from the control module 248 and passes the difference term (e.g., $\frac{1}{2}A(t)*\cos(\omega_{RF}+\omega_{BB}-\omega_{LO}+\phi(t))$). If the gain setting of the control signal is two, then the filter module 294 outputs $A(t)*\cos(\omega_{BB}+\phi(t))$. As an alternative to polar coordinates for the inbound RF link signal and local oscillation, Cartesian coordinates or hybrid coordinates may be used.

The ADC converts the inbound baseband signal from the analog domain to the digital domain. The switching circuit 296 routes the digital inbound baseband signal to a buffer in accordance with a switch control signal. The buffer stores the digital inbound baseband signal in accordance with a write command from the controller and outputs it to a corresponding baseband specific protocol module in accordance with a read command from the control module.

Figure 30:
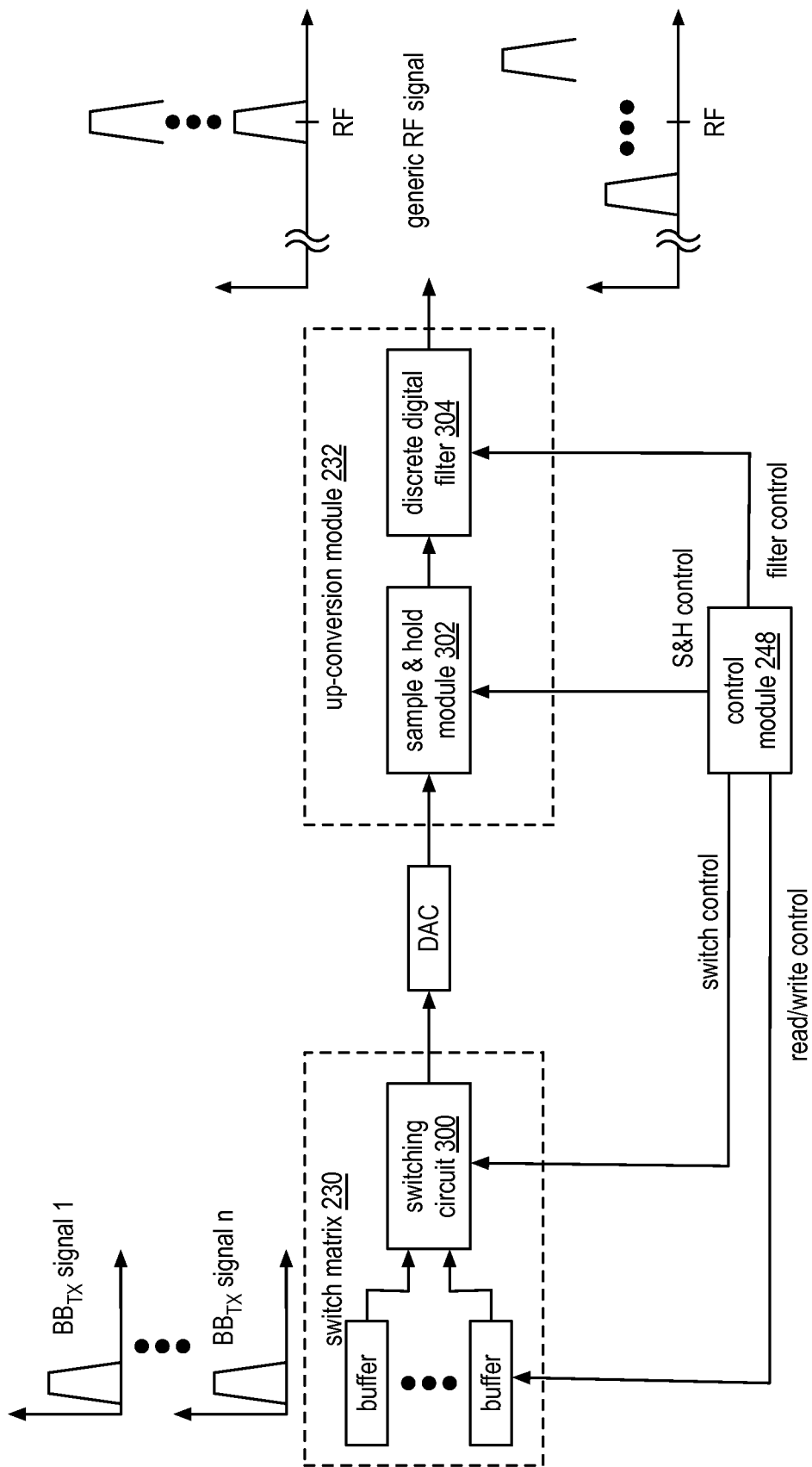
FIG. 30 is a schematic block diagram of another embodiment of switch matrix and up conversion module in accordance with the present invention.

FIG. 30 is a schematic block diagram of an embodiment of switch matrix 230, an up conversion module 232, and a control module 248 within a core module. The switch matrix 230 includes a plurality of buffers and a switching circuit 300 and operates as previously discussed with reference to FIG. 28. The up-conversion module 232 includes a sample and hold module 302 and a discrete digital filter 304.

In an example of operation, the sample and hold module 302 receives an outbound baseband signal (e.g., $A(t)*\cos(\omega_{BB}+\phi(t))$) from the DAC and samples & holds it in accordance with S&H control signals (e.g., sample rate, sample frequency, hold rate, hold frequency, etc.) from the control module to produce a frequency domain pulse train (e.g., $A(t)*\cos(\omega_{BB}+\phi(t))+A(t)*\cos(\omega_{RF}+\omega_{BB}+\Phi(t))+A(t)*\cos(2*\omega_{RF}+\omega_{BB}+\Phi(t))+A(t)*\cos(3*\omega_{RF}+\omega_{BB}+\Phi(t))+\ldots$). The discrete digital filter 304 (e.g., a programmable FIR (finite impulse response) filter and/or a programmable IIR (infinite impulse response) filter) filters the frequency domain pulse train in accordance with a filter control signal (e.g., settings for bandpass region, gain, attenuation rate, etc.) to produce an outbound frequency pulse at RF (e.g., $A(t)*\cos(\omega_{RF}+\omega_{BB}+\Phi(t))$). The outbound frequency pulse at RF is outputted on to the RF link as the outbound RF link signal.

Figure 31:
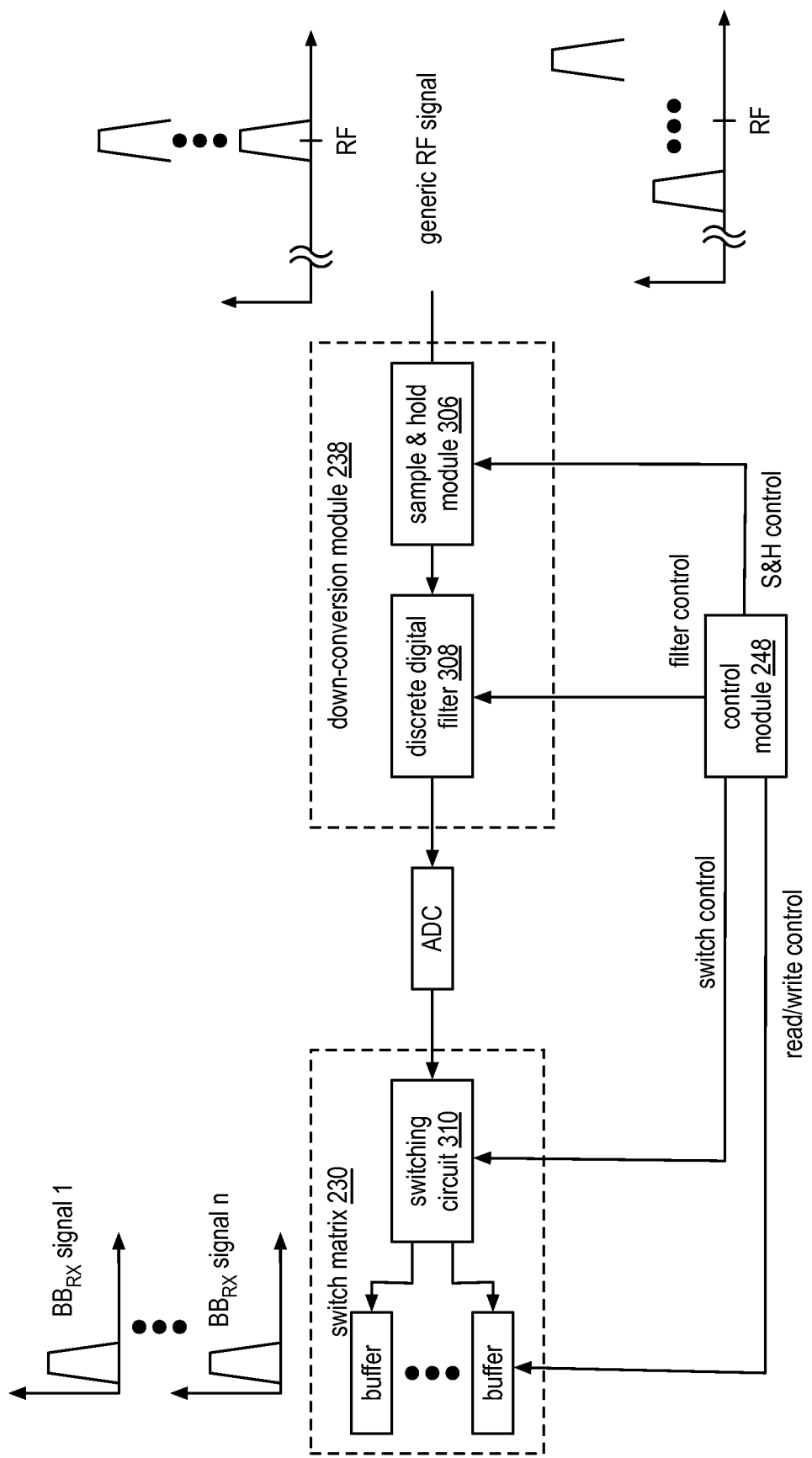
FIG. 31 is a schematic block diagram of an embodiment of switch matrix and down conversion module in accordance with the present invention.

FIG. 31 is a schematic block diagram of an embodiment of switch matrix 230, a down conversion module 238, and a control module 248 within a core module 30. The switch matrix 230 includes a plurality of buffers and a switching circuit 310 and operates as previously discussed with reference to FIG. 29. The down conversion module 238 includes a sample and hold module 306 and a discrete digital filter 308.

In an example of operation, the sample and hold module 306 receives an inbound RF link signal (e.g., $A(t)*\cos(\omega_{RF}+\omega_{BB}+\Phi(t))$) from the RF link and samples & holds it in accordance with S&H control signals (e.g., sample rate, sample frequency, hold rate, hold frequency, etc.) from the control module to produce a frequency domain pulse train (e.g., $\ldots+A(t)*\cos(\omega_{RF}-X\omega_{2*FS}+\omega_{BB}+\Phi(t))+\ldots+A(t)*\cos(\omega_{RF}+\omega_{BB}+\Phi(t))+A(t)*+A(t)*\cos(\omega_{RF}+X\omega_{2*FS}+\omega_{BB}+\Phi(t))\ldots$), where X is an integer greater than or equal to 1 and FS is the sampling frequency. The discrete digital filter 308 (e.g., a programmable FIR (finite impulse response) filter and/or a programmable IIR (infinite impulse response) filter) filters the frequency domain pulse train in accordance with a filter control signal (e.g., settings for bandpass region, gain, attenuation rate, etc.) to produce an inbound baseband signal (e.g., $A(t)*\cos(\omega_{RF}-X_{\omega 2*FS}+\omega_{BB}+\phi(t))=A(t)*\cos(\omega_{BB}+\phi(t))$, where $\omega_{RF}=X\omega_{2*FS}$). The inbound baseband signal is outputted to the ADC.

Figure 31A:
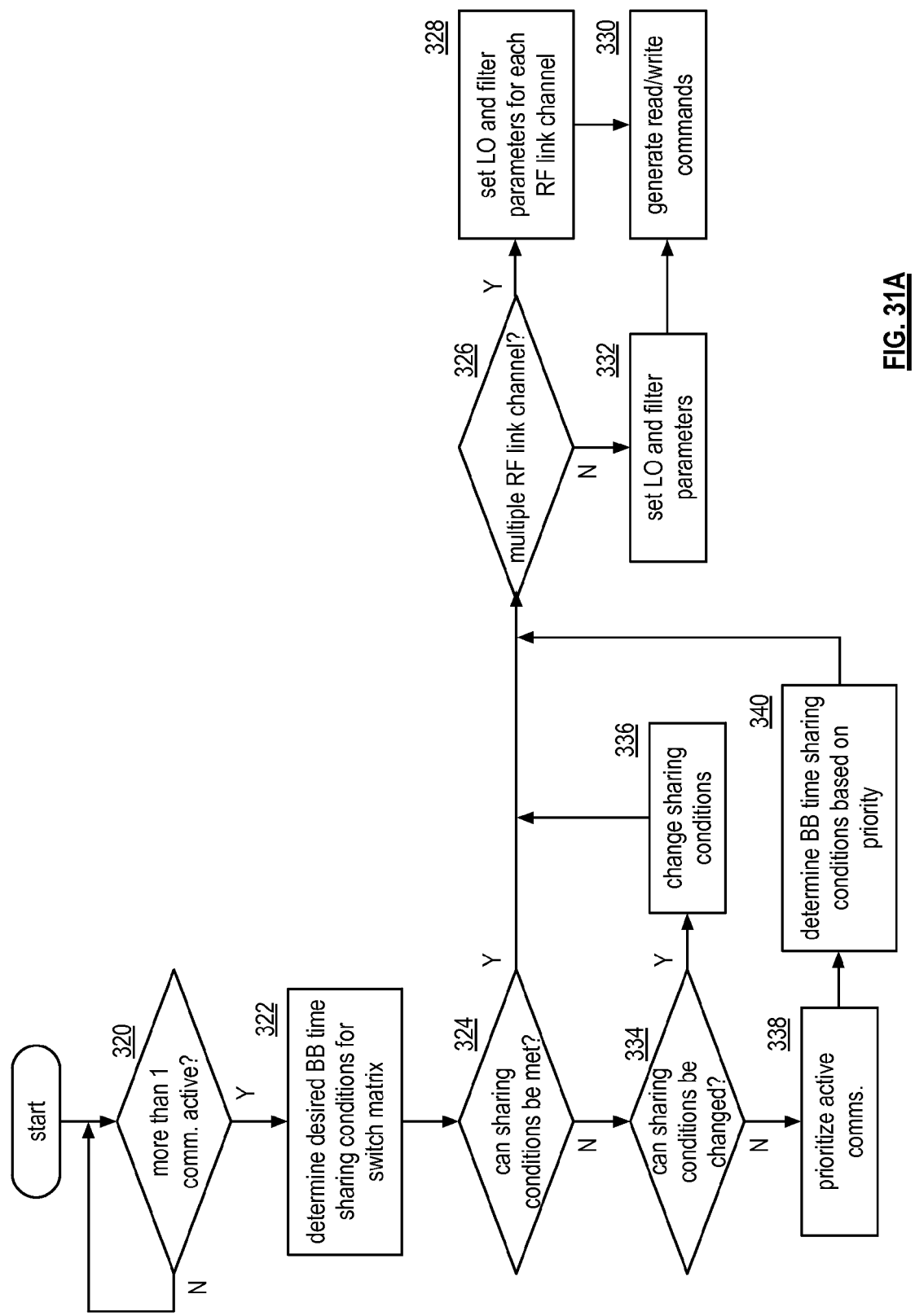
FIG. 31A is a logic diagram of another embodiment of a method of allocating resources within a portable computing device in accordance with the present invention.

FIG. 31A is a logic diagram of another embodiment of a method of allocating resources within a portable computing device that may be performed by the control module of FIGS. 28-31. The method begins at step 320 by determining whether more than one communication is active. If yes, the method continues at step 322 by determining desired baseband time sharing conditions for the switch matrix. For example, the time sharing conditions include bandwidth requirements for each of the active communications, the type of communication (e.g., real-time or non-real-time communication), priority levels of the communications, data rate requirements, etc.

The method continues at step 324 by determining whether the desired baseband time sharing conditions can be met. If yes, the method continues at step 326 by determining whether multiple RF link channels will be used for the various communications. In other words, determining whether a single channel will be used to support the communications or whether multiple channels will be used to support the communications. If multiple RF link channels are to be used, the method continues at step 328 by setting the local oscillation and filter parameters for each RF link channel corresponding to the current baseband signal being processed. The method continues at step 330 by generating the appropriate read and write commands for the buffers and switch control signals for the switching circuit. If a single channel of the RF link is to be used, the method continues at step 322 by sending the local oscillation and filter parameters for the single channel and the method continues as shown.

If the baseband time sharing conditions cannot be met, the method continues at step 324 by determining whether the desired baseband time sharing conditions can be changed (e.g., change bandwidth requirements, change data rate requirements, change channel separation, etc.). If yes, the method continues at step 336 by changing the baseband time sharing conditions and continues as shown. If not, the method continues at steps 338 & 340 by prioritizing the active communications and determining the baseband timesharing conditions based on the priorities.

Figure 32:
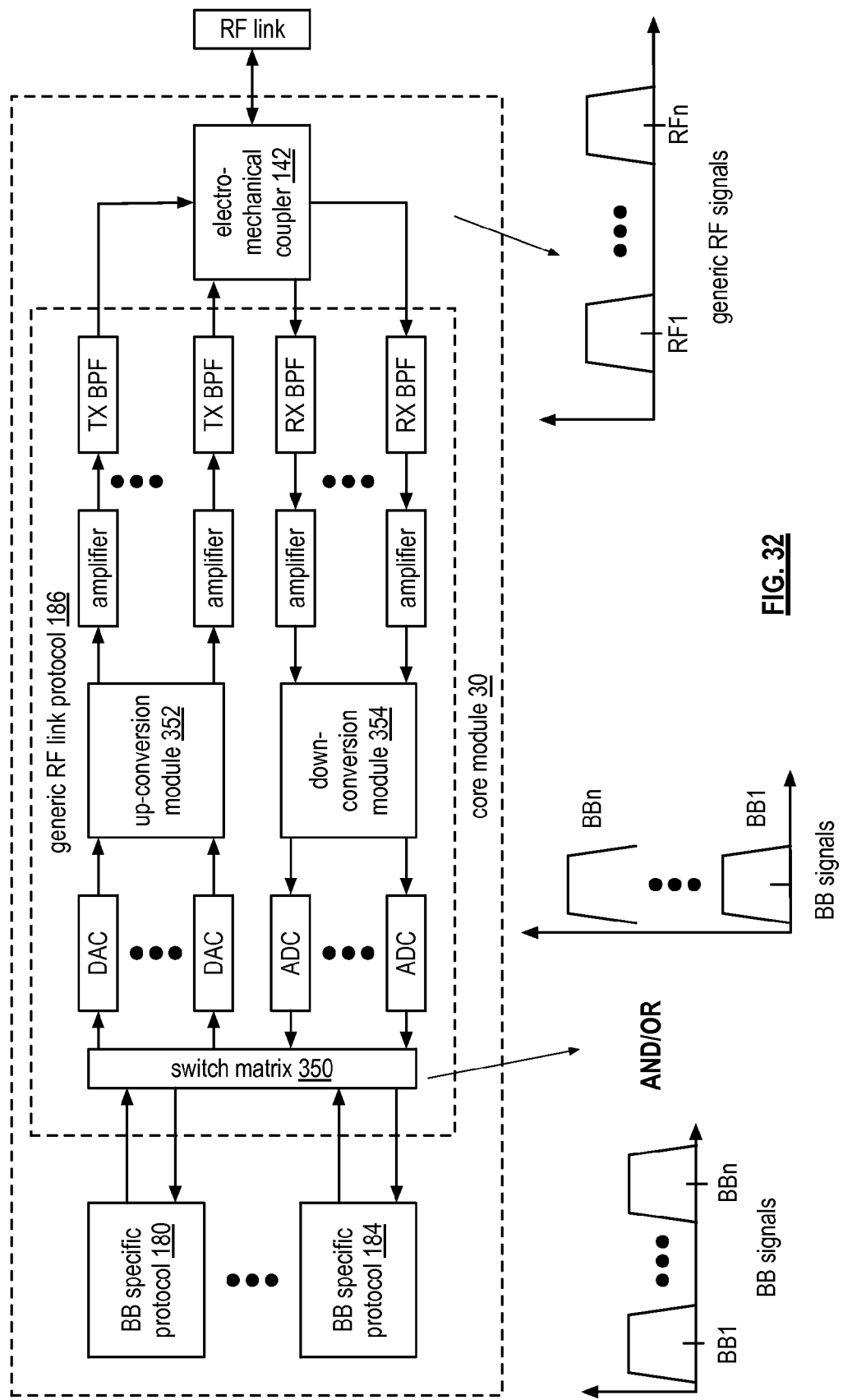
FIG. 32 is a schematic block diagram of another embodiment of core module in accordance with the present invention.

FIG. 32 is a schematic block diagram of an embodiment of core module 30 that includes a plurality of baseband (BB) specific protocol modules 180-184, a generic RF link protocol module 186, and the electro-mechanical coupler 142. The generic RF link protocol module 186 includes a switch matrix 350, a plurality of digital to analog converters (DAC), an up-conversion module 352, a plurality of outbound amplifiers, a plurality of transmit (TX) bandpass filters (BPF), a plurality of receive (RX) BPF, a plurality of inbound amplifiers, a down-conversion module 354, and a plurality of analog to digital converters (ADC).

In an example of operation, one or more of the baseband specific protocol modules 180-184 generates a baseband signal. The switch matrix 350 arbitrates access among the baseband specific protocol modules to one of the transmit paths (e.g., one of the DACs, the up conversion module, one of the outbound amplifiers, and one of the TX bandpass filters) and/or to one of the receive paths (e.g., one of the RX bandpass filters, one of the inbound amplifiers, the down conversion module, and one of the ADCs). The switch matrix 350 may use a static scheme (fixed allocation of a BB specific protocol module to a specific transmit path and a specific receive path) or a dynamic scheme (allocate a BB specific protocol module to a transmit path and receive path as needed) to regulate access to the transmit and receive paths.

For each transmit path that receives an outbound baseband signal, the DAC converts it into an analog signal. The up conversion module 352, which may be shared or include a plurality of up conversion modules, mixes the analog baseband signal with a specific local isolation (e.g., $\cos(\omega_{RFn})$, which corresponds to the assigned RF Link channel) and filters it to produce an up converted signal (e.g., (BB signal)*$\cos(\omega_{RF})$). The outbound amplifier amplifies the converted signal, which is then filtered by the TX bandpass filter to produce an RF link outbound signal. The electro-mechanical coupler transmits the RF link outbound signal onto the RF link.

For each RF link inbound signal, the electro-mechanical coupler receives the signal from the RF link and provides it to the corresponding receive baseband filter. The receive baseband filter filters the RF link inbound signal, which is then amplified by the inbound amplifier. The down conversion module 354, which may be shared or include a plurality of down conversion modules, mixes the filtered RF link inbound signal (e.g., (BB signal)*$\cos(\omega_{RF})$) with a specific receive local oscillation (e.g., $\cos(\omega_{RF})$, which corresponds to the assigned RF Link channel) and filters it to produce a down converted signal (e.g., $A(t)\cos(\omega_1+\Phi(t))$; or $A_1(t)\cos(\omega_1+\phi_1(t))+A_2(t)\cos(\omega_1+\phi_2(t))+\ldots$). The ADC converts the down converted signal into the inbound baseband signal.

Figure 33:
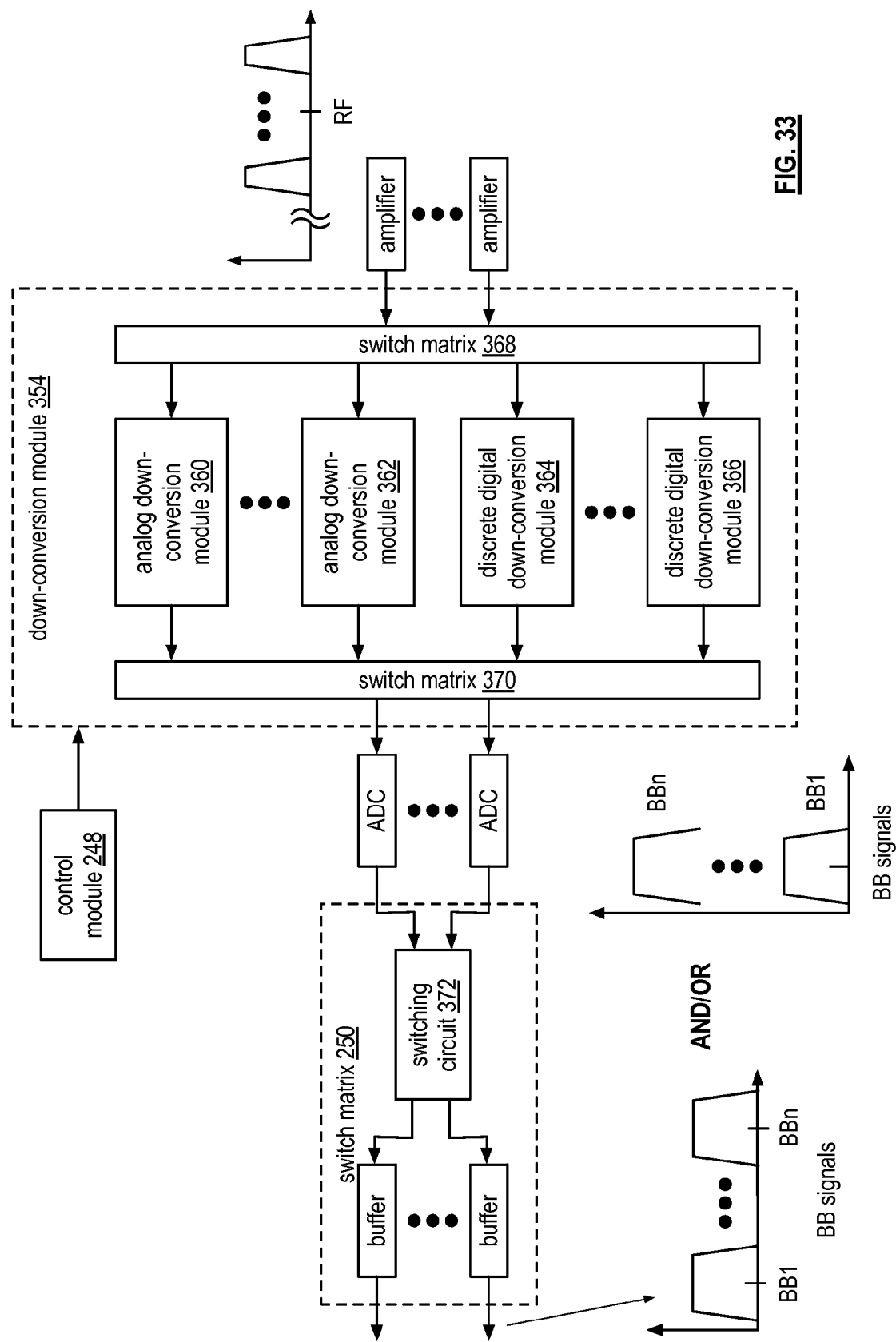
FIG. 33 is a schematic block diagram of an embodiment of switch matrix and down conversion module in accordance with the present invention.

FIG. 33 is a schematic block diagram of an embodiment of switch matrix 350, a down conversion module 354, a plurality of ADCs, and a control module 248 of the core module 30. The switch matrix 250 includes a plurality of buffers and a switching circuit 372. The down conversion module 354 includes a RF switch matrix 368, a BB switch matrix 370, and a plurality of down conversion modules 360-366 (e.g., one or more analog down conversion modules (e.g., FIG. 29), one or more discrete digital conversion modules (e.g., FIG. 31), and/or a combination thereof).

The control module 248 selects a specific down conversion module for a specific communication and provides control signals to the BB and RF switch matrix 368 and 370 to route the inbound signals therebetween. The control module 248 further functions as previously discussed to control the switch matrix and to allocate receive paths to the BB specific protocol modules.

Figure 34:
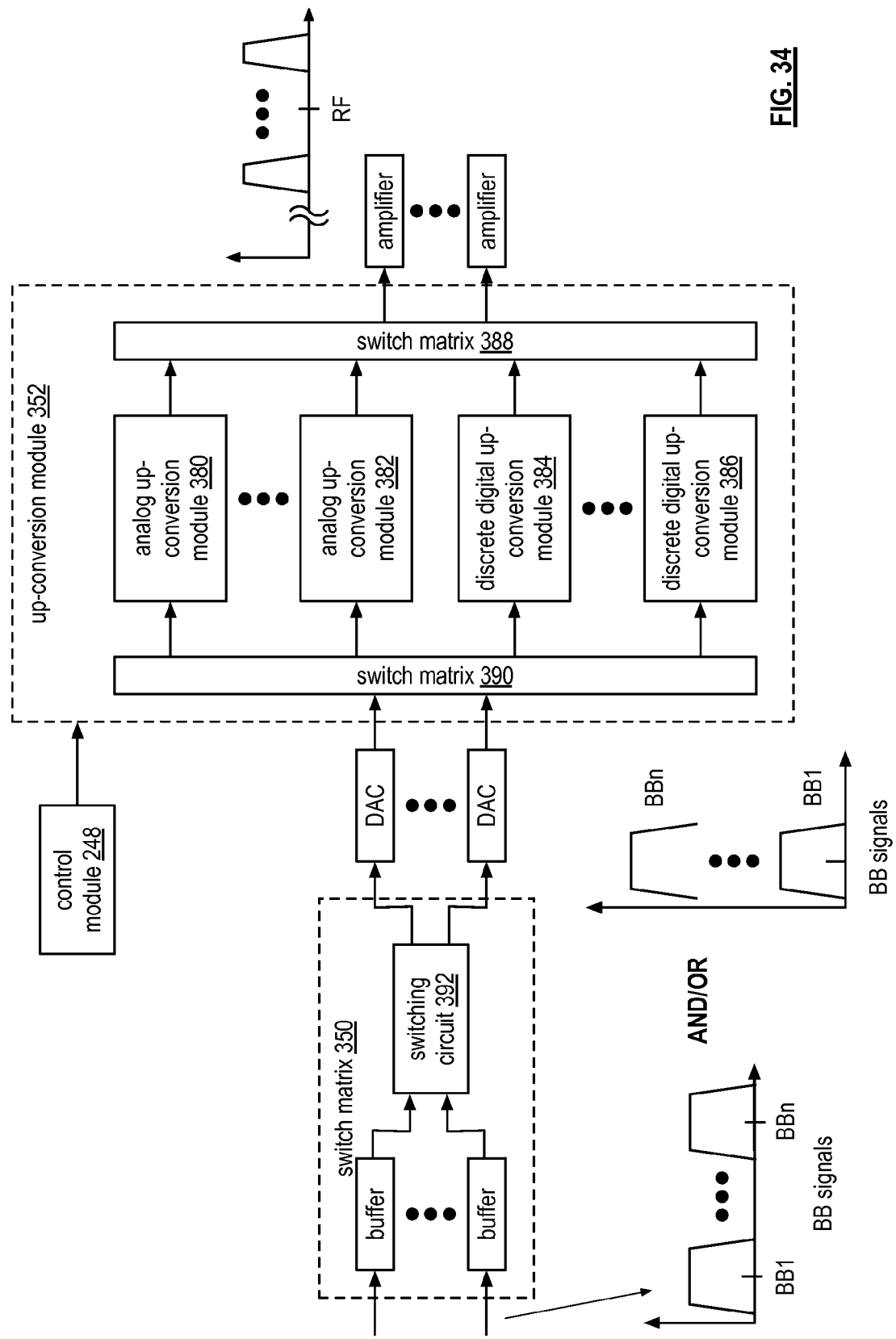
FIG. 34 is a schematic block diagram of another embodiment of switch matrix and up conversion module in accordance with the present invention.

FIG. 34 is a schematic block diagram of an embodiment of switch matrix 350, an up conversion module 352, a plurality of DACs, and a control module 248 of the core module 30. The switch matrix 350 includes a plurality of buffers and a switching circuit 392. The up conversion module 352 includes a RF switch matrix 388, a BB switch matrix 390, and a plurality of up conversion modules 380-386 (e.g., one or more analog up conversion modules (e.g., FIG. 28), one or more discrete digital up conversion modules (e.g., FIG. 30), and/or a combination thereof).

The control module 248 selects a specific up conversion module for a specific communication and provides control signals to the BB and RF switch matrix 388 and 390 to route the outbound signals therebetween. The control module 248 further functions as previously discussed to control the switch matrix and to allocate transmit paths to the BB specific protocol modules.

Figure 35:
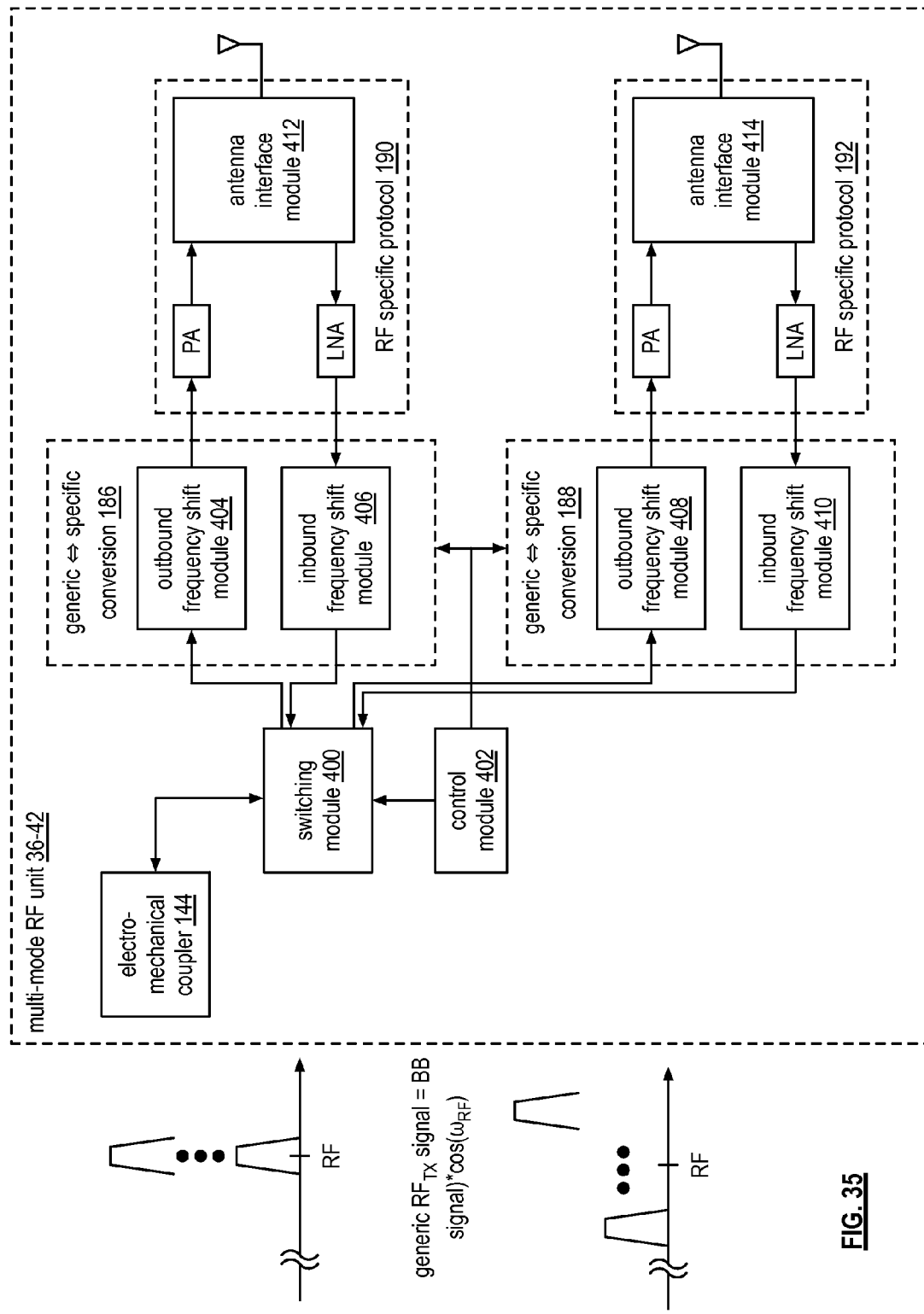
FIG. 35 is a schematic block diagram of an embodiment of multi-mode RF unit in accordance with the present invention.

FIG. 35 is a schematic block diagram of an embodiment of multi-mode RF unit 36-42 that includes the electro-mechanical coupler 144, a switch module 400, a control module 402, a plurality of generic/specific conversion modules 186-188, and a plurality of RF specific protocol modules 190-192. Each of the generic/specific conversion modules 186-188 includes an outbound frequency shift module 404, 408 and an inbound frequency shift module 406, 410. Each of the RF specific protocol modules 190-192 includes a power amplifier (PA), a low noise amplifier (LNA), and an antenna interface module 412, 414 coupled to an antenna structure (e.g., one or more antennas).

In an example of operation of transmitting one or more outbound communications, the multi-mode (MM) RF unit 36-42 receives one or more RF link signals on the same channel, or on different channels, in a time sharing fashion. As such, the MM RF unit receives one outbound communication at a time, where the outbound communication includes one or more packets (or frames) of outbound data. The switching module 400, which includes a switch network, a demultiplexor, etc., routes the outbound RF link signal to the outbound frequency shift module of one of the generic/specific conversion modules 186-188 in accordance with a control signal from the control module.

The outbound frequency shift module 404, 408 includes a direct up-conversion module (e.g., analog or discrete digital), a direct down-conversion module (e.g., analog or discrete digital), and/or a programmable conversion module (e.g., analog or discrete digital). In addition, the outbound frequency shift module may have a Cartesian-based topology, a polar-based topology, or a hybrid frequency polar-based topology.

In a Cartesian-based topology, the outbound frequency shift module receives the outbound RF link signal as in-phase (I) and quadrature (Q) components (e.g., $A_I(t)\cos(\omega_{RFL}+\omega_{BB}(t)+\phi_I(t))$ and $A_Q(t)\cos(\omega_{RFL}+\omega_{BB}(t)+\phi_Q(t))$, respectively, where $\omega_{RFL}$ corresponds to the RF link channel frequency) and converts the outbound RF link signal into up-converted signals (e.g., $A(t)\cos(\omega_{RFL}+\omega_{BB}(t)+\phi(t))+\omega_{MMRF})$) or into a down converted signal (e.g., $A(t)\cos(\omega_{RFL}+\omega_{BB}(t)+\phi(t))-\omega_{MMRF})$), where $\omega_{MMRF}$ corresponds to the different between the RF link channel frequency and the desired frequency of the outbound RF signal. For example, the I and Q components of the outbound RF link signal are mixed with in-phase and quadrature components (e.g., $\cos(\omega_{MMRF})$ and $\sin(\omega_{MMRF})$, respectively) of a MM RF unit transmit local oscillation (TX LO) to produce mixed signals. One or more filters of the outbound frequency shift module filter the mixed signals to produce the up-converted signals or the down-converted signals. The PA of the corresponding RF specific protocol module amplifies the outbound up- (or down-) converted signal(s) and provides it to the antenna interface module for transmission as the outbound RF signal(s). The antenna interface module includes one or more a transformer balun, a TX/RX isolation module (e.g., a duplexer, a circulator, a splitter, etc.), an impedance matching circuit, an antenna tuning unit, and a transmission line.

In a phase polar-based topology, the outbound frequency shift module receives the outbound RF link signal in polar coordinates (e.g., $A(t)\cos(\omega_{RFL}+\phi(t))$ or $A(t)\cos(\omega_{RFL}+/-\Delta\phi)$). In an example, the outbound frequency shift module includes an oscillator that produces an oscillation (e.g., $\cos(\omega_{MMRF}(t))$ that is adjusted based on the phase information (e.g., $+/-\Delta\phi$ [phase shift] and/or $\phi(t)$ [phase modulation]) of the outbound RF link signal(s). The resulting adjusted oscillation (e.g., $\cos(\omega_{MMRF}(t)+/-\Delta\phi)$ or $\cos(\omega_{MMRF}(t)+\phi(t))$) may be further adjusted by amplitude information (e.g., A(t) [amplitude modulation]) of the outbound RF link signal(s) to produce one or more up-(or down-) converted signals (e.g., $A(t)\cos(\omega_{RF}(t)+\phi(t))$ or $A(t)\cos(\omega_{RF}(t)+/-\Delta\phi)$). The PA of the corresponding RF specific protocol module amplifies the outbound up- (or down-) converted signal(s) and provides it to the antenna interface module for transmission as the outbound RF signal(s).

In a frequency polar-based topology, the outbound frequency shift module receives the outbound RF link signal in frequency-polar coordinates (e.g., $A(t)\cos(\omega_{RFL}(t)+f(t))$ or $A(t)\cos(\omega_{BRFL}(t)+/-\Delta f)$). In an example, the outbound frequency shift module includes an oscillator that produces an oscillation (e.g., $\cos(\omega_{RF}(t))$ this is adjusted based on the frequency information (e.g., $+/-\Delta f$ [frequency shift] and/or $f(t)$) [frequency modulation]) of the outbound RF link signal(s). The resulting adjusted oscillation (e.g., $\cos(\omega_{RF}(t)+/-\Delta f)$ or $\cos(\omega_{RF}(t)+f(t))$) may be further adjusted by amplitude information (e.g., A(t) [amplitude modulation]) of the outbound RF link signal(s) to produce one or more up- (or down-) converted signals (e.g., $A(t)\cos(\omega_{RF}(t)+f(t))$ or $A(t)\cos(\omega_{RF}(t)+/-\Delta f)$). The PA of the corresponding RF specific protocol module amplifies the outbound up- (or down-) converted signal(s) and provides it to the antenna interface module for transmission as the outbound RF signal(s).

For incoming communications, the antenna assembly coupled to one of the RF specific protocol modules receives one or more inbound RF signals and provides it to the RF specific protocol module. Each of the RF specific protocol modules further includes one or more low noise amplifiers and/or one or more inbound RF bandpass filters. If included, the inbound RF bandpass filter filters the inbound RF signal, which may then be amplified by the low noise amplifier. The amplified inbound RF signal(s) is provided to the corresponding generic to specific conversion module.

The inbound frequency shift module of a generic/specific conversion module converts the inbound RF signal(s) into an inbound RF link signal. For example, the inbound frequency shift module includes a direct up-conversion module (e.g., analog or discrete digital), a direct down-conversion module (e.g., analog or discrete digital), and/or a programmable conversion module (e.g., analog or discrete digital). In addition, the inbound frequency shift module may have a Cartesian-based topology, a polar-based topology, or a hybrid frequency polar-based topology, which have been previously discussed. The inbound frequency shift module outputs the inbound RF link signal on to the RF link.

Figure 35A:
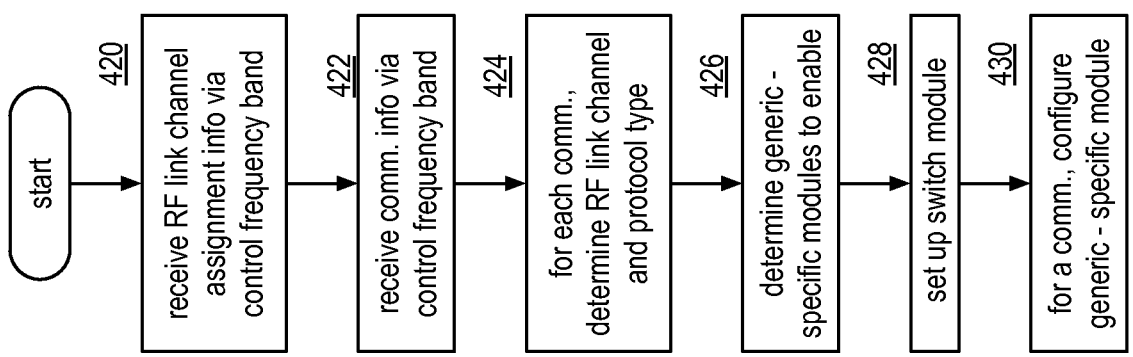
FIG. 35A is a logic diagram of an embodiment of a method of allocating resources within an MM RF unit of a portable computing device in accordance with the present invention.

FIG. 35A is a logic diagram of an embodiment of a method of allocating resources within an MM RF unit. The method begins at step 420 with the control module of a multimode RF unit receiving RF link channel assignment information (e.g., number of channels of the RF link, channel bandwidth, channel spacing, etc.) via the control frequency band. The method continues at step 422 with the multi-mode RF unit receiving communication information (e.g., type of communications, RF link channel assignments, etc.) via the control frequency band. The method continues at step 424 with the control module determining, for each communication, RF link channel assignment and the communication protocol type based on the channel assignment information and the communication information.

The method continues at step 426 with the control module determining which generic/specific control modules to enable to support the specific communications. The method then continues at step 428 with the control module setting up the switching module to couple the identified generic/pacific control modules to receive/transmit the appropriate communications via the RF link. The method then continues at step 430 with the control module configuring the generic/specific module for each communication (e.g., setting up an outbound up or down conversion, setting up an inbound up or down conversion, etc.).

Figure 35B:
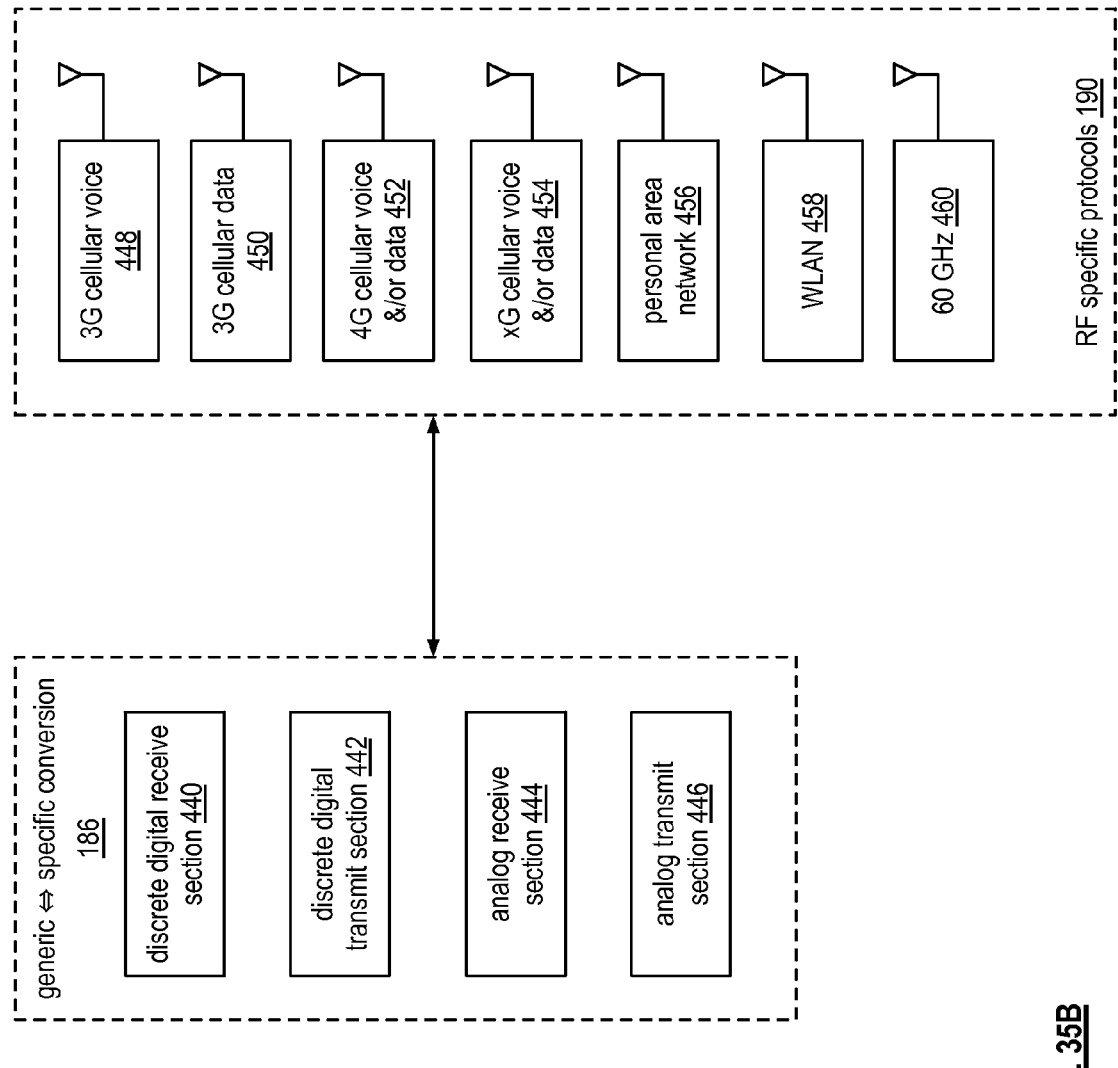
FIG. 35B is a schematic block diagram of another embodiment of a multi-mode RF unit in accordance with the present invention.

FIG. 35B is a schematic block diagram of an embodiment of a portion of a multi-mode RF unit 36-42 that includes a generic/specific conversion module 186 and an RF specific protocol module 190. The generic/specific conversion module 186 includes one or more of a discrete digital receive section 440, a discrete digital transmit section 442, an analog receive section 44, and/or an analog transmit section 446 to perform one or more of the functions of the generic/specific conversion module previously discussed. The RF specific protocol module 190 may be programmable to perform one or more of a plurality of RF specific communication protocols and/or may be of a static implementation to perform one or more of the plurality of RF specific communication protocols. The RF specific communication protocols includes 3G cellular voice 448, 3G cellular data 450, 4G cellular voice & data 452, next generations cellular voice and/or data 454, personal area network 456 (e.g., Bluetooth, ZigBee, etc.), a wireless local area network 458 (WLAN) (e.g., IEEE 8021.11x), and a 60 GHz data transfer protocol 460.

FIG. 36 is a diagram of an example of an up frequency shift from an RF link frequency to an RF communication frequency. In this example, the outbound frequency shift module 404, 408 of a generic/specific conversion module converts an outbound RF link signal to an outbound RF signal, where carrier frequency of the outbound RF signal is greater than the carrier frequency of the outbound RF link signal.

FIG. 37 is a diagram of an example of a down frequency shift from an RF link frequency to an RF communication frequency. In this example, the outbound frequency shift module 404, 408 of a generic/specific conversion module converts an outbound RF link signal to an outbound RF signal, where carrier frequency of the outbound RF signal is less than the carrier frequency of the outbound RF link signal.

FIG. 38 is a schematic block diagram of an embodiment of an analog outbound frequency shift module 404, 408 of a generic/specific conversion module coupled to a control module. The analog outbound frequency shift module includes a mixing module 472, an oscillator 470, and a filter module.

For an up conversion of the outbound RF link signal to the outbound RF signal, the control module 402 generates an RF control signal and a filter control signal. The oscillator 470 generates an oscillation in accordance with the RF control signal. The mixing module 472 mixes the outbound RF link signal (e.g., $A_f(t)\cos(\omega_{RFL}+\omega_{BB}(t)+\phi_f(t))$ with the local oscillation (e.g., $\omega_{MMRF}$) to produce a mixed signal (e.g., $\frac{1}{2}A(t)\cos(\omega_{RFL}+\omega_{BB}(t)+\phi(t))+\omega_{MMRF})+\frac{1}{2}A(t)\cos(\omega_{RFL}+\omega_{BB}(t)+\phi(t))-\omega_{MMRF}))$. The filter module filters the mixed signal in accordance with the filter control signal to attenuate the different component and pass the sum component (and optionally with gain). As such, the filter module outputs the up-converted RF signal (e.g., $A(t)\cos(\omega_{RFL}+\omega_{BB}(t)+\phi(t))+\omega_{MMRF}))$.

For down conversion of the outbound RF link signal to the outbound RF signal, the control module 402 generates an RF control signal and a filter control signal. The oscillator 470 generates an oscillation in accordance with the RF control signal. The mixing module 472 mixes the outbound RF link signal with the local oscillation to produce a mixed signal (e.g., $\frac{1}{2}A(t)\cos(\omega_{RFL}+\omega_{BB}(t)+\phi(t))+\omega_{MMRF})+\frac{1}{2}A(t)\cos(\omega_{RFL}+\omega_{BB}(t)+\phi(t))-\omega_{MMRF}))$. The filter module filters the mixed signal in accordance with the filter control signal to attenuate the sum component and pass the difference component (and optionally with gain). As such, the filter module outputs the down-converted RF signal (e.g., $A(t)\cos(\omega_{RFL}+(\omega_{BB}(t)+\phi(t))-\omega_{MMRF}))$. Note that the inbound frequency shift module may have a similar topology and function in a similar manner.

FIG. 39 is a schematic block diagram of another embodiment of a discrete digital outbound frequency shift module 404, 408 of a generic/specific conversion module coupled to a control module. The discrete digital outbound frequency shift module includes a sample and hold module 480 and a discrete digital filter 482.

For an up conversion of the outbound RF link signal to the outbound RF signal, the control module 402 generates an S&H control signal and a filter control signal. In accordance with S&H control signals (e.g., sample rate, sample frequency, hold rate, hold frequency, etc.), the sample and hold module 480 samples & holds the outbound RF link signal (e.g., $A(t)*\cos(\omega_{RFL}+\omega_{BB}+\phi(t))$) to produce a frequency domain pulse train (e.g., . . . $+A(t)*\cos(\omega_{RFL}-X\omega_{2*FS}+\omega_{BB}+\phi(t))+ \ldots +A(t)*\cos(\omega RFL+\omega BB+\phi(t))+A(t)*+A(t)*\cos(\omega_{RFL}+X\omega_{2*FS}+\omega_{BB}+\phi(t))\ldots$), where X is an integer greater than or equal to 1, RFL is the carrier frequency of the RF link signal, and FS is the sampling frequency. The discrete digital filter 482 (e.g., a programmable FIR (finite impulse response) filter and/or a programmable IIR (infinite impulse response) filter) filters the frequency domain pulse train in accordance with a filter control signal (e.g., settings for bandpass region, gain, attenuation rate, etc.) to produce an outbound RF signal (e.g., $A(t)*\cos(\omega_{RFL}+X\omega_{2*FS}+\omega_{BB}+\phi(t))=A(t)*\cos(\omega_{RF}+\omega_{BB}+\Phi(t))$, where $\omega_{RF}=\omega_{RFL}+X\omega_{2*FS}$ and corresponds to the desired carrier frequency of the outbound RF signal) as shown in FIG. 40.

For a down conversion of the outbound RF link signal to the outbound RF signal, the control module 402 generates an S&H control signal and a filter control signal. In accordance with S&H control signals, the sample and hold module 480 samples & holds the outbound RF link signal to produce the frequency domain pulse train. The discrete digital filter filters the frequency domain pulse train in accordance with a filter control signal to produce an outbound RF signal (e.g., $A(t)*\cos(\omega_{RFL}-X\omega_{2*FS}+\omega_{BB}+\phi(t))=A(t)*\cos(\omega_{RF}+\omega_{BB}+\phi(t))$, where $\omega_{RF}=\omega_{RFL}-X\omega_{2*FS}$ and corresponds to the desired carrier frequency of the outbound RF signal) as shown in FIG. 41.

Figure 42:
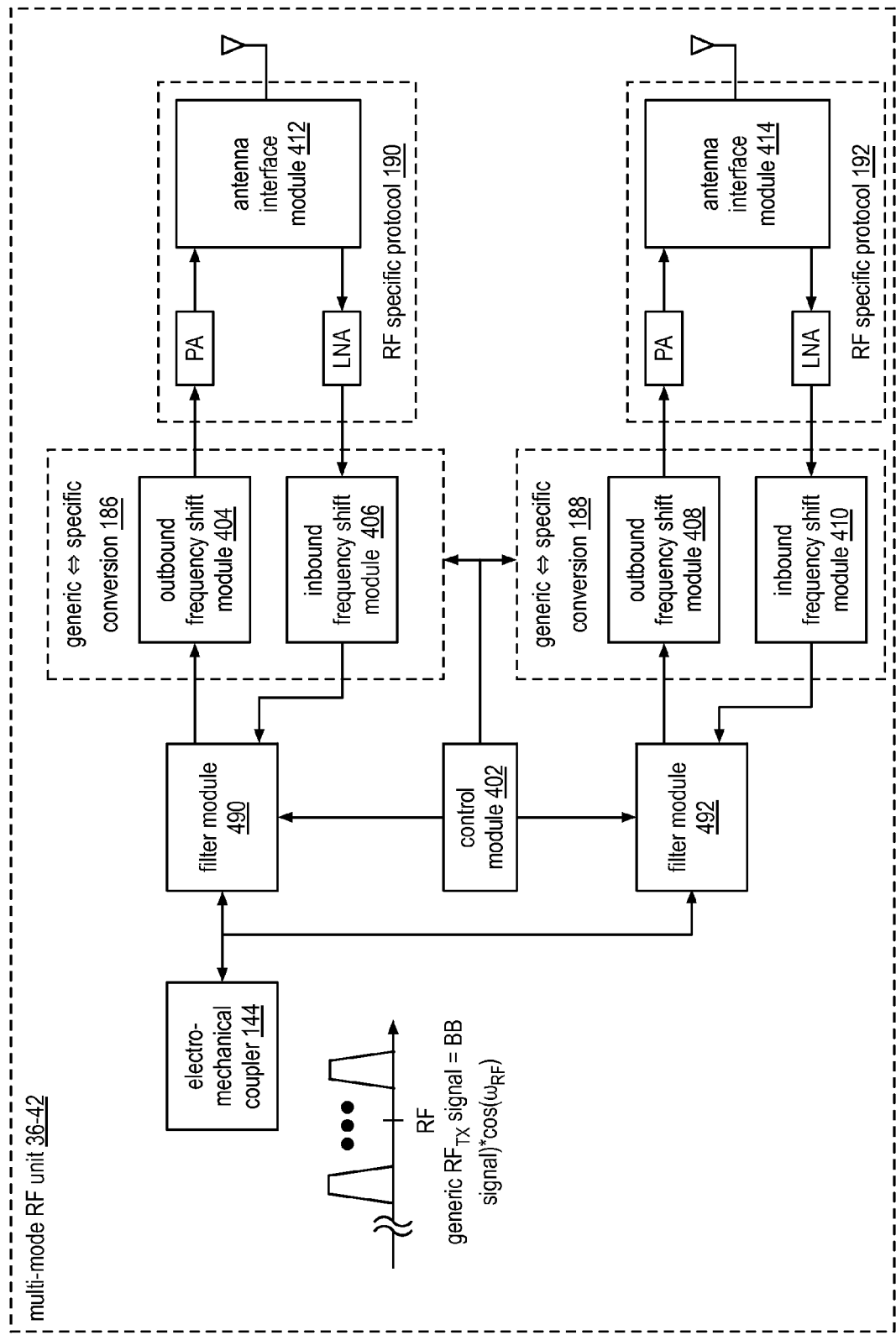
FIG. 42 is a schematic block diagram of another embodiment of a multi-mode RF unit in accordance with the present invention.

FIG. 42 is a schematic block diagram of another embodiment of a multi-mode RF unit 36-42 for which the RF link is allocated in a frequency sharing manner. The MM RF unit 36-42 includes the electro-mechanical coupler 144, a plurality of filter modules 490-492, a control module 402, a plurality of generic/specific conversion modules 186-188, and a plurality of RF specific protocol modules 190-192. Each of the generic/specific conversion modules 186-188 includes an outbound frequency shift module 404, 408 and an inbound frequency shift module 406, 410. Each of the RF specific protocol modules 190-192 includes a power amplifier (PA), a low noise amplifier (LNA), and an antenna interface module 412, 4414 coupled to an antenna structure (e.g., one or more antennas).

In an example of transmitting outbound signals, the MM RF unit 36-42 receives a plurality of outbound RF link signals via the RF link. Each of the outbound RF link signals is allocated a different channel of the RF link and thus has a unique carrier frequency. The control module 402 generates filter control signals for each of the plurality of filter modules 490-492 such that each one is tuned to pass one of the outbound RF link signals and to attenuate the rest. The control module 402 further generates control signals for the generic/specific conversion module 186-188 and for the RF specific protocol module 190-192 such that they may function as previously discussed to convert the outbound RF link signal into an outbound RF signal.

In an example of receiving inbound signals, the MM RF unit 36-42 receives a plurality of inbound RF signals via the antenna assemblies. The RF specific units 190-192 are tuned per control signals from the control module for a given wireless communication protocol and, as such, operate on a corresponding one of the plurality of inbound RF signals. The inbound frequency shift module 406, 410 of the generic/specific protocol module 186-188 converts the inbound RF signal into an inbound RF link signal, which is provided to the RF link via the associated filter module, which is tuned per control signals from the control module.

Figure 43:
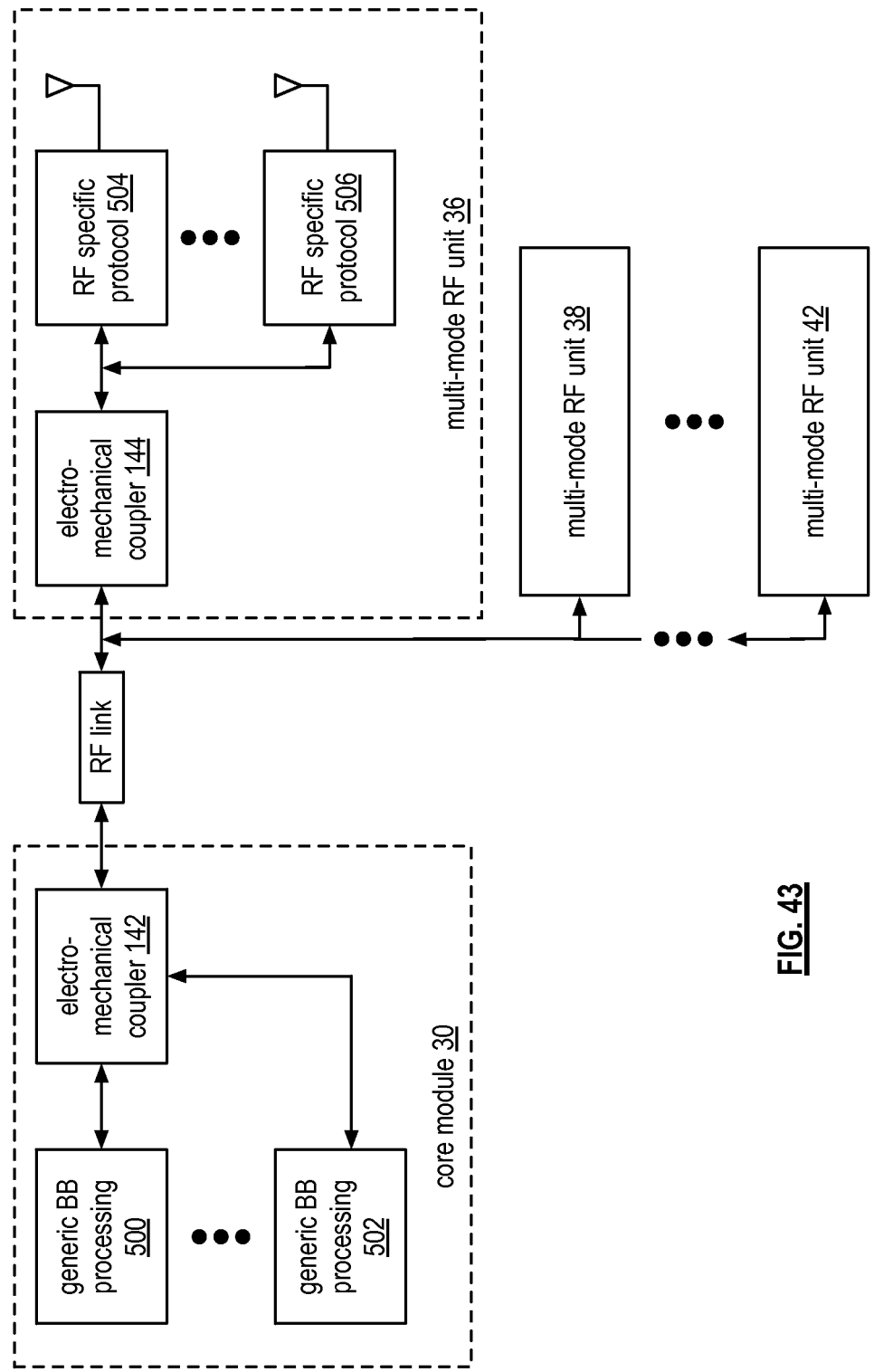
FIG. 43 is a schematic block diagram of another embodiment of a portable computing device in accordance with the present invention.

FIG. 43 is a schematic block diagram of another embodiment of a portable computing device that includes a core processing module 30 and a plurality of multi-mode RF units 36-42. The core module 30 includes a plurality of generic baseband (BB) processing modules 500-502 and the electro-mechanical coupler 142. Each of the MM RF units 36-42 includes the electro-mechanical coupler 144 and a plurality of RF specific protocol units 506.

In an example of operation, one or more generic baseband processing modules are active to process one or more active communications. For example, a first generic baseband processing module is active to process a first communication and a second generic baseband processing module is active to process a second communication. Each of the generic baseband processing modules operates in a similar manner, regardless of the type of communication, to convert outbound data into an outbound RF link signal and to convert an inbound RF link signal into inbound data. For example, a first communication may be a WLAN communication and a second communication may be a cellular voice communication. The generic baseband processing module assigned to process the first communication will perform the same functions as the generic baseband processing module assigned to process the second communication.

Each of the RF specific protocol units within a multimode RF unit is configured (fixed or programmable) for a specific wireless communication protocol (e.g., WLAN, Bluetooth, cellular voice, cellular data, etc.). For example, a first RF specific protocol unit may be for WLAN communications and a second RF specific protocol unit may be for cellular voice communications. In this example, the first RF specific protocol unit receives RF link signals, in a generic format, from the first generic BB processing module. The first RF specific protocol unit converts the generically formatted RF link signal into an outbound RF signal in accordance with the specific wireless communication protocol. For inbound RF signals, the first RF specific protocol unit converts the inbound RF signals that are formatted in accordance with the wireless communication protocol into generically formatted inbound RF link signals.

Figure 43A:
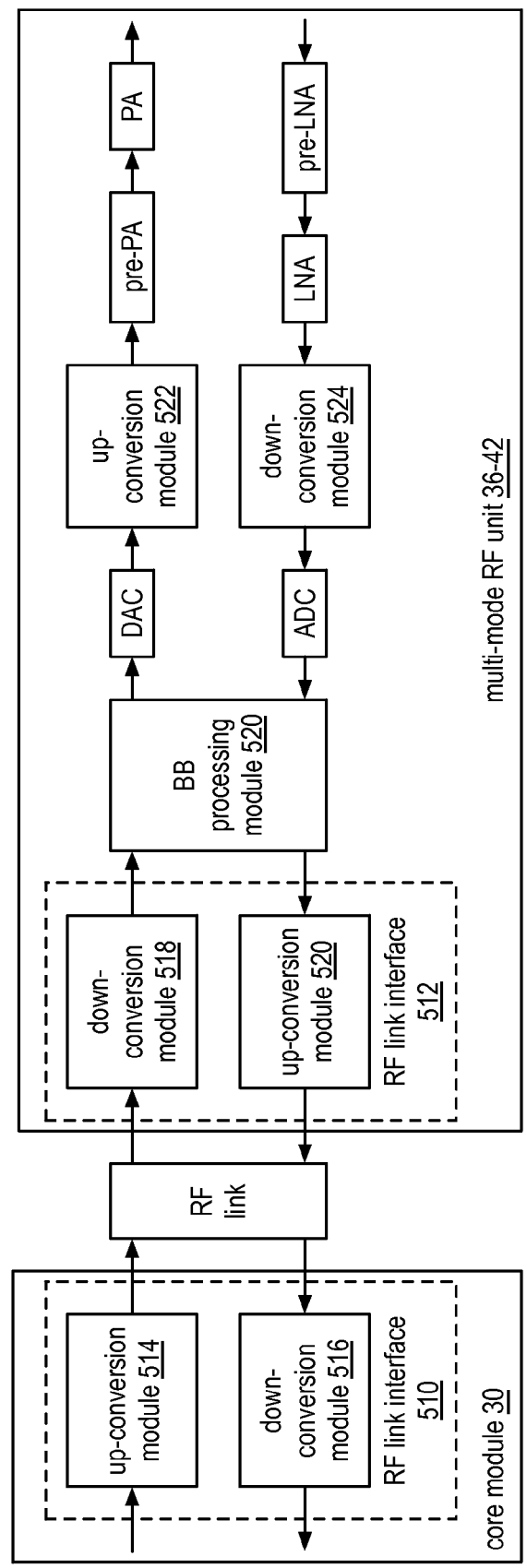
FIG. 43A is a schematic block diagram of another embodiment of a portion of a portable computing device in accordance with the present invention.

FIG. 43A is a schematic block diagram of another embodiment of a portion of a portable computing device that includes the core module 30 and one of the plurality of multi-mode RF units 36-42. Each of the generic baseband processing modules of the core module includes an RF link interface 510 that includes an up-conversion module 514 and a down-conversion module 516. Each of the RF specific protocol units of the MM RF unit includes an RF link interface 512, a baseband processing module 520, a transmit path, and a receive path. The RF link interface 512 includes a down conversion module 518 and an up conversion module 520. The transmit path includes a DAC, an up-conversion module 522, a pre-power amplifier, a power amplifier, and an antenna interface (not shown). The receive path includes the antenna interface, an LNA (which may further include a pre-LNA and/or a post-LNA), a down conversion module 524, and a DAC.

In an example of a wireless communication transmission, the core module 30 converts outbound data (e.g., voice, text, graphics, audio, video, etc.) into an outbound RF link signal via the up conversion module. Within the multimode RF unit, the down conversion module of the RF link converts the outbound RF link signal back into the outbound data. Note that the up conversion module of the core module's RF link interface may be an analog up conversion module and/or a discrete digital up conversion module as previously discussed and the down conversion module of the MM RF unit's RF link interface may be an analog down conversion module and/or a discrete digital down conversion module as previously discussed.

The baseband processing module of the multimode RF unit converts the outbound data into an outbound symbol stream, as previously discussed. The DAC converts the outbound symbol stream from the digital domain to the analog domain. The up conversion module, which may be implemented as previously discussed, converts the outbound symbol stream into an outbound RF signal, which is amplified by the pre-power amplifier and power amplifier.

In an example of a wireless communication reception, the LNA amplifies an inbound RF signal and provides it to the down conversion module. The down conversion module, which may be implemented as previously discussed, converts the inbound RF signal into an inbound symbol stream. The ADC converts the inbound symbol stream from the analog domain to the digital domain. The baseband processing module converts the inbound symbol stream into inbound data in accordance with the wireless communication protocol.

The up conversion module of the MM RF unit's RF link interface converts the inbound data into an inbound RF link signal. The down conversion module of the core module's RF link interface converts the inbound RF link signal back into the inbound data. Note that the down conversion module of the core module's RF link interface may be an analog down conversion module and/or a discrete digital down conversion module as previously discussed and the up conversion module of the MM RF unit's RF link interface may be an analog up conversion module and/or a discrete digital up conversion module as previously discussed.

Figure 43B:
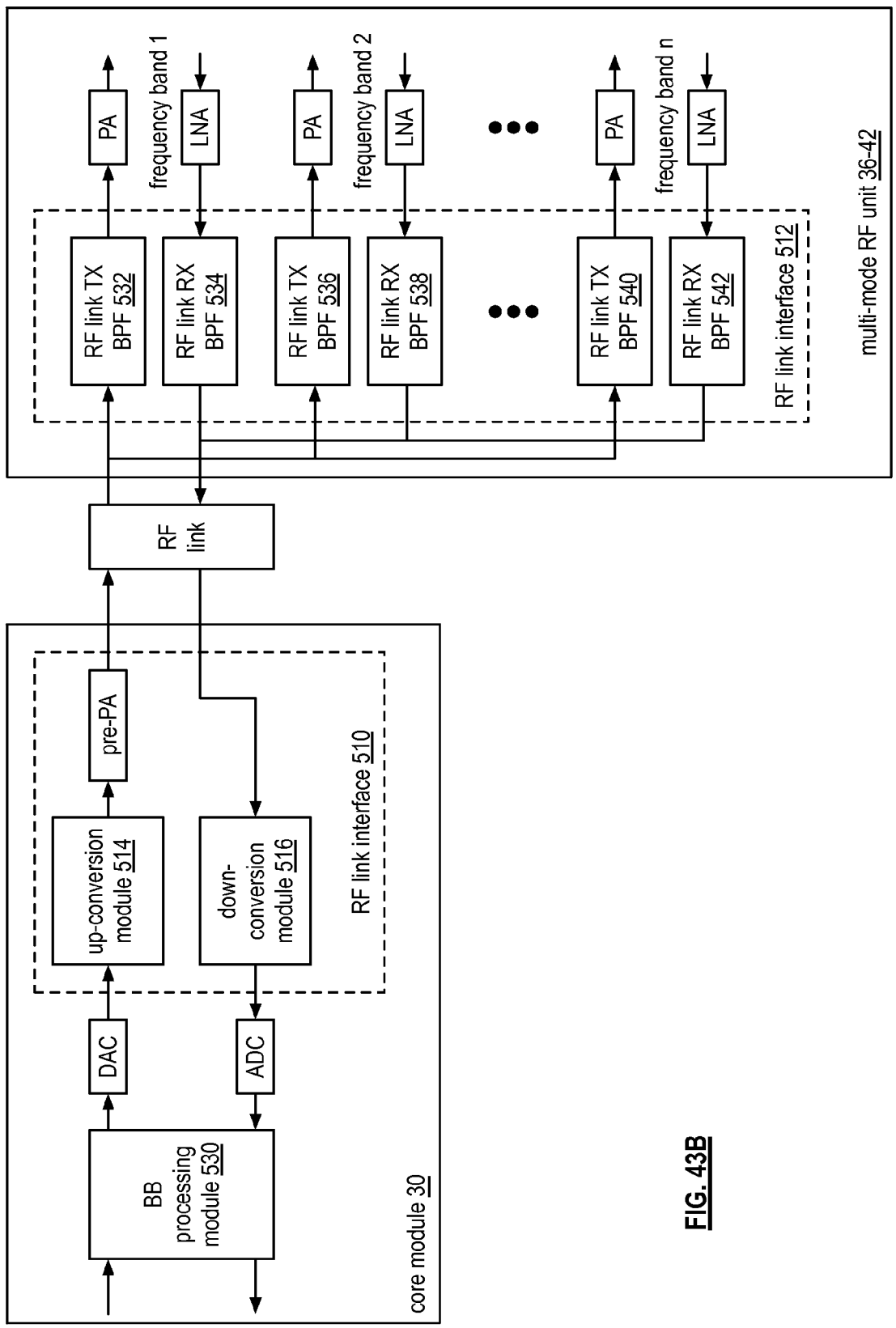
FIG. 43B is a schematic block diagram of another embodiment of a portion of a portable computing device in accordance with the present invention.

FIG. 43B is a schematic block diagram of another embodiment of a portion of a portable computing device that includes the core module 30 and one of the plurality of multi-mode RF units 36-42. The core module 30 includes one or more baseband processing modules 530, one or more DACs, one or more ADCs, and one or more RF link interfaces 510. Each of the one or more RF link interfaces 510 includes an up-conversion module 514 and a down-conversion module 516. The MM RF unit 36-42 includes one or more RF link interfaces 512, a plurality of sets of PAs and LNAs, and one or more antenna interfaces (not shown).

In an example of a wireless communication transmission, the baseband processing module 530 of the core module converts outbound data (e.g., voice, text, graphics, audio, video, etc.) into an outbound symbol stream in accordance with a wireless communication protocol. The baseband processing module may be dynamically configured to perform the baseband functions of the wireless communication protocol or is of fixed implementation. The DAC converts the outbound symbol stream from the digital domain to the analog domain. The up conversion module of the core module's RF link converts the outbound symbol stream into an up converted signal that has a carrier frequency of the desired outbound RF signal and outputs the up converted signal onto the RF link.

An RF link bandpass filter (BPF) 532, 536, 540 of the MM RF unit's RF link interface passes the up converted signal to a corresponding PA for amplification and subsequent transmission. For example, if the up-converted signal has a carrier frequency of 2.4 GHz and the wireless communication protocol is Bluetooth, the RF link TX BPF tuned to 2.4 GHz and is enabled for Bluetooth will pass the signal to its PA.

In an example of a wireless communication reception, the LNA amplifies an inbound RF signal and provides it to the corresponding RF link RX BPF 534, 538, 542, which filters the inbound RF signal and outputs it onto the RF link. The down conversion module of the core module's RF link interface converts the inbound RF signal into an inbound symbol stream. The ADC converts the inbound symbol stream from the analog domain to the digital domain. The baseband processing module converts the inbound symbol stream into inbound data in accordance with the wireless communication protocol.

Figure 44:
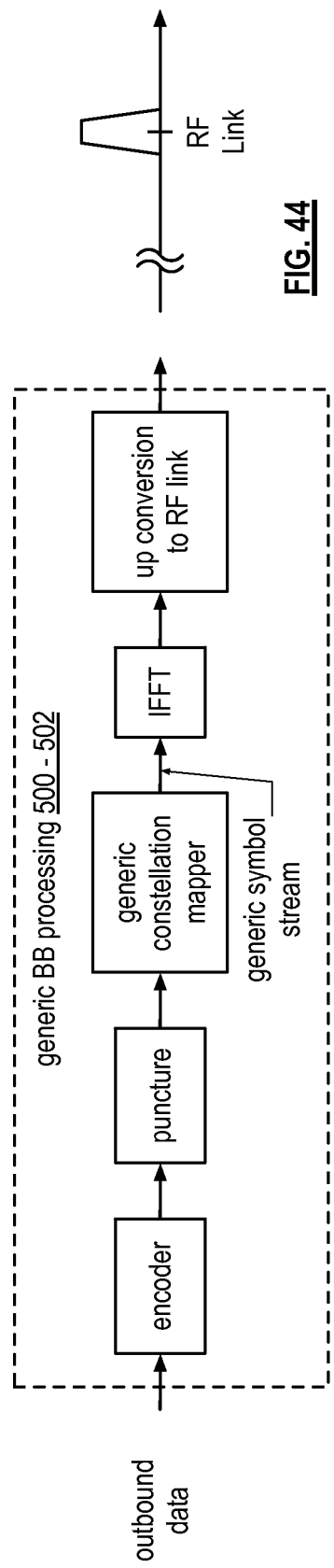
FIG. 44 is a schematic block diagram of an embodiment of a transmit path generic baseband core module in accordance with the present invention.

FIG. 44 is a schematic block diagram of an embodiment of a transmit path generic baseband 500-502 of the core module 30 that includes an encoder, a puncture module, a generic constellation mapper, an IFFT (inverse fast Fourier transform) module, and an up conversion to RF link module. The generic constellation mapper may use one or more high data density constellation mapping schemes (256 QAM, etc.) since the RF link will have minimal channel loss.

In an example of operation, the encoder module, which may be generic or specific for a particular wireless communication protocol, encodes outbound data to produce encoded data. The puncture module, which may be generic or specific for a particular wireless communication protocol, punctures the encoded data or the outbound data to produce punctured data. The generic constellation mapper maps the outbound data, the encoded data, or the puncture data into a constellation symbol (in a continuous processing of outbound data, a constellation symbol is one in a stream of outbound symbols). Note that the encoder and/or puncture module may be bypassed.

The IFFT module converts the constellation symbol from the frequency domain to the time domain. The up conversion module converts the outbound generic symbol stream into and outbound RF link signal.

Figure 45:
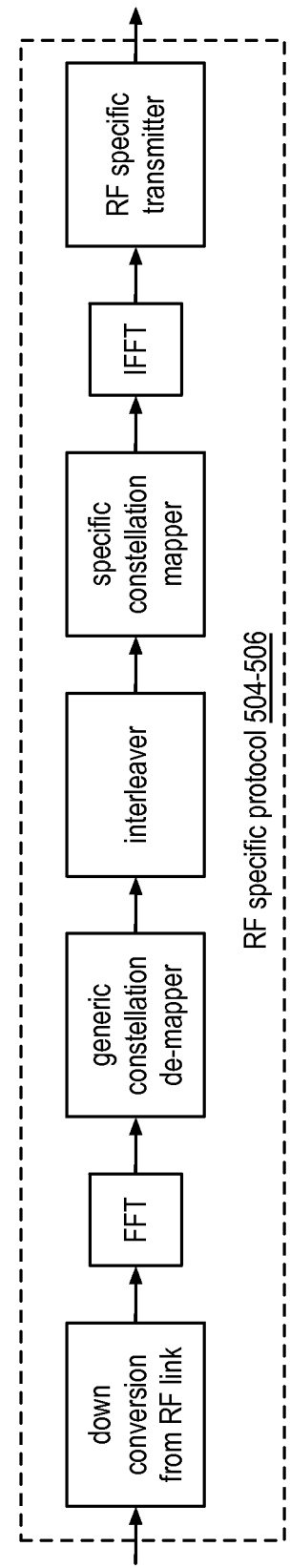
FIG. 45 is a schematic block diagram of an embodiment of a transmit path RF specific protocol unit within an MM RF unit in accordance with the present invention.

FIG. 45 is a schematic block diagram of an embodiment of a transmit path RF specific protocol unit 504-506 within an MM RF unit that corresponds to the generic BB processing module of FIG. 44. The RF specific protocol module includes a down conversion from RF link module, an FFT module, a generic constellation demapper, an interleaver, a specific constellation mapper, an IFFT module, and an RF specific transmitter.

In an example of operation, the down conversion module converts an outbound RF link signal into an outbound generic symbol stream. The FFT module converts the outbound generic symbol stream from the time domain to the frequency domain. The generic constellation demapper demaps the outbound generic symbol stream to recapture the outbound data, the encoded data, or the punctured data. The interleaver interleaves the recaptured outbound data, the encoded data, or the punctured data to produce interleaved data.

The specific constellation mapper (e.g., specific for a particular wireless communication protocol) maps the interleaved data into symbols. The IFFT module converts the outbound specific symbol stream from the frequency domain to the time domain. The RF specific transmitter converts the outbound specific symbol stream into an outbound RF signal in accordance with the specific wireless communication protocol.

Figure 46:
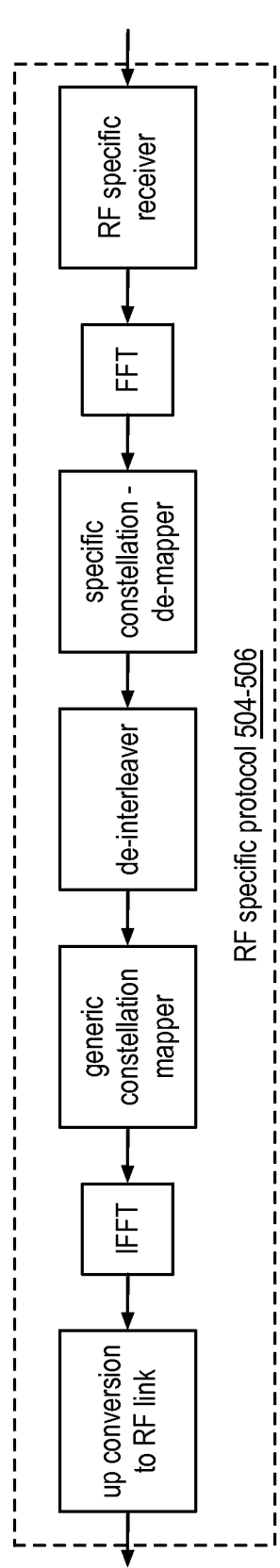
FIG. 46 is a schematic block diagram of an embodiment of a receive path RF specific protocol unit within an MM RF unit in accordance with the present invention.

FIG. 46 is a schematic block diagram of an embodiment of a receive path RF specific protocol unit 504-506 within an MM RF unit. The receive path includes an RF specific receiver, an FFT module, a specific constellation demapper, a de-interleaver, a generic constellation mapper, an IFFT module, and an up-conversion to RF link module.

In an example of operation, the RF specific receiver section receives an inbound RF signal and converts it into an inbound symbol stream. The FFT module converts the inbound symbol stream from the time domain to the frequency domain. The specific constellation demapper e.g., specific for a particular wireless communication protocol) demaps the inbound symbol stream to produce interleaved data. The de-interleaver de-interleaves the interleaved data to produce inbound data, inbound punctured data, or inbound encoded data.

The generic constellation mapper maps the inbound data, inbound punctured data, or inbound encoded data into an inbound generic symbol stream. The generic constellation mapper may use one or more high data density constellation mapping schemes (256 QAM, etc.) since the RF link will have minimal channel loss. The IFFT module converts the inbound generic symbol stream from the frequency domain to the time domain. The up conversion to RF link module converts the inbound generic symbol stream into an inbound RF link signal.

Figure 47:
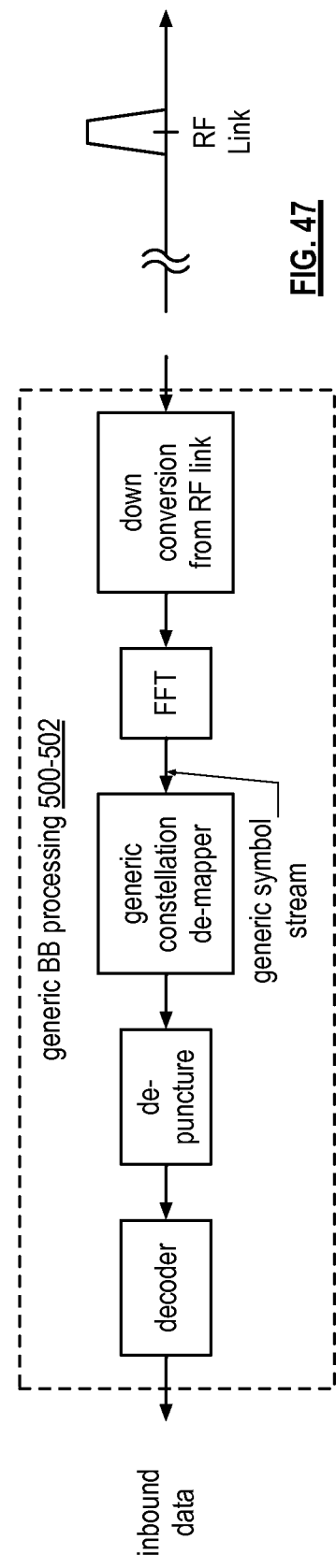
FIG. 47 is a schematic block diagram of an embodiment of a receive path generic baseband core module in accordance with the present invention.

FIG. 47 is a schematic block diagram of an embodiment of a receive path of a generic baseband core module 500-502 that corresponds to the MM RF unit of FIG. 46. The receive path includes a down conversion from RF link module, an FFT module, a generic constellation demapper, a de-puncture module, and a decoder.

In an example of operation, the down conversion module converts an inbound RF link signal into an inbound generic symbol stream. The FFT module converts the inbound generic symbol stream from the time domain to the frequency domain. The generic constellation demapper demaps the inbound generic symbol stream into inbound data, inbound specific punctured data, or inbound specific encoded data. If enabled, the de-puncture module depunctures, in accordance with the specific wireless communication protocol, the inbound specific punctured data to produce the inbound data or the inbound specific encoded data. If enabled, the decoder decodes, in accordance with the specific wireless communication protocol, the inbound specific encoded data to produce the inbound data.

Figure 48:
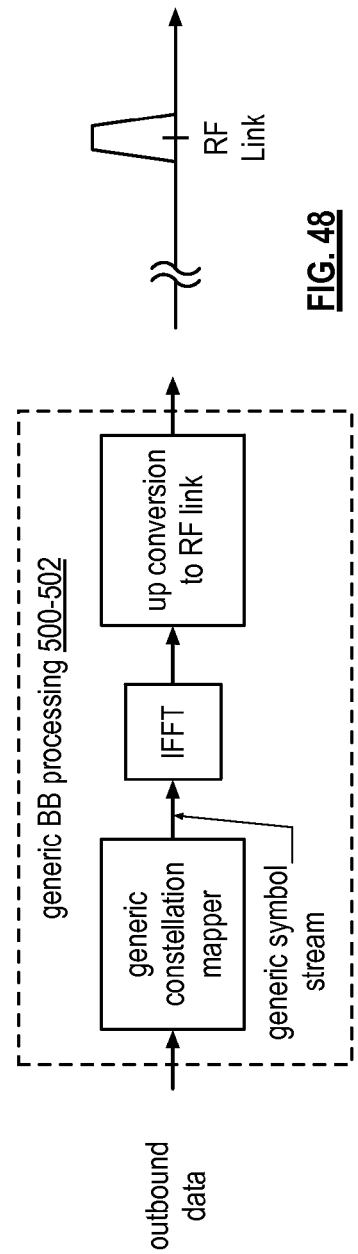
FIG. 48 is a schematic block diagram of another embodiment of a transmit path generic baseband core module in accordance with the present invention.

FIG. 48 is a schematic block diagram of an embodiment of a transmit path of a generic baseband core module 500-502 that includes a generic constellation mapper, an IFFT (inverse fast Fourier transform) module, and an up conversion to RF link module. The generic constellation mapper may use one or more high data density constellation mapping schemes (256 QAM, etc.) since the RF link will have minimal channel loss.

In an example of operation, the generic constellation mapper maps the outbound data into a constellation symbol (for continuous processing of outbound data, a constellation symbol is one in a stream of outbound symbols). The IFFT module converts the constellation symbol from the frequency domain to the time domain. The up conversion module converts the outbound generic symbol stream into and outbound RF link signal.

Figure 49:
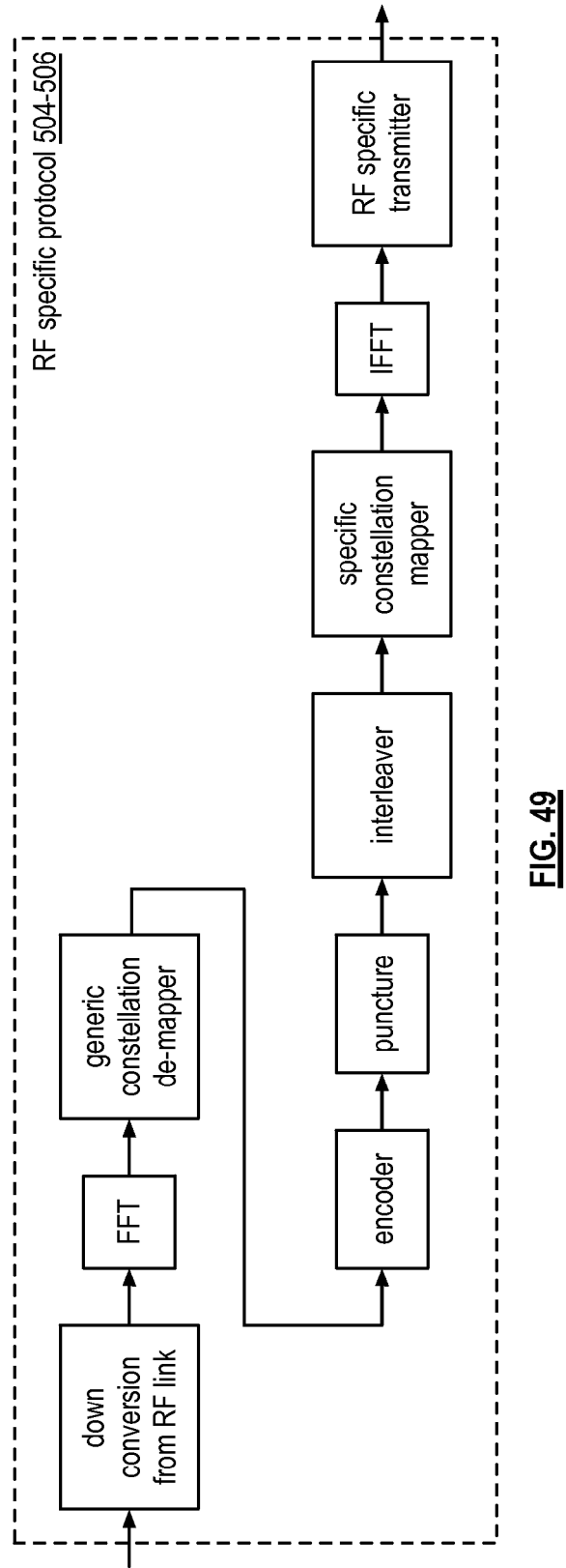
FIG. 49 is a schematic block diagram of another embodiment of a transmit path RF specific protocol unit within an MM RF unit in accordance with the present invention.

FIG. 49 is a schematic block diagram of another embodiment of a transmit path RF specific protocol unit 504-506 within an MM RF unit that corresponds to the generic BB processing module of FIG. 48. The RF specific protocol module includes a down conversion from RF link module, an FFT module, a generic constellation demapper, an encoder, a puncture module, an interleaver, a specific constellation mapper, an IFFT module, and an RF specific transmitter.

In an example of operation, the down conversion module converts an outbound RF link signal into an outbound generic symbol stream. The FFT module converts the outbound generic symbol stream from the time domain to the frequency domain. The generic constellation demapper demaps the outbound generic symbol stream to recapture the outbound data, the encoded data, or the punctured data.

The encoder module, which is specific for a particular wireless communication protocol, encodes outbound data to produce encoded data. The puncture module, which is specific for a particular wireless communication protocol, punctures, when enabled, the encoded data or the outbound data to produce punctured data. The interleaver interleaves the recaptured outbound data, the encoded data, or the punctured data to produce interleaved data.

The specific constellation mapper (e.g., specific for a particular wireless communication protocol) maps the interleaved data into symbols. The IFFT module converts the outbound specific symbol stream from the frequency domain to the time domain. The RF specific transmitter converts the outbound specific symbol stream into an outbound RF signal in accordance with the specific wireless communication protocol.

FIG. 50 is a schematic block diagram of an embodiment of a receive path RF specific protocol unit 504-506 within an MM RF unit. The receive path includes an RF specific receiver, an FFT module, a specific constellation demapper, a de-interleaver, a de-puncture module, and a decoder, a generic constellation mapper, an IFFT module, and an up-conversion to RF link module.

In an example of operation, the RF specific receiver section receives an inbound RF signal and converts it into an inbound symbol stream. The FFT module converts the inbound symbol stream from the time domain to the frequency domain. The specific constellation demapper e.g., specific for a particular wireless communication protocol) demaps the inbound symbol stream to produce interleaved data. The de-interleaver de-interleaves the interleaved data to produce inbound punctured data. If enabled, the de-puncture module depunctures, in accordance with the specific wireless communication protocol, the inbound specific punctured data to produce inbound specific encoded data. If enabled, the decoder decodes, in accordance with the specific wireless communication protocol, the inbound specific encoded data to produce the inbound data.

The generic constellation mapper maps the inbound data into an inbound generic symbol stream. The generic constellation mapper may use one or more high data density constellation mapping schemes (256 QAM, etc.) since the RF link will have minimal channel loss. The IFFT module converts the inbound generic symbol stream from the frequency domain to the time domain. The up conversion to RF link module converts the inbound generic symbol stream into an inbound RF link signal.

FIG. 51 is a schematic block diagram of an embodiment of a receive path of a generic baseband core module 500-502 that corresponds to the MM RF unit of FIG. 50. The receive path includes a down conversion from RF link module, an FFT module, and a generic constellation demapper.

In an example of operation, the down conversion module converts an inbound RF link signal into an inbound generic symbol stream. The FFT module converts the inbound generic symbol stream from the time domain to the frequency domain. The generic constellation demapper demaps the inbound generic symbol stream into inbound data.

Figure 52:
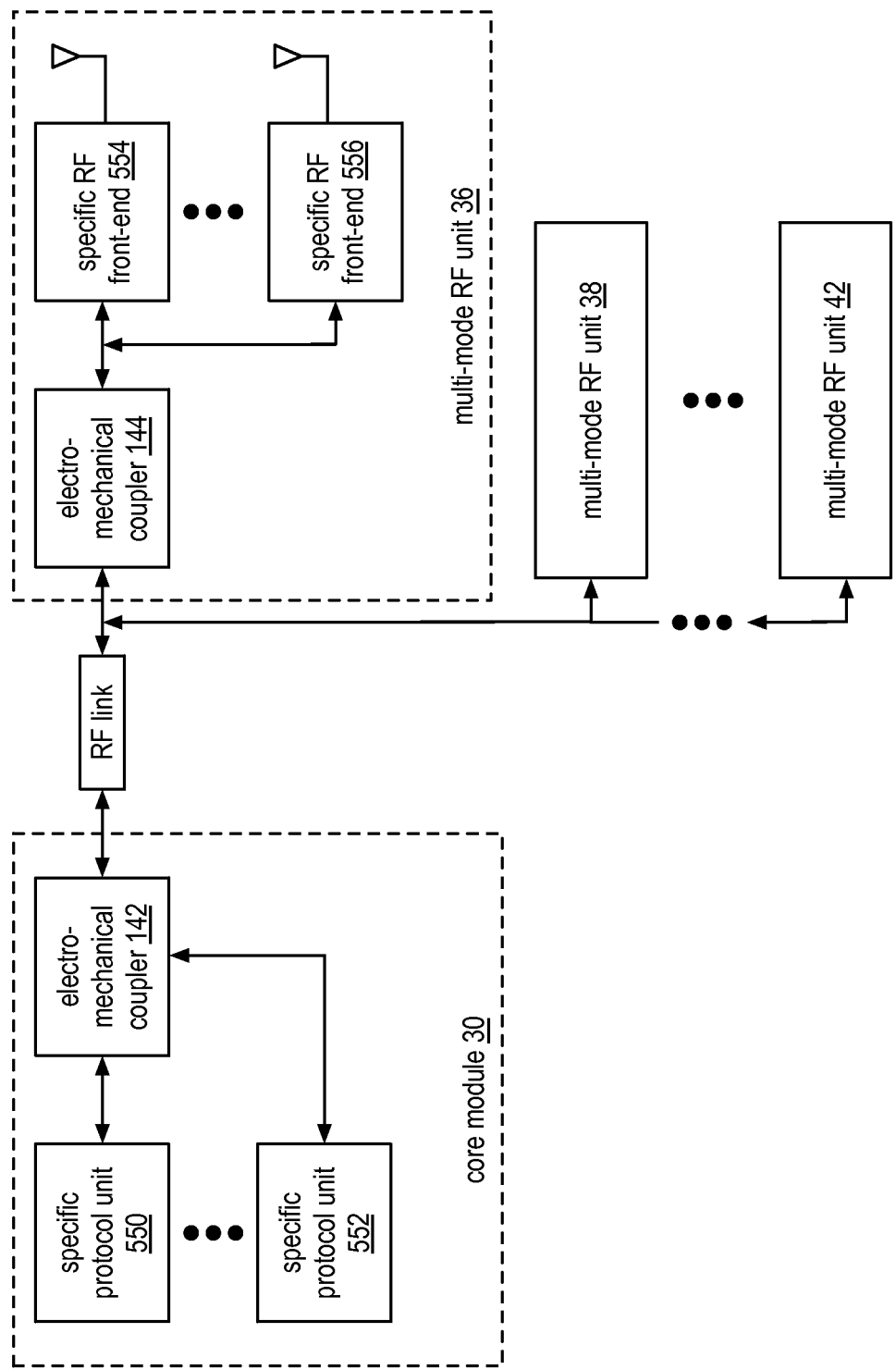
FIG. 52 is a schematic block diagram of another embodiment of a portable computing device in accordance with the present invention.

FIG. 52 is a schematic block diagram of another embodiment of a portable computing device that includes the core module 30 and a plurality of multi-mode RF units 36-42. The core module 30 includes a plurality of specific protocol units 550-552 and the electro-mechanical coupler 142. Each of the multi-mode RF units 36-42 includes the electro-mechanical coupler 144 and a plurality of specific RF front-end units 554-556.

In an example of operation, one or more of the specific protocol units 550-552 of the core module are active to process inbound and outbound data of a communication within the mid-frequency (e.g., data) frequency band. For outbound data, the specific protocol module 550-552 includes a baseband transmitter section and an RF transmitter section. The baseband transmitter section converts the outbound data into an outbound symbol stream in accordance with a specific wireless communication protocol. The RF transmitter section converts the outbound symbol stream into a pre-PA (power amplifier) outbound RF signal, which is transmitted to one or more of the MM RF units via the RF link.

One or more the MM RF units 36-42 receive the pre-PA outbound RF signal, which is processed by a corresponding one of the specific RF front-end modules 554-556. In particular, the specific RF front-end module 554-556 amplifies the pre-PA outbound RF signal, filters it, and outputs it for transmission.

For inbound data, the specific RF front-end module 554-556 receives an inbound RF signal, amplifies it, and outputs it on to the RF link. An RF receiver section of the corresponding specific protocol unit receives the amplified inbound RF signal and converts it into an inbound symbol stream. A baseband receiver section converts the inbound system stream into inbound data in accordance with the specific wireless communication protocol.

In this embodiment, the mid-frequency band includes the frequencies of various wireless communication protocols. For example and as shown in FIG. 16, one or more channels in the mid-frequency band may be for cellular communications (e.g., at 1.8-2.1 GHz), one or more channels for WLAN and/or Bluetooth (e.g., at 2.4 GHz), one or more channels for WLAN at 5 GHz, etc.

FIG. 53 is a schematic block diagram of another embodiment of a baseband specific protocol unit 550-552 and a specific RF front-end 554-556 of the portable computing device of FIG. 52. The baseband specific protocol unit 550-552 includes a receiver section and a transmitter section. The receiver section includes a receive (RX) baseband (BB) processing module, an ADC, a down conversion module, and a receive bandpass filter (BPF). The transmitter section includes a transmit (TX) baseband processing module, a DAC, an up conversion module, and a pre-power amplifier (PA). The corresponding specific RF front-end includes transmit bandpass filter, a power amplifier, an antenna interface module, a low noise amplifier, and a RX driver.

In an example of operation, each of the specific protocol units 550-552 is configured (e.g., fixed or dynamically) to support a specific wireless communication protocol (e.g., one or more of GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). For an outbound communication, the TX BB processing module receives outbound data (e.g., voice, text, audio, video, graphics, etc.) from the device processing module or generates the outbound data. The TX BB processing module converts the outbound data into one or more outbound symbol streams in accordance with the corresponding one or more wireless communication standards.

The TX BB processing module provides the outbound symbol stream to the DAC, which converts the outbound symbol stream from the digital domain to the analog domain. The up conversion module, which may include a direct conversion topology transmitter or a super heterodyne topology, converts the outbound symbol stream into an up converted signal.

For a direction conversion, the up conversion module may have a Cartesian-based topology, a phase polar-based topology, a frequency polar-based topology, or a hybrid polar-Cartesian-based topology. The pre-PA amplifies the up converted signal to produce a pre-PA outbound RF signal, which is outputted on the RF link.

The TX BPF filters the pre-PA outbound RF signal to produce a filtered pre-PA outbound RF signal. The power amplifier amplifies the filtered pre-PA outbound RF signal to produce an outbound RF signal. The antenna interface module outputs the outbound RF signal for transmission via the antenna assembly (not shown). Note that the antenna interface module may include one or more a transformer balun, a TX/RX isolation module (e.g., a duplexer, a circulator, a splitter, etc.), an impedance matching circuit, an antenna tuning unit, and a transmission line.

For incoming communications, the antenna assembly receives one or more inbound RF signals and provides it to the antenna interface module. The LNA amplifies the inbound RF signal to produce an amplified inbound RF signal. The driver drives the amplified inbound RF signal on the RF link.

The RX BPF, if included, filters the amplified inbound RF signal to produce a filtered inbound RF signal. The down conversion module converts the inbound RF signal into an inbound symbol stream. The ADC converts the inbound symbol stream from the analog domain to the digital domain. The RX baseband processing module converts the inbound symbol stream(s) into inbound data (e.g., voice, text, audio, video, graphics, etc.) in accordance with its specific wireless communication standard(s).

Figure 54:
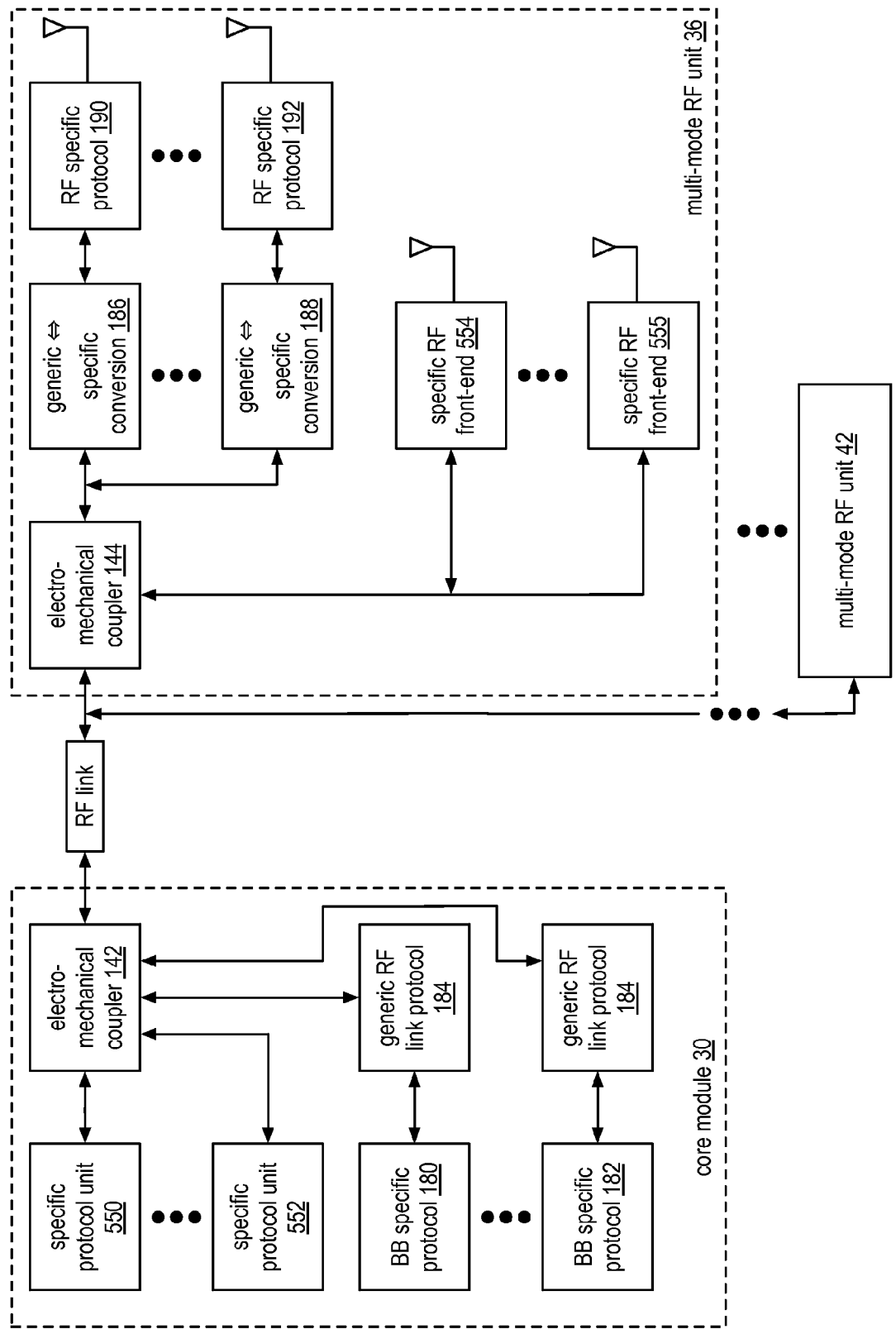
FIG. 54 is a schematic block diagram of another embodiment of a portable computing device in accordance with the present invention.

FIG. 54 is a schematic block diagram of another embodiment of a portable computing device that includes a core module 30 and a plurality of multi-mode RF units 36-42. The core module 30 includes the electro-mechanical coupler 142, a plurality of specific protocol units 550-552 (as described with reference to FIGS. 52 and 53), a plurality of baseband specific protocol modules 180-182 and generic RF link protocol modules 184 (as described with reference to one or more of FIGS. 24-42). Each of the MM RF units 36-42 includes the electro-mechanical coupler 144, a plurality of specific RF front-end units 554-556 (as described with reference to FIGS. 52 and 53), a plurality of generic/specific conversion modules 186-188 and RF specific protocol modules 190-192 (as described with reference to one or more of FIGS. 24-42).

In this embodiment, the mid-frequency band (e.g., the data band) of the RF link supports the output frequency of some specific wireless communication protocols (e.g., those that use transmit and/or receive frequencies within 1.5 GHz to 7 GHz) and supports the generic RF link frequencies for other wireless communication protocols (e.g., those that use transmit and/or receive frequencies below 1.5 GHz and/or above 7 GHz). Note the frequencies of the examples are arbitrary and may be much greater and/or much less than the 1.5 and 7 GHz referenced.

Figure 54A:
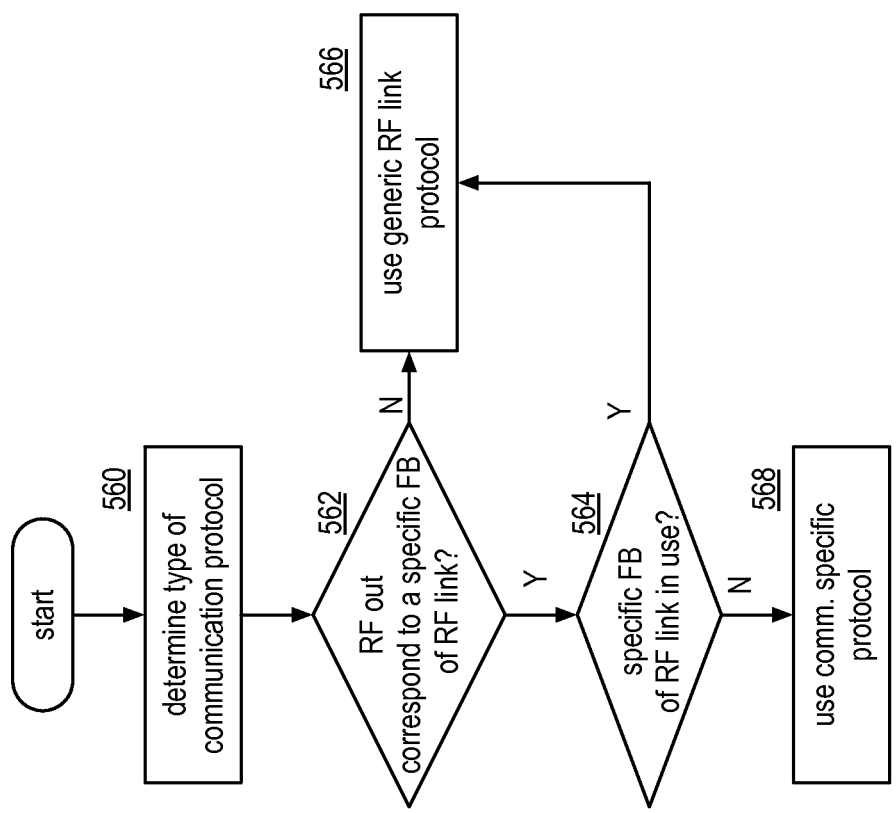
FIG. 54A is a logic diagram of an embodiment of a method of allocating resources within an MM RF unit of a portable computing device in accordance with the present invention.

FIG. 54A is a logic diagram of an embodiment of a method of allocating resources within a portable computing device of FIG. 54 that may be executed by the management module and/or one of the other processing modules. The method begins at step 560 by determining the type of communication protocol (e.g., Bluetooth, WLAN, cellular voice, cellular data, 60 GHz, etc.). The method continues at step 562 by determining whether the transmit and receive frequencies of the communication protocol are frequencies within the frequency band of the RF link. If no, the method continues at step 566 by using a generic RF link protocol (e.g., using a baseband specific protocol module and generic RF link protocol module).

If the transmit and receive frequencies of the communication protocol are within the frequency band of the RF link, the method continues at step 564 by determining whether the specific channels for the communication are already in use. If yes, the method continues at step 566 by a utilizing the generic RF link protocol. If not, the method continues at step 568 by using the communication specific protocol (e.g., using the specific protocol unit).

Figure 55:
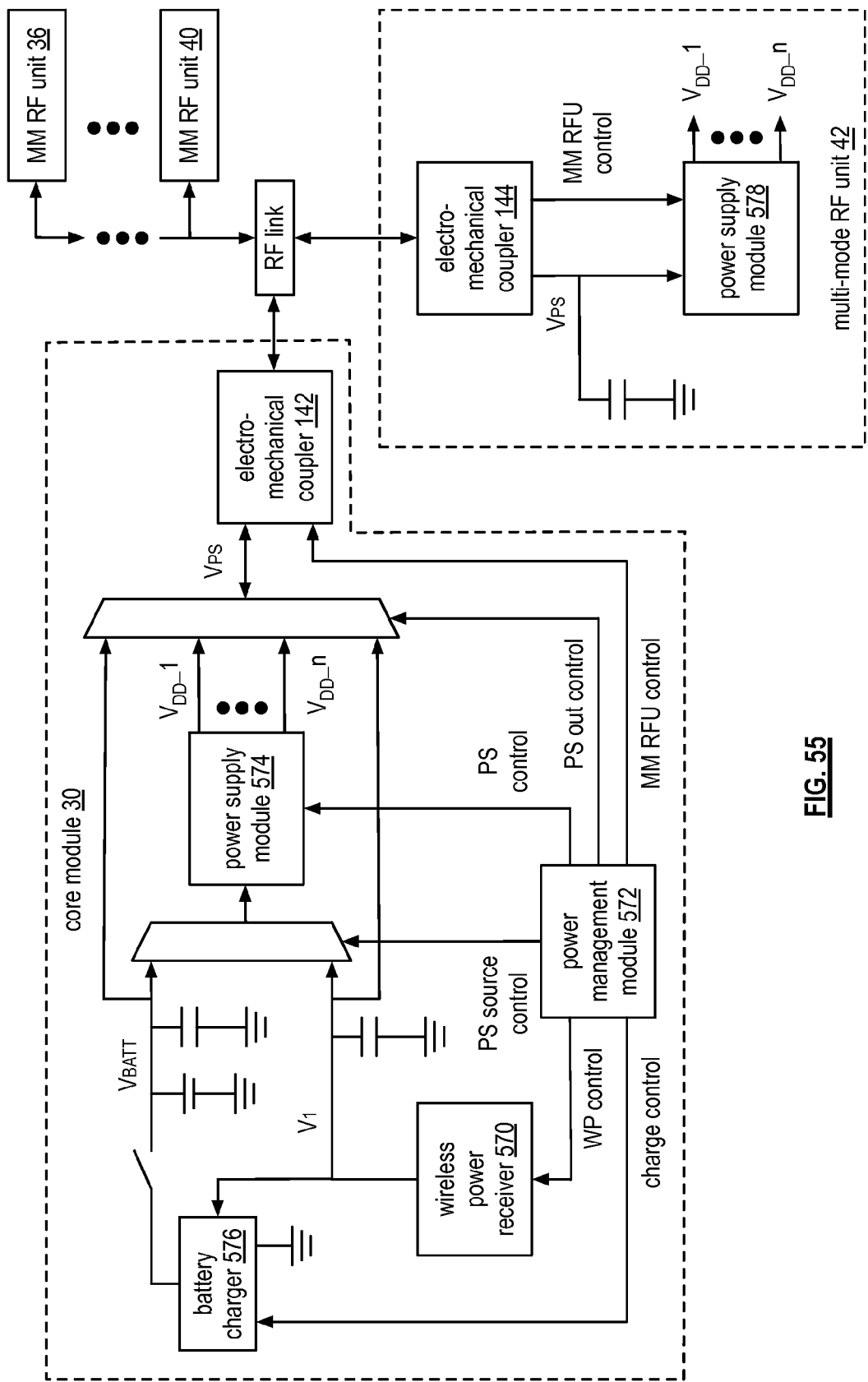
FIG. 55 is a schematic block diagram of an embodiment of power distribution within a portable computing device in accordance with the present invention.

FIG. 55 is a schematic block diagram of an embodiment of power distribution within a portable computing device that includes the core module 30 and a plurality of multi-module RF units 36-42. The core module 30 includes a power management module 572, a wireless power receiver 570, a battery, a battery charger 576, a power supply module 574, multiplexers, and the electro-mechanical coupler 142. Each of the MM RF units 36-42 includes the electro-mechanical coupler 144 and a power supply module 578.

In an example of operation, the power management module 572 determines the power configuration for the portable computing device depending on available power sources. For example, when the wireless power receiver 570 is receiving a wireless power signal, the power management module 572 sets up the power configuration accordingly. In particular, it enables, via a wireless power (WP) control signal, the wireless power receiver to convert the wireless power signal into one or more supply voltages (e.g., V1). With the wireless power present, the power management module may enable the battery charger to charge the battery.

The management module 572 further enables, via a power supply (PS) control signal, the power supply module 574 to receive the wireless power supply voltage (V1) and to convert, in accordance with a PS control signal, the power supply voltage (V1) into one or more power supply voltages (e.g., $V_{DD\_}1$ through $V_{DD\_}n$). Note that the power supply module 574 includes one or more DC-DC converters, one or more linear regulators, and/or one or more filter capacitors (e.g., filter V1 to produce a power supply voltage $V_{DD}$).

The power management 572 module also generates a PS output control signal that selects the wireless power supply voltage (V1) or one of the power supply voltages ($V_{DD}$) as the DC power source for the MM RF units. In addition, the power management module generates MM RFU control signals to instruct one or more of the MM RF units on how to process the selected power supply voltage ($V_{PS}$).

Within an MM RF unit 36-42, the power supply module 578 receives the selected power supply voltage ($V_{PS}$) and the MM RFU control signal. From these inputs, the power supply module generates one or more power supply voltages (e.g., $V_{DD\_}1$ through $V_{DD\_}n$) for the MM RF unit. Note that the power supply module includes one or more DC-DC converters, one or more linear regulators, and/or one or more filter capacitors (e.g., filter $V_{PS}$ to produce a power supply voltage $V_{DD}$).

When the wireless power signal is not present, the power management module 572 enables a battery mode in which the battery sources power to the power supply module. Depending on the battery life and active functions of the portable computing device, the power management module generates the PS control signal, the PS output control signal, and the MM RFU control signal(s).

Figure 56:
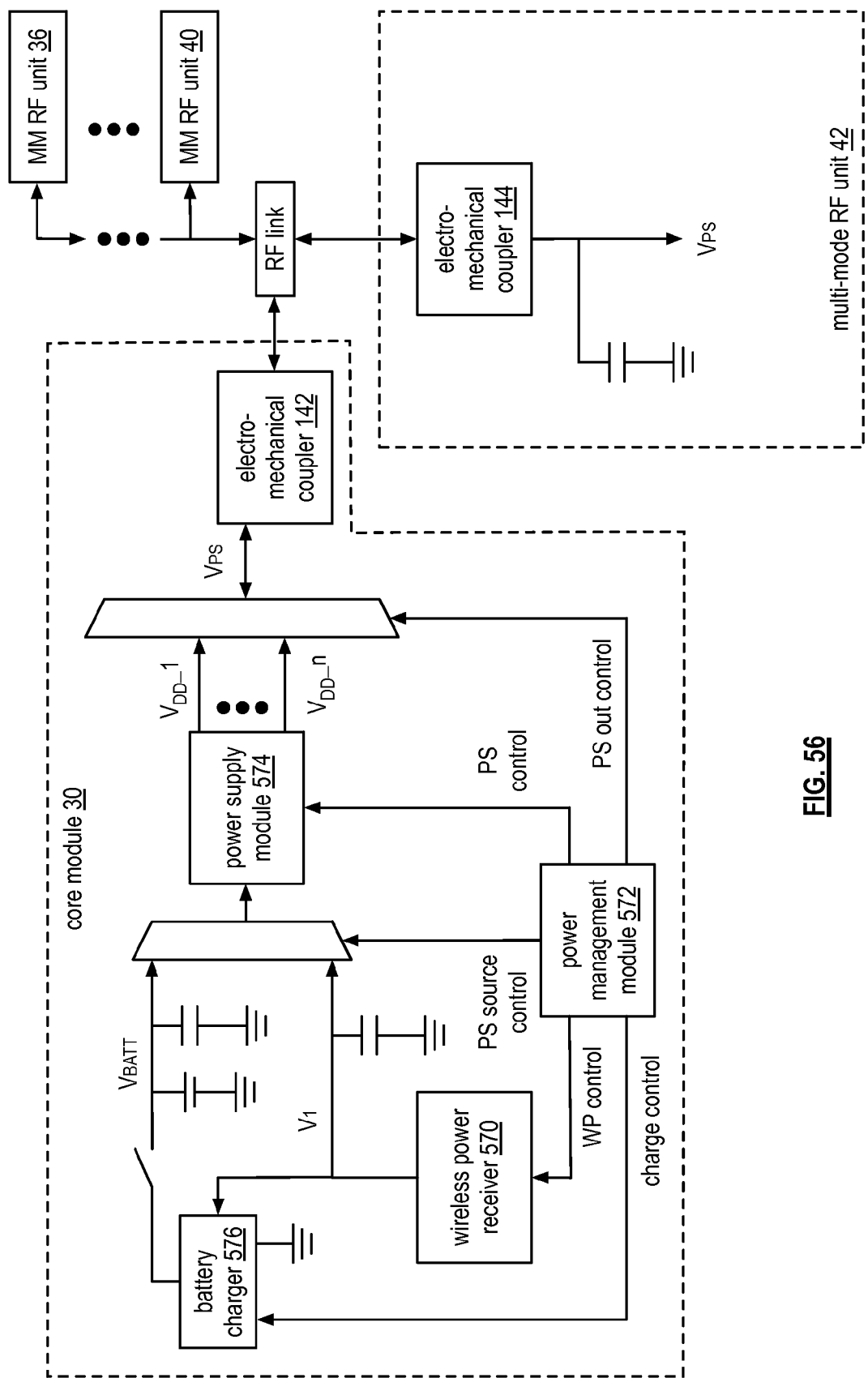
FIG. 56 is a schematic block diagram of another embodiment of power distribution within a portable computing device in accordance with the present invention.

FIG. 56 is a schematic block diagram of another embodiment of power distribution within a portable computing device that includes the core module 30 and a plurality of multi-module RF units 36-42. The core module 30 includes a power management module 572, a wireless power receiver 570, a battery, a battery charger 576, a power supply module 574, multiplexers, and the electro-mechanical coupler 142. Each of the MM RF 36-42 units includes the electro-mechanical coupler 144 and a filter capacitor.

In an example of operation, the power management module determines the power configuration for the portable computing device depending on available power sources. For example, when the wireless power receiver is receiving a wireless power signal, the power management module sets up the power configuration accordingly. In particular, it enables, via a wireless power (WP) control signal, the wireless power receiver to convert the wireless power signal into one or more supply voltages (e.g., V1). With the wireless power present, the power management module may enable the battery charger to charge the battery.

The management module further enables, via a power supply (PS) control signal, the power supply module to receive the wireless power supply voltage (V1) and to convert, in accordance with a PS control signal, the power supply voltage (V1) into one or more power supply voltages (e.g., $V_{DD\_}1$ through $V_{DD\_}n$). Note that the power supply module includes one or more DC-DC converters, one or more linear regulators, and/or one or more filter capacitors (e.g., filter V1 to produce a power supply voltage $V_{DD}$).

The power management module also generates a PS output control signal that selects the wireless power supply voltage (V1) or one of the power supply voltages ($V_{DD}$) as the power supply ($V_{PS}$) for the MM RF units. Within an MM RF unit, the filter capacitor filters $V_{PS}$ to produce a power supply voltage $V_{DD}$.

When the wireless power signal is not present, the power management module enables a battery mode in which the battery sources power to the power supply module. Depending on the battery life and active functions of the portable computing device, the power management module generates the PS control signal, and the PS output control.

Figure 57:
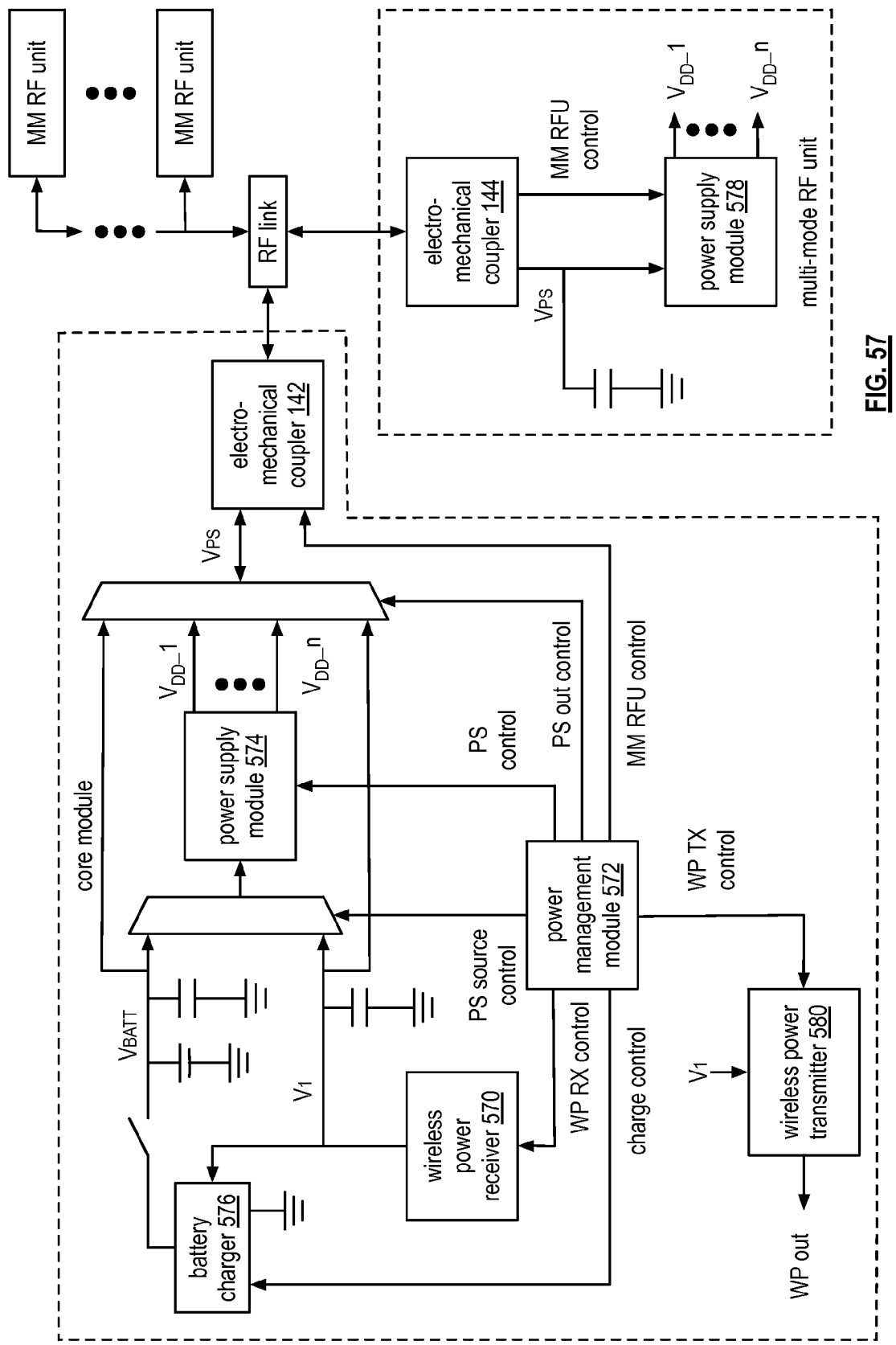
FIG. 57 is a schematic block diagram of another embodiment of power distribution within a portable computing device in accordance with the present invention.

FIG. 57 is a schematic block diagram of another embodiment of power distribution within a portable computing device that includes the core module 30 and a plurality of multi-module RF units 36-42. The core module 30 includes a power management module 572, a wireless power receiver 570, a battery, a battery charger 576, a power supply module 574, multiplexers, a wireless power transmitter 580, and the electro-mechanical coupler 142. Each of the MM RF units 36-42 includes the electro-mechanical coupler 144 and a power supply module 578. The core module and the MM RF units function similarly to the corresponding components of FIG. 55.

In the present embodiment, the wireless power transmitter 580, when enable by a WP TX control signal, generates a TX wireless power signal from the wireless power supply voltage (V1) or from the battery voltage. The TX wireless power signal may be used to wireless power other devices (e.g., a wireless headset, a cell phone, a digital audio/video player, etc.).

Figure 58:
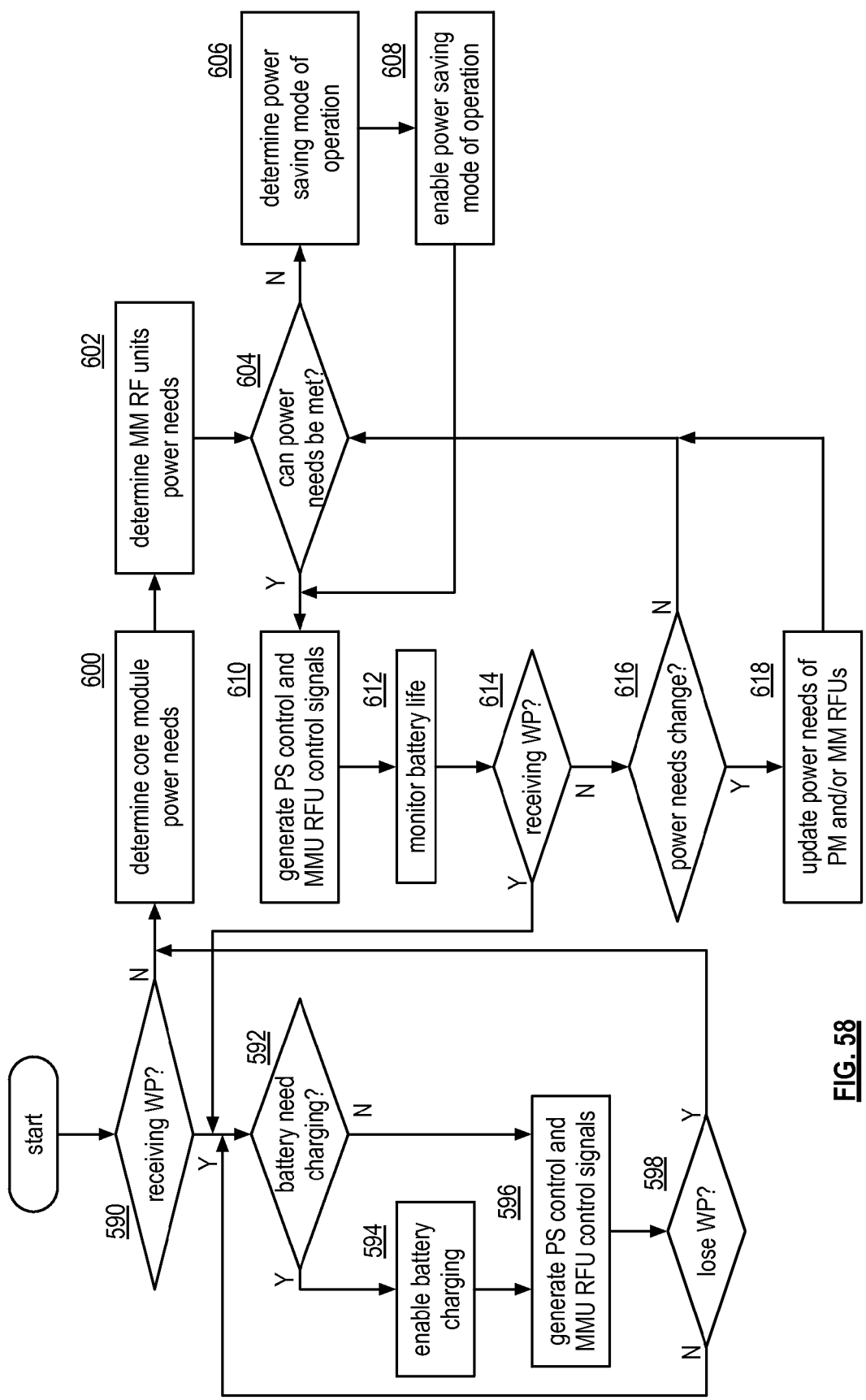
FIG. 58 is a logic diagram of an embodiment of a method of managing power within a portable computing device in accordance with the present invention.

FIG. 58 is a logic diagram of an embodiment of a method of managing power within a portable computing device of FIG. 56 and/or FIG. 57 that may be executed by the power management module. The method begins at step 590 by determining whether a wireless power signal is being received. If not, the method continues at step 600 by entering a battery mode and determining power needs of the core module. For example, the power management module determines how many functions the core module is supported and the corresponding power consumption of each of the functions. The method continues at step 602 by determining power needs for each of the multimode RF units. For example, the power management module determines how many functions each MM RF unit is supported and the corresponding power consumption of each of the functions.

The method continues at step 604 by determining whether the power needs of the core module and the multimode RF units can be met. Such a determination may be based on the available battery life, a desired length of operation, history of use of the portable computing device, etc. If the power needs cannot be met, the method continues at step 606 by determining a power saving mode of operation and enabling it. For example, a power saving mode may include reducing a supply voltage, reducing clock rate, disabling one or more multimode RF units, restrict the type of RF communications supported by the portable computing device, produced screen power, enter a sleep mode, etc.

If a power saving mode of operation is enabled at step 608 or the power needs can be met, the method continues at step 610 by generating a power supply (PS) control signal and multimode RF unit control signals. Such control signals control generation of supply voltages, generation of clock signals, enablement of circuit modules within each MM RF unit, etc. The method then continues at step 612 by monitoring the battery life.

The method continues at step 614 by determining whether a wireless power signal is now being received. If not, the method continues at step 616 by determining whether the power needs of the core module and/or of the multimode RF units need to be changed based on degradation of the battery life. If not, the method repeats as shown. If yes, the method continues at step 618 by selecting a power saving mode of operation for the core module and or for one or more of the multimode RF units. Having done that, the power needs of the core module and of the multimode RF units are updated and the method repeats as shown.

When a wireless power signal is being received, the method continues at step 592 by determining whether the battery needs charging. If yes, the method continues at step 594 by enabling a battery charger to charge the battery. The method then continues at step 596 by generating power supply control signals and multimode RF unit control signals for the core module and the multimode RF units. For example, with the presence of a wireless power signal, the power management module will generate control signals to operate the core module and the multimode RF units for maximum, or near maximum, data throughput. The method continues at step 598 by determining whether the wireless power signal is lost. If not, the method loops as shown. If yes, the method switches to the battery mode and continues as shown.

Figure 59:
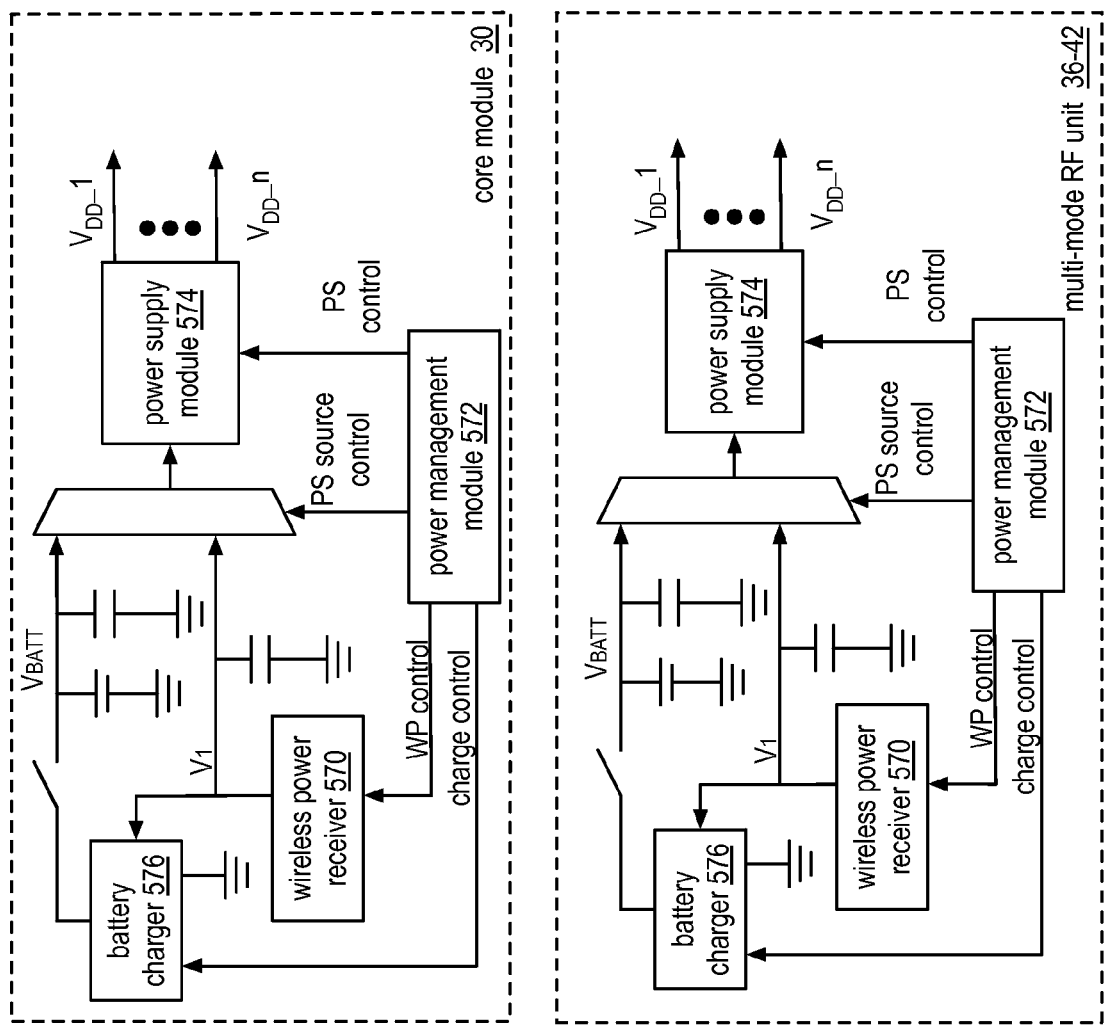
FIG. 59 is a schematic block diagram of another embodiment of power distribution within a portable computing device in accordance with the present invention.

FIG. 59 is a schematic block diagram of another embodiment of power distribution within a portable computing device that includes the core module 30 and a plurality of multi-module RF units 36-42. The core module 30 includes a power management module 572, a wireless power receiver 570, a battery, a battery charger 576, a power supply module 574, and a multiplexer. Each of the MM RF units 36-42 includes a power management module 572, a wireless power receiver 570, a battery, a battery charger 576, a power supply module 574, and a multiplexer.

In an example of operation, each of the power management modules 572 determines the power configuration for its module (e.g., core module or one of the MM RF units) depending on available power sources. For example, when the wireless power receiver 570 is receiving a wireless power signal, the power management module sets up the power configuration accordingly. In particular, it enables, via a wireless power (WP) control signal, the wireless power receiver to convert the wireless power signal into one or more supply voltages (e.g., V1). With the wireless power present, the power management module may enable the battery charger to charge the battery.

The management module 572 further enables, via a power supply (PS) control signal, the power supply module to receive the wireless power supply voltage (V1) and to convert, in accordance with a PS control signal, the power supply voltage (V1) into one or more power supply voltages (e.g., $V_{DD\_1}$ through $V_{DD\_n}$). Note that the power supply module 574 includes one or more DC-DC converters, one or more linear regulators, and/or one or more filter capacitors (e.g., filter V1 to produce a power supply voltage $V_{DD}$).

When the wireless power signal is not present, the power management module 572 enables a battery mode in which the battery sources power to the power supply module. Depending on the battery life and active functions of the corresponding module, the power management module generates the PS control signal and the PS output control. Note that, in this embodiment, the core module and each of the MM RF units individually create and manage its own power supply generation, power consumption, and wireless power generation.

Figure 60:
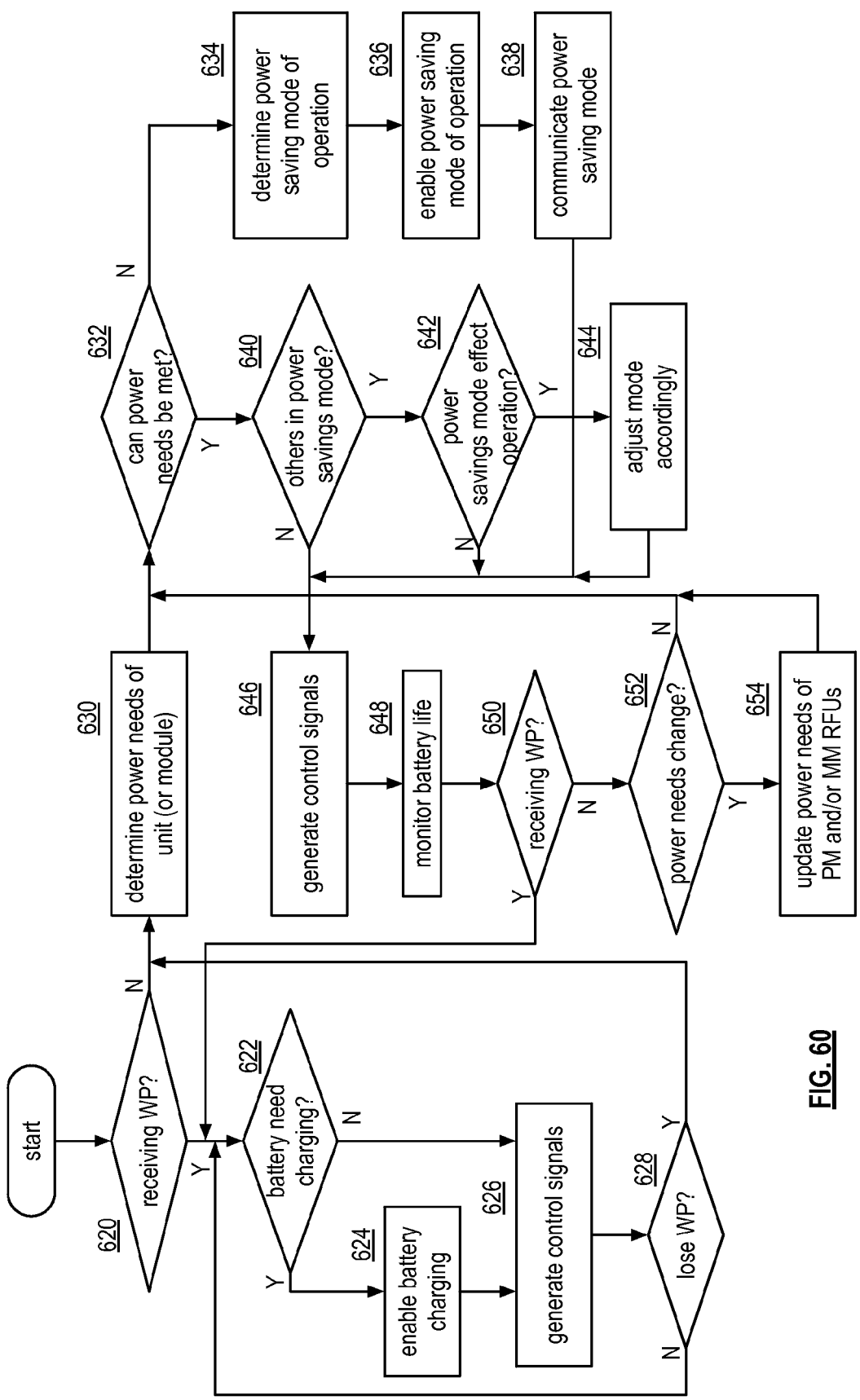
FIG. 60 is a logic diagram of an embodiment of another method of managing power within a portable computing device in accordance with the present invention.

FIG. 60 is a logic diagram of an embodiment of another method of managing power within a portable computing device of FIG. 59 that may be independently, or dependently, executed by each of the power management module. The method begins at step 620 by determining whether a wireless power signal is being received. If not, the method continues at step 630 by entering a battery mode and determining power needs of the respective module. For example, the power management module determines how many functions the module is supported and the corresponding power consumption of each of the functions.

The method continues at step 632 by determining whether the power needs of the module can be met. Such a determination may be based on the available battery life, a desired length of operation, history of use of the portable computing device, etc. If the power needs cannot be met, the method continues at step 634 by determining a power saving mode of operation, enabling it at step 636, and communicating the power savings mode to other modules at step 638. For example, a power saving mode may include reducing a supply voltage, reducing clock rate, disabling one or more multimode RF units, restrict the type of RF communications supported by the portable computing device, produced screen power, enter a sleep mode, etc.

If the power needs can be met, the method continues at step 640 by determining whether another module is in power saving mode. If yes, the method continues at step 642 by determining whether the other module's power saving mode effects operation of the present module. If yes, adjust the mode of operation accordingly at step 644. For example, if the power saving mode of the core module has disable a particular communication type, a MM RF unit may disable its corresponding circuit modules for the particular communication type.

If other modules are not in a power saving mode, if another is in a power saving mode but it does not effect operation, or if the mode of operation has been adjusted, the method continues at step 646 by generating control signals (e.g., WP control, PS control, charge, PS source control). The method then continues at step 648 by monitoring the battery life.

The method continues at step 650 by determining whether a wireless power signal is now being received. If not, the method continues at step 652 by determining whether the power needs of the core module and/or of the multimode RF units need to be changed based on degradation of the battery life. If not, the method repeats as shown. If yes, the method continues at step 654 by selecting a power saving mode of operation for the core module and or for one or more of the multimode RF units. Having done that, the power needs of the core module and of the multimode RF units are updated and the method repeats as shown.

When a wireless power signal is being received, the method continues at step 622 by determining whether the battery needs charging. If yes, the method continues at step 624 by enabling a battery charger to charge the battery. The method then continues at step 626 by generating control signals for the respective module. The method continues at step 628 by determining whether the wireless power signal is lost. If not, the method loops as shown. If yes, the method switches to the battery mode and continues as shown.

Figure 61:
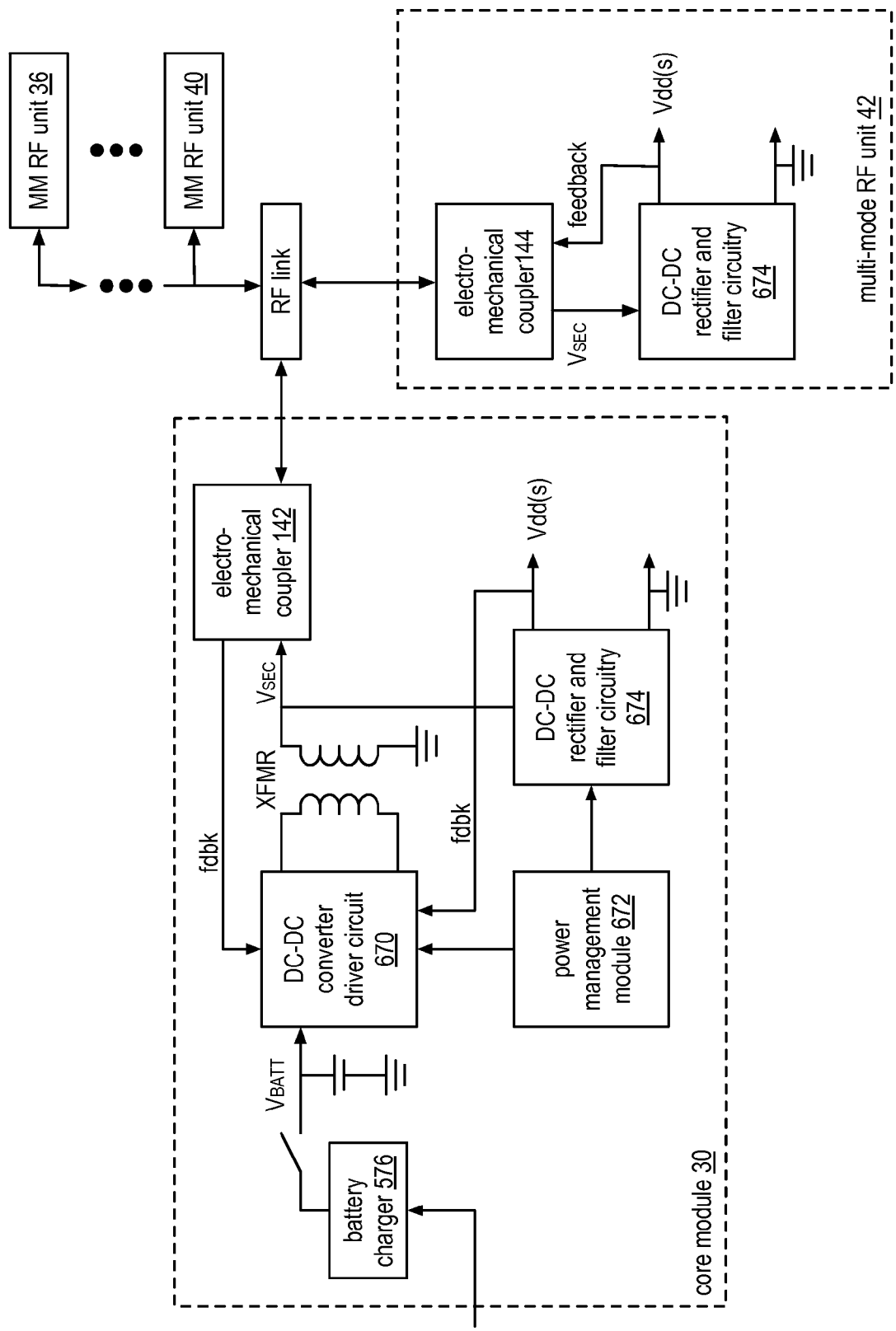
FIG. 61 is a schematic block diagram of another embodiment of power distribution within a portable computing device in accordance with the present invention.

FIG. 61 is a schematic block diagram of another embodiment of power distribution within a portable computing device that includes a core module 30 and a plurality of multi-mode RF units 36-42. The core module 30 includes a power management module 672, a battery charger 576, a battery, a DC-DC converter driver circuit 670, a transformer (XFMR), DC-DC rectifier and filter circuitry 674, and the electro-mechanical coupler 142. Each of the MM RF units 36-42 includes the electro-mechanical coupler 144 and DC-DC rectifier and filter circuitry 674.

In an example of battery mode operation, the battery provides a battery voltage ($V_{BATT}$) to the DC-DC converter driver circuit 670. When enabled by the power management module 672, the DC-DC converter driver circuit 670 provides a primary voltage to the primary winding of the transformer. The DC-DC converter drive circuitry includes a regulation circuit, one or more switching transistors, and one or more transistor driver circuits to generate the primary voltage in accordance with a feedback voltage (e.g., one or more power supply voltages of the core module and/or of one or more of the MM RF units). Note that the DC-DC converter driver circuit 670 has a switching frequency in the power conversion frequency band as shown in FIGS. 18A and 18B.

The secondary winding of the transformer produces a secondary voltage that corresponds to the primary voltage times the turns-ratio of the transformer. The DC-DC rectifier and filter circuitry 674 rectifies the secondary voltage to produce a rectified voltage. The filtering portion (e.g., an output capacitor and an inductor) filters the rectified voltage to produce one or more supply voltages ($V_{DD}$).

The secondary voltage is outputted to the MM RF units via the electro-mechanical couplers and the RF link. The DC-DC rectifier and filter circuitry 674 within an MM RF unit 36-42 generates one or more supply voltages ($V_{DD}$) from the secondary voltage. It may also provide feedback of the supply voltage(s) to the DC-DC converter driver circuitry 670 of the core module to be used as part of a feedback regulation loop. Note that the power management module sets the supply voltages for the core module, the MM RF units, selects the switching frequency of the DC-DC converter driver circuitry, and which feedback supply voltages to use in the feedback regulation loop.

Figure 62:
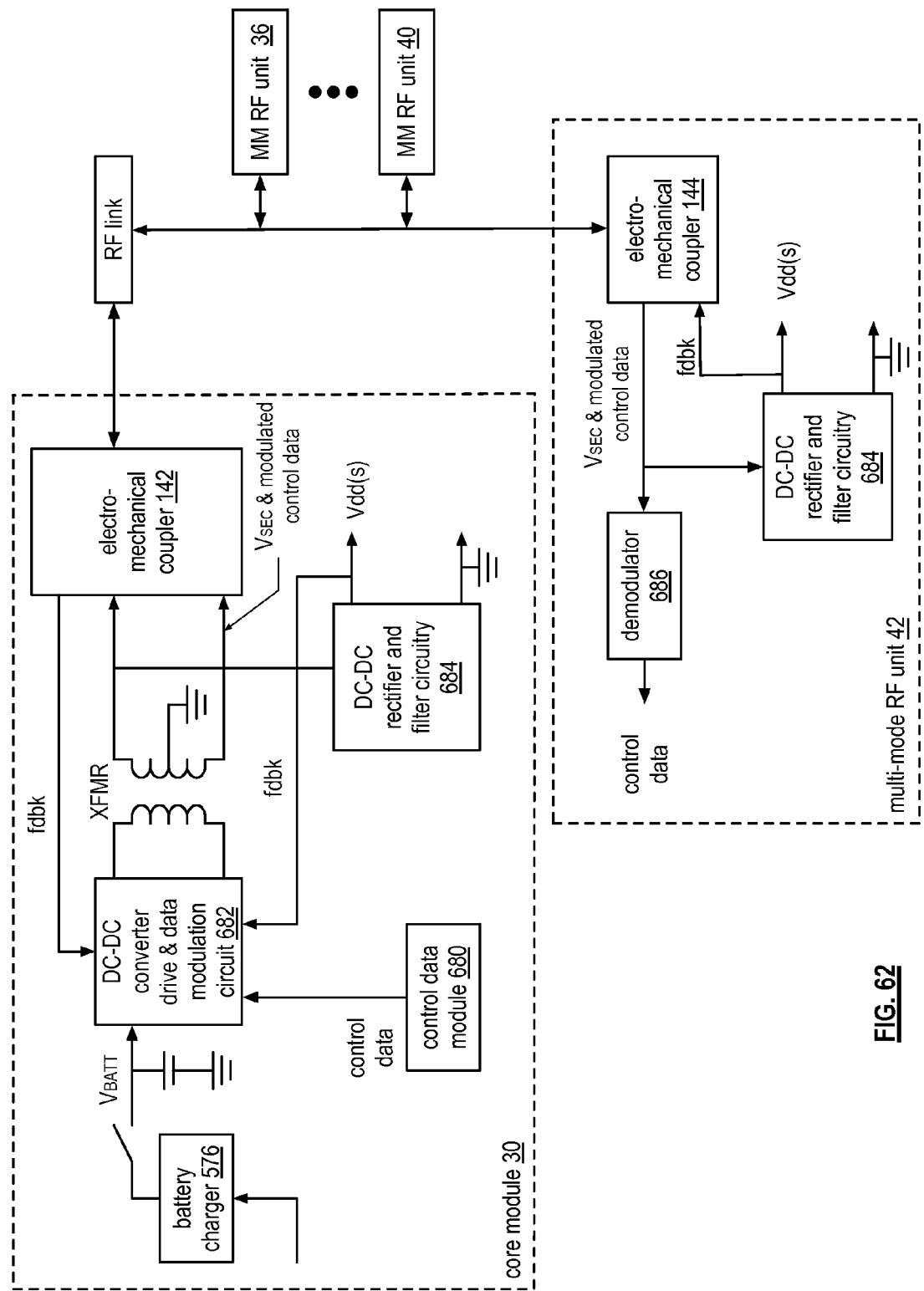
FIG. 62 is a schematic block diagram of an embodiment of power distribution and control data communication within a portable computing device in accordance with the present invention.

FIG. 62 is a schematic block diagram of an embodiment of power distribution and control data communication within a portable computing device that includes a core module 30 and a plurality of multi-mode RF units 36-42. The core module 30 includes a battery charger 576, a battery, a control data module 680, a DC-DC converter drive & data modulation circuit 682, a transformer (XFMR), DC-DC rectifier and filter circuitry 684, and the electro-mechanical coupler 142. Each of the multi-mode RF units 36-42 includes the electro-mechanical coupler 144, a demodulator 686 and DC-DC rectifier and filter circuitry 684. Note that the core module may further include a power management module, a wireless power receiver, and/or a wireless power transmitter.

In an example of operation, the control module 680 generates control data regarding operation of the portable computing device (e.g., set up information, power saving information, resource allocation, etc.). The DC-DC converter drive & data modulation circuit 682 converts a battery voltage ($V_{BATT}$) and control data into a data modulated primary voltage. The transformer converts the data modulated primary voltage into a data modulated secondary voltage. The DC-DC rectifier and filter circuitry 684 converts the data modulated secondary voltage into one or more supply voltages for the core module.

Each active multi-module RF unit 36-42 receives the data modulated secondary voltage. The DC-DC rectifier and filter circuitry 684 of an MM RF unit converts the data modulated secondary voltage into one or more power supply voltages for the MM RF unit. The demodulator 686 demodulates the data modulated secondary voltage into the control data.

Figure 63:
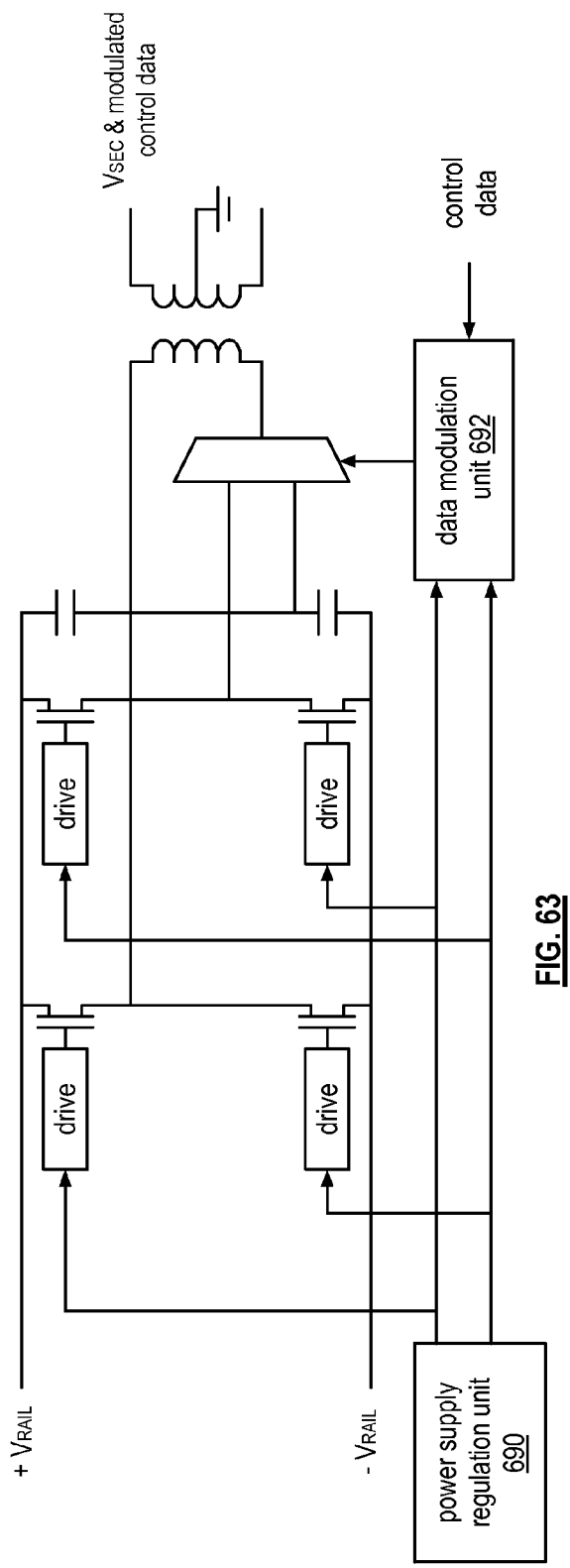
FIG. 63 is a schematic block diagram of another embodiment of power distribution and control data communication within a portable computing device in accordance with the present invention.

FIG. 63 is a schematic block diagram of an embodiment of the DC-DC converter drive & data modulation circuit of FIG. 62. The DC-DC converter drive & data modulation circuit includes a power supply regulation unit 690, a plurality of drive modules, a data modulation unit 692, a plurality of switching transistors, a pair of capacitors, and a multiplexer. The DC-DC converter drive & data modulation circuit is shown coupled to the transformer. Note that, while not shown, the DC-DC converter drive & data modulation circuit may further includes a DC-DC power supply to generate the rail voltage ($+V_{RAIL}$ and $-V_{RAIL}$) from the battery voltage. Alternatively, the rail voltage is the battery voltage.

In an example of operation, the power supply regulation unit 690 receives feedback of the power supply voltages generated for the core module and/or for one or more of the MM RF units. The power supply regulation unit generates a representation of the feedback (e.g., a divided (e.g., resistive or capacitive) version of one supply voltage, a divided version of a composite of multiple supply voltages, etc.) and compares it to a reference voltage. Based on the comparison, the power supply regulation unit generates a regulation signal (e.g., pulse width modulated signal, frequency modulated signal, etc.). The power supply regulation unit 690 then generates drive signals for a full bridge converter based on the regulation signal and provides the drive signals to the driver modules. The drive modules drive their respective switching transistors in accordance with their respective drive signals.

Figure 64:
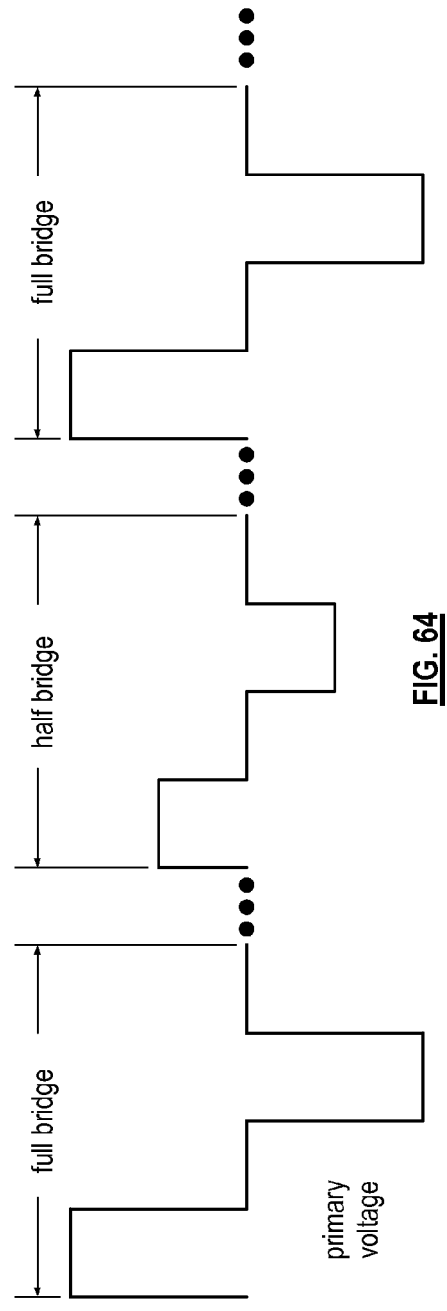
FIG. 64 is a diagram of an example of a primary winding waveform of a power distribution and control data communication within a portable computing device in accordance with the present invention.

The data modulation unit 692 receives control data and the drive signals (or the regulation signal). Based on the control data and the drive signals, the data modulation unit 690 generates a modulation control signal that it provides to the multiplexer. Based on the modulation control signal, the multiplexer switches driving the primary winding of the transformer between full bridge operation (e.g., couples the common node of the switching transistors to the primary winding) and half bridge operation (e.g., couples the common node of the capacitors to the primary winding) as shown in FIG. 64. The data modulation unit 692 generates the modulation control signal such that the switching between full bridge and half bridge operation is done when the drive signals are low (i.e., not enabling the drive modules).

Figure 65:
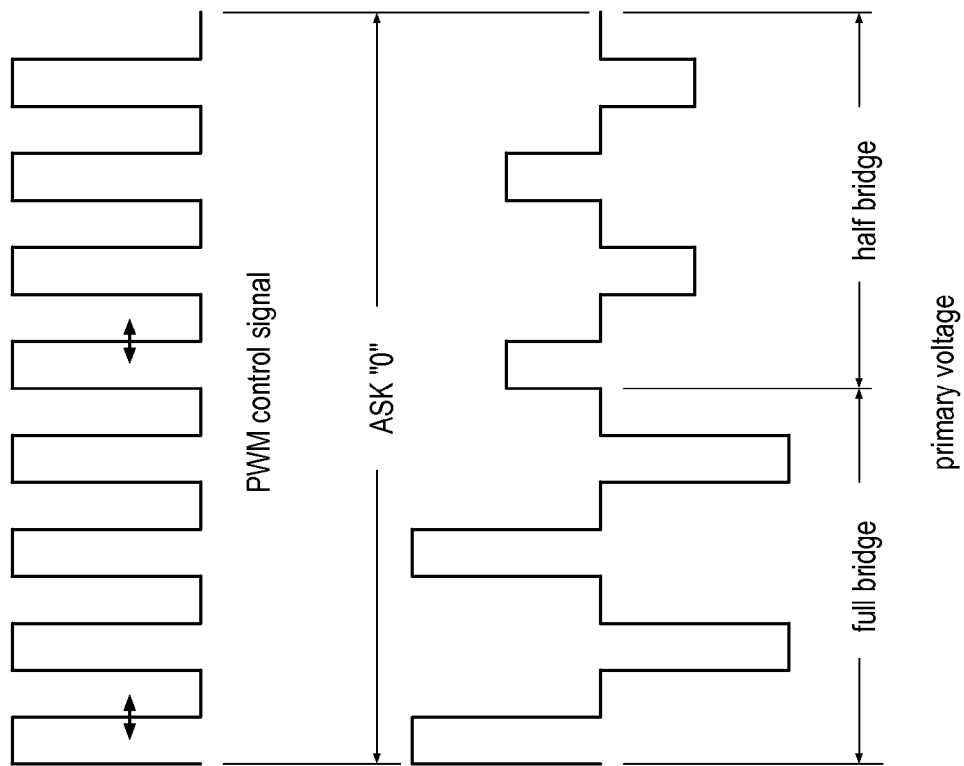
FIG. 65 is a diagram of an example of encoding a primary winding waveform with respect to a pulse width modulation control signal of a power supply within a portable computing device in accordance with the present invention.

FIG. 65 is a diagram of an example of encoding a primary winding voltage with respect to a pulse width modulation control signal by the DC-DC converter drive & data modulation circuit of FIGS. 62 and/or 63. As discussed the power supply regulation unit generates a regulation signal (e.g., a pulse width modulation (PWM) control signal) and the data module unit switches between full bridge mode and half bridge module to modulate data onto the primary winding. In this example, the power supply switching frequency is greater than the data rate. As a specific example, the power supply switching frequency may be 100 MHz and the data rate may be 12.5 Mbps (Mega bits per second). Accordingly, to encode a "0", the primary winding has two full cycles (e.g., 4 cycles of the PWM control signal) in the full bridge mode followed by two full cycles in the half bridge mode.

Figure 66:
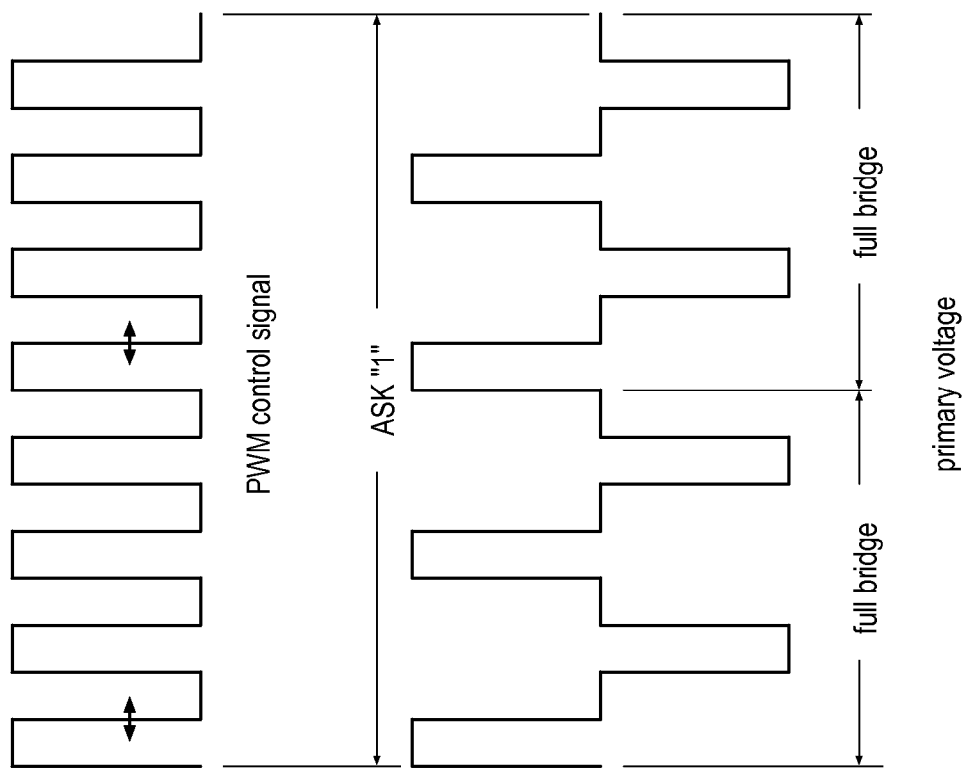
FIG. 66 is a diagram of another example of encoding a primary winding waveform with respect to a pulse width modulation control signal of a power supply within a portable computing device in accordance with the present invention.

FIG. 66 is a diagram of another example of encoding a primary winding voltage with respect to a pulse width modulation control signal by the DC-DC converter drive & data modulation circuit of FIGS. 62 and/or 63. In this example, the power supply switching frequency is greater than the data rate. As a specific example, the power supply switching frequency may be 100 MHz and the data rate may be 12.5 Mbps. Accordingly, to encode a "1", the primary winding has four full cycles (e.g., 8 cycles of the PWM control signal) in the full bridge mode an no cycles in the half bridge mode.

Figure 67:
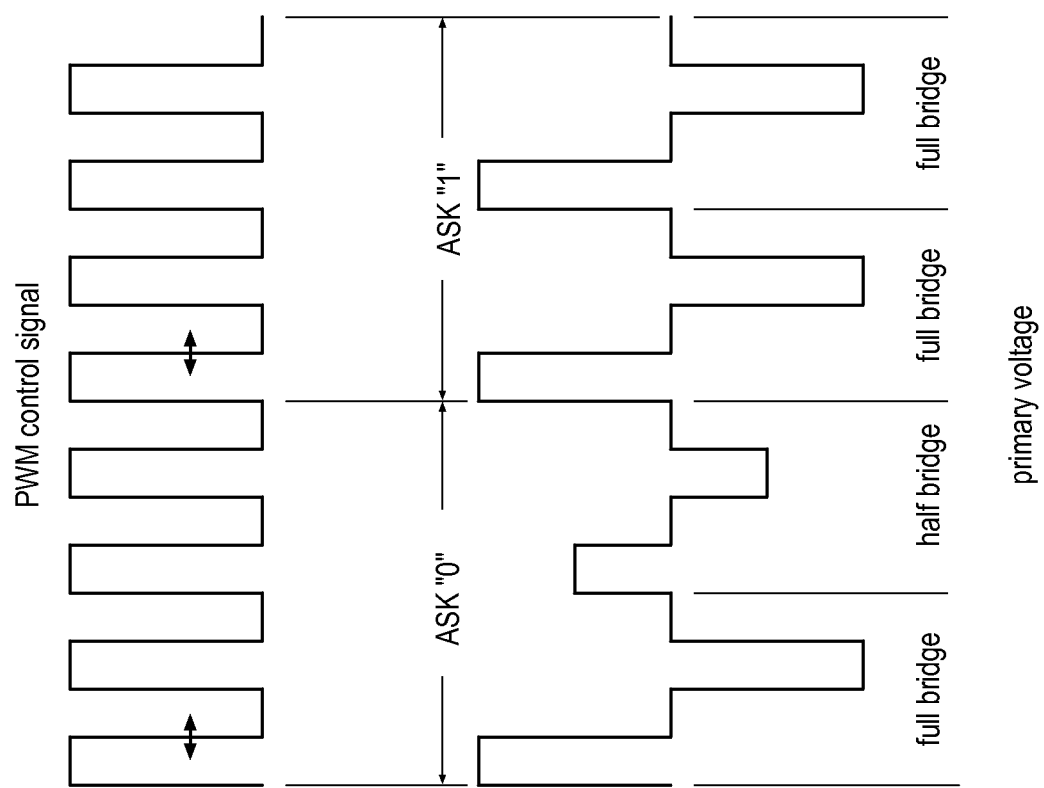
FIG. 67 is a diagram of another example of encoding a primary winding waveform with respect to a pulse width modulation control signal of a power supply within a portable computing device in accordance with the present invention.

FIG. 67 is a diagram of another example of encoding a primary winding voltage with respect to a pulse width modulation control signal by the DC-DC converter drive & data modulation circuit of FIGS. 62 and/or 63. In this example, the power supply switching frequency is greater than the data rate. As a specific example, the power supply switching frequency may be 100 MHz and the data rate may be 25 Mbps. Accordingly, to encode a "0", the primary winding has one full cycle (e.g., 2 cycles of the PWM control signal) in the full bridge mode followed by one full cycle in the half bridge mode. To encode a "1", the primary winding has two full cycles (e.g., 4 cycles of the PWM control signal) in the full bridge mode and no cycles in the half bridge mode.

Figure 68:
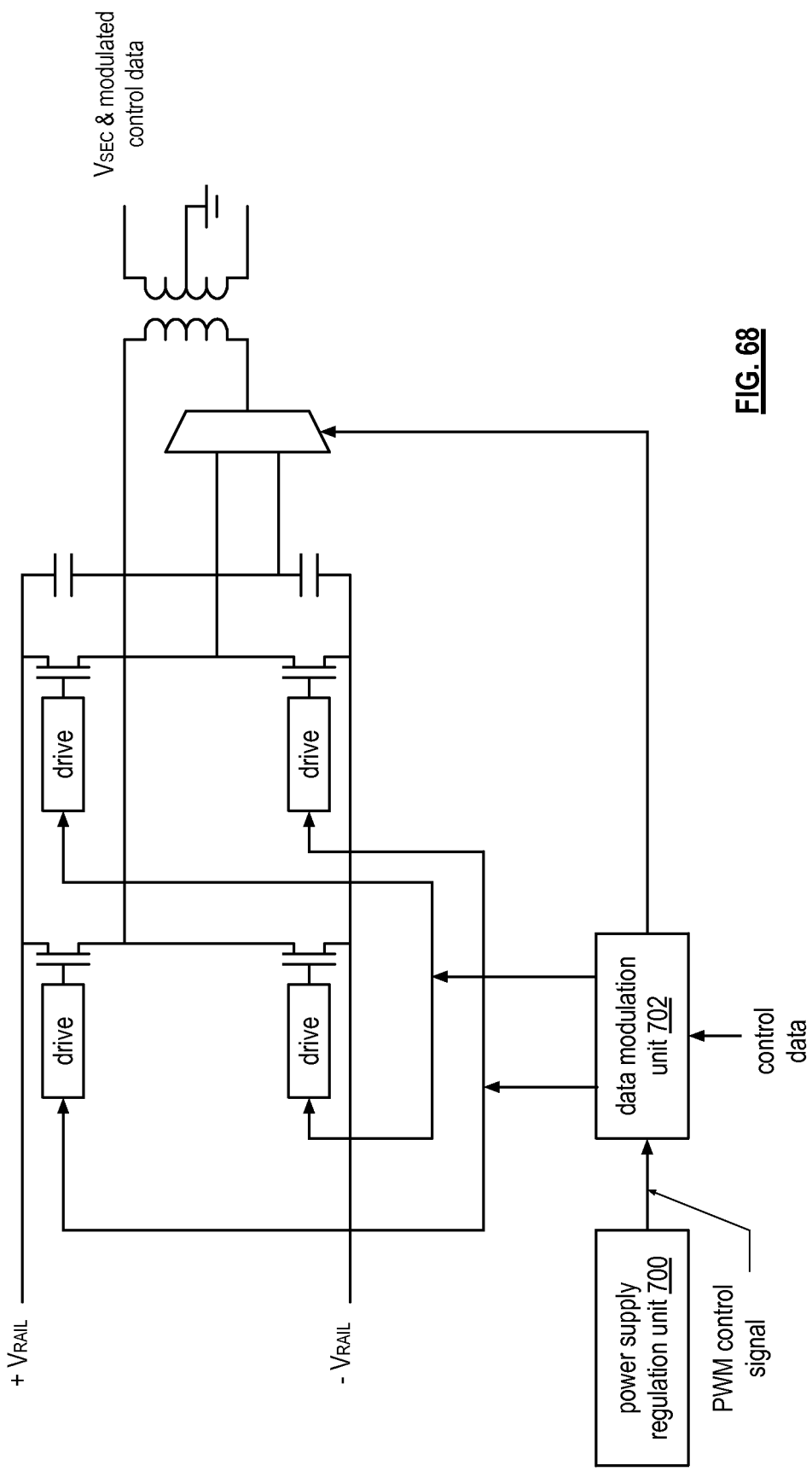
FIG. 68 is a schematic block diagram of another embodiment of power distribution and control data communication within a portable computing device in accordance with the present invention.

FIG. 68 is a schematic block diagram of another embodiment of the DC-DC converter drive & data modulation circuit of FIG. 62. The DC-DC converter drive & data modulation circuit includes a power supply regulation unit 700, a plurality of drive modules, a data modulation unit 702, a plurality of switching transistors, a pair of capacitors, and a multiplexer. The DC-DC converter drive & data modulation circuit is shown coupled to the transformer. Note that, while not shown, the DC-DC converter drive & data modulation circuit may further includes a DC-DC power supply to generate the rail voltage ($+V_{RAIL}$ and $-V_{RAIL}$) from the battery voltage. Alternatively, the rail voltage is the battery voltage.

In an example of operation, the power supply regulation unit 700 receives feedback of the power supply voltages generated for the core module and/or for one or more of the MM RF units. The power supply regulation unit 700 generates a representation of the feedback (e.g., a divided (e.g., resistive or capacitive) version of one supply voltage, a divided version of a composite of multiple supply voltages, etc.) and compares it to a reference voltage. Based on the comparison, the power supply regulation unit generates a regulation signal (e.g., pulse width modulated signal, frequency modulated signal, etc.).

The data modulation unit 702 receives the regulation signal and modulates it based on the control data to produce a modulated regulation signal. The data modulation unit 702 then generates drive signals for a full bridge converter based on the modulated regulation signal and provides the drive signals to the driver modules. The drive modules drive their respective switching transistors in accordance with their respective drive signals.

The data modulation unit 702 also generates, based on the control data and the regulation signal, a modulation control signal that it provides to the multiplexer. Based on the modulation control signal, the multiplexer switches driving the primary winding of the transformer between full bridge operation (e.g., couples the common node of the switching transistors to the primary winding) and half bridge operation (e.g., couples the common node of the capacitors to the primary winding). The data modulation unit generates the modulation control signal such that the switching between full bridge and half bridge operation is done when the drive signals are low (i.e., not enabling the drive modules).

Figure 69:
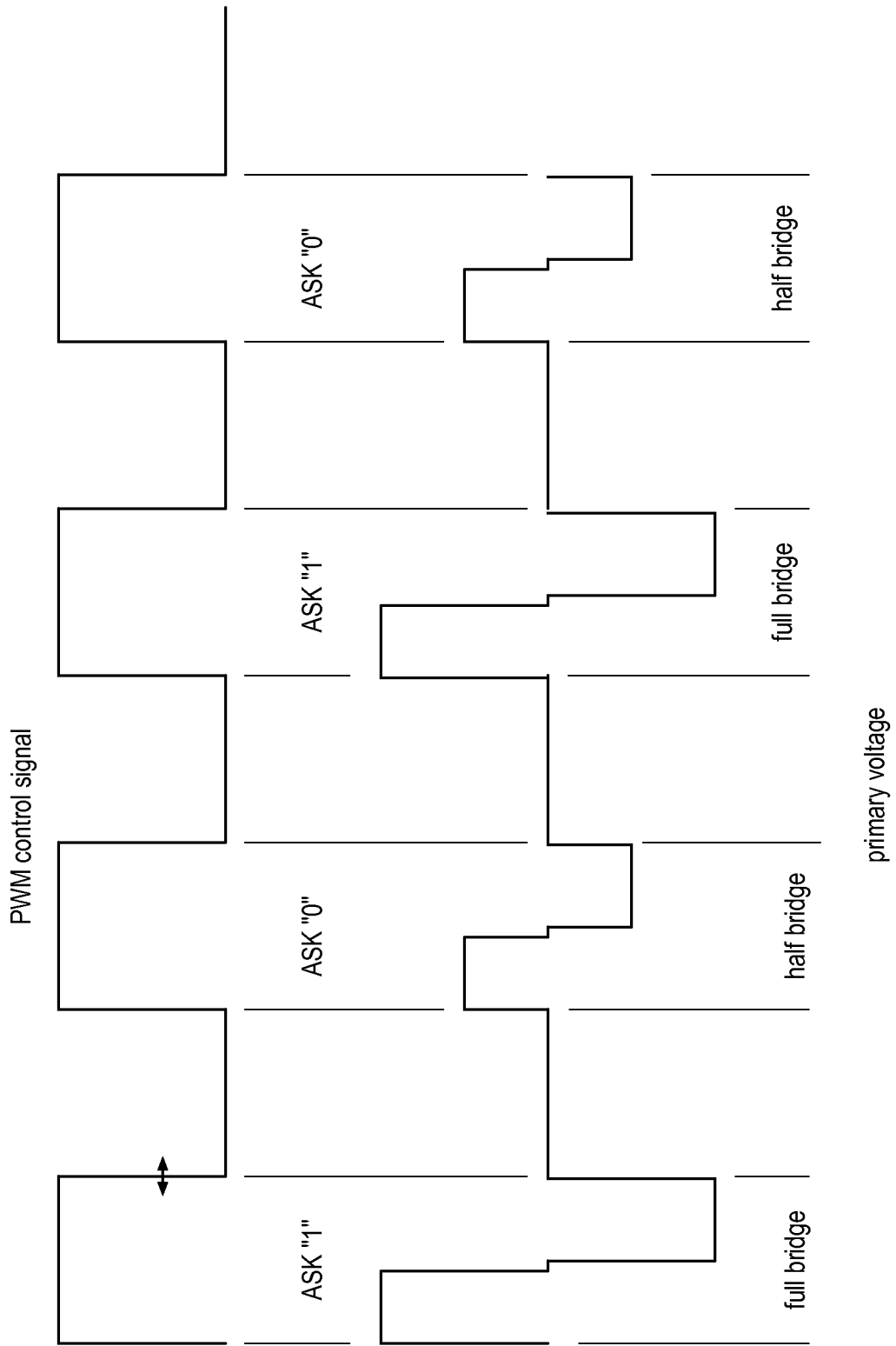
FIG. 69 is a diagram of another example of encoding a primary winding waveform with respect to a pulse width modulation control signal of a power supply within a portable computing device in accordance with the present invention.

FIG. 69 is a diagram of another example of encoding a primary winding voltage with respect to a pulse width modulation control signal by the DC-DC converter drive & data modulation circuit of FIGS. 62 and/or 68. As discussed the power supply regulation unit generates a regulation signal (e.g., a pulse width modulation (PWM) control signal) and the data module unit modulates the drive signals and switches between full bridge mode and half bridge module to modulate data onto the primary winding. In this example, the power supply switching frequency equals the data rate. As a specific example, the power supply switching frequency may be 100 MHz and the data rate is 100 Mbps (Mega bits per second). Accordingly, to encode a "1", the primary winding has one complete full bridge cycle during the active portion of one cycle of the PWM control signal and to encode a "0", the primary winding has one complete half bridge cycle during the active portion of one cycle of the PWM control signal.

Figure 70:
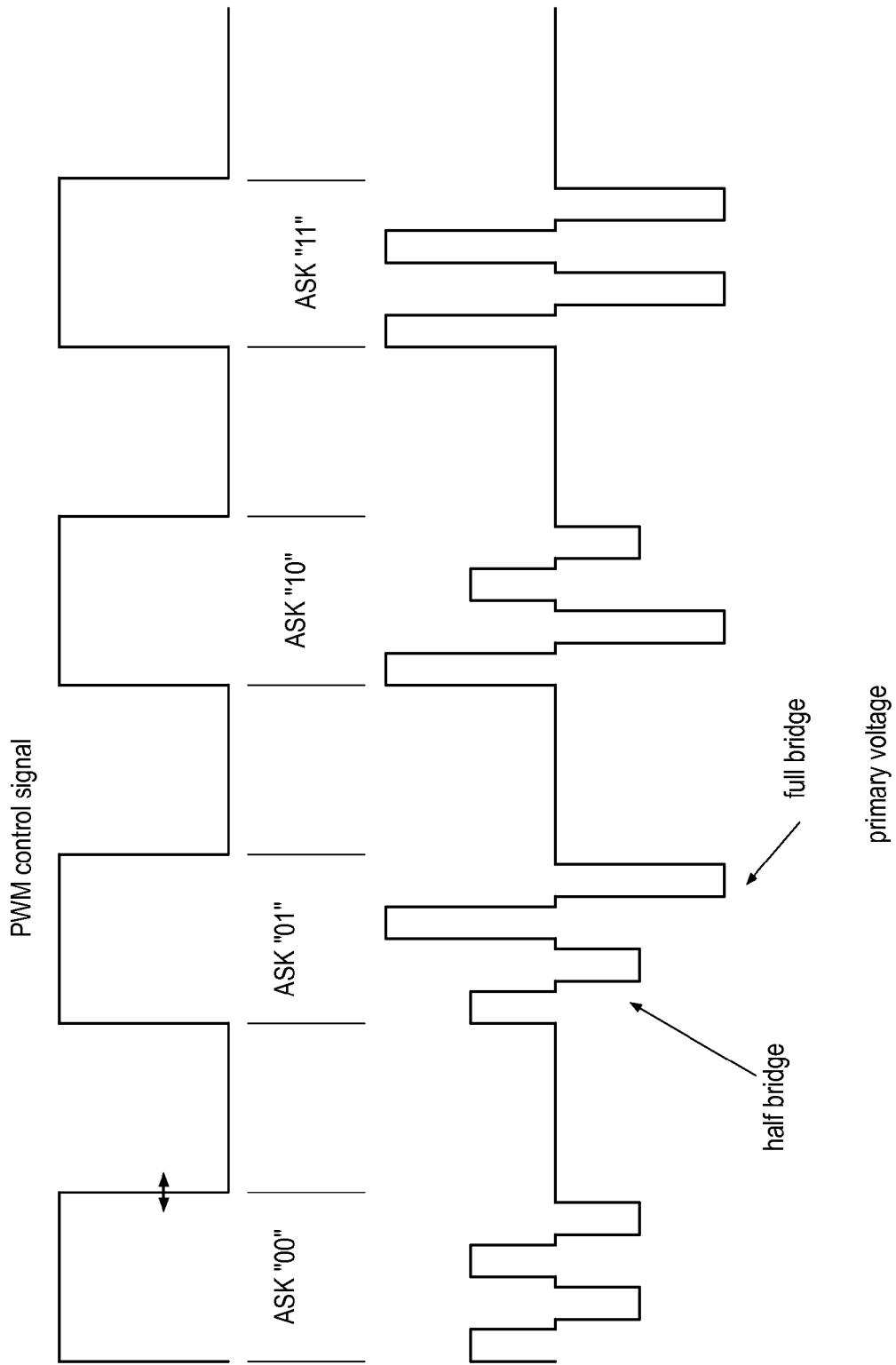
FIG. 70 is a diagram of another example of encoding a primary winding waveform with respect to a pulse width modulation control signal of a power supply within a portable computing device in accordance with the present invention.

FIG. 70 is a diagram of another example of encoding a primary winding voltage with respect to a pulse width modulation control signal by the DC-DC converter drive & data modulation circuit of FIGS. 62 and/or 68. As discussed the power supply regulation unit generates a regulation signal (e.g., a pulse width modulation (PWM) control signal) and the data module unit modulates the drive signals and switches between full bridge mode and half bridge module to modulate data onto the primary winding. In this example, the power supply switching frequency is less than the data rate. As a specific example, the power supply switching frequency may be 100 MHz and the data rate is 200 Mbps (Mega bits per second). Accordingly, to encode a "00", the primary winding has two complete half bridge cycles during the active portion of one cycle of the PWM control signal; to encode a "01", the primary winding has one complete half bridge cycle and one complete full bridge cycle during the active portion of one cycle of the PWM control signal; to encode a "10", the primary winding has one complete full bridge cycle and one complete half bridge cycle during the active portion of one cycle of the PWM control signal; and to encode a "11", the primary winding has two complete full bridge cycles during the active portion of one cycle of the PWM control signal.

Figure 71:
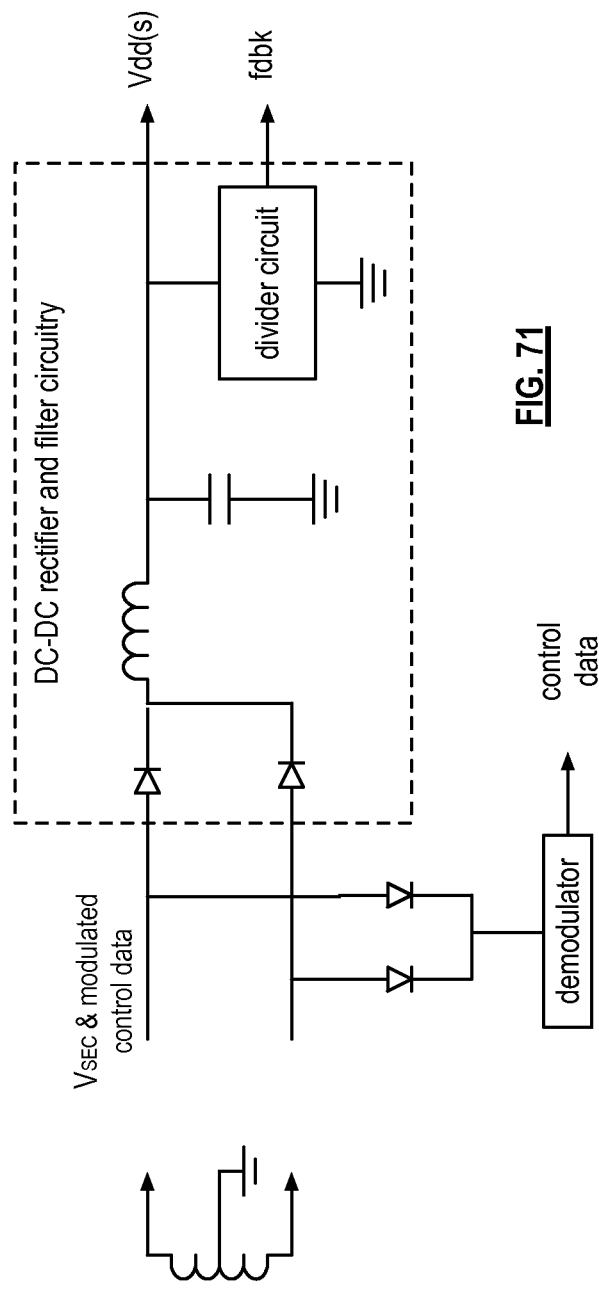
FIG. 71 is a schematic block diagram of another embodiment of power distribution and control data communication within a MM RF unit in accordance with the present invention.

FIG. 71 is a schematic block diagram of an embodiment of the DC-DC rectifier and filter circuitry and demodulator of an MM RF unit of FIG. 62. The DC-DC rectifier & filter circuitry includes rectifying diodes, an inductor, a capacitor, and a divider circuit. The demodulator is coupled to the secondary winding via a pair of diodes.

Figure 72:
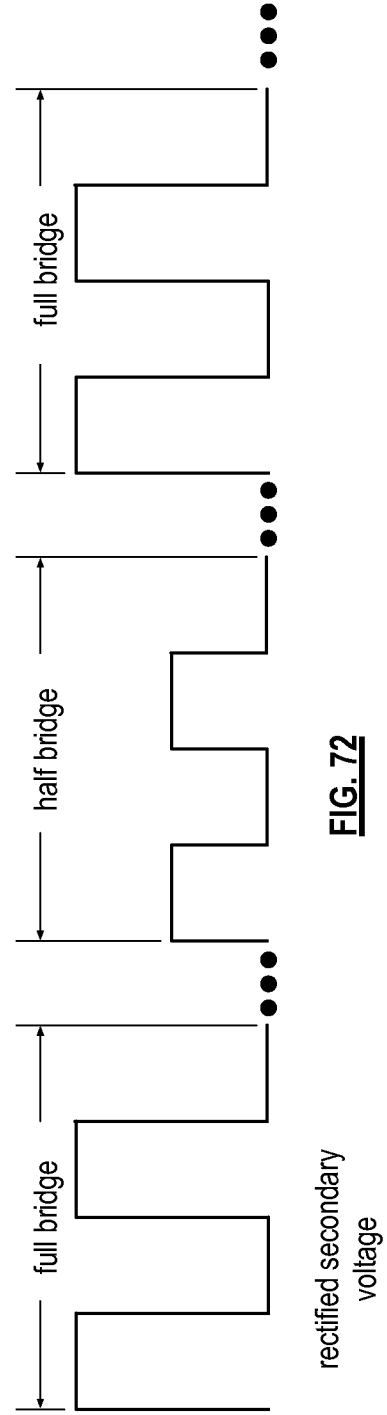
FIG. 72 is a diagram of an example of a rectified secondary winding waveform of a power distribution and control data communication within a portable computing device in accordance with the present invention.

In an example of operation, the rectifying diodes of the DC-DC rectifier & filter circuitry rectify the modulated secondary voltage as shown in FIG. 72. The inductor and a capacitor filter the rectified modulated secondary voltage to produce a supply voltage ($V_{DD}$). Note that the toggling between full bridge and half bridge operation will cause a ripple voltage in the supply voltage. The inductor and capacitor are sized to yield an acceptable level of ripple voltage.

The demodulator receives a rectified modulated secondary voltage via the diodes. The demodulator interprets the rectified modulated secondary voltage to recapture the control data.

FIG. 73 is a diagram of an example of decoding a rectified modulated secondary voltage that corresponds to the modulated primary voltage of FIG. 65. In this example, the power supply switching frequency is greater than the data rate. As a specific example, the power supply switching frequency may be 100 MHz and the data rate may be 12.5 Mbps (Mega bits per second). Accordingly, the secondary winding has two full cycles (e.g., 4 cycles of the PWM control signal) in the full bridge mode followed by two full cycles in the half bridge mode, which is decoded into a "0".

FIG. 74 is a diagram of an example of decoding a rectified modulated secondary voltage that corresponds the modulated primary voltage of FIG. 66. In this example, the power supply switching frequency is greater than the data rate. As a specific example, the power supply switching frequency may be 100 MHz and the data rate may be 12.5 Mbps (Mega bits per second). Accordingly, the secondary winding has four full cycles (e.g., 8 cycles of the PWM control signal) in the full bridge mode and no cycles in the half bridge mode, which is decoded into a "1".

FIG. 75 is a diagram of another example of decoding a rectified modulated secondary voltage that corresponds the modulated primary voltage of FIG. 67. In this example, the power supply switching frequency is greater than the data rate. As a specific example, the power supply switching frequency may be 100 MHz and the data rate may be 25 Mbps (Mega bits per second). Accordingly, the secondary winding has one full cycle (e.g., 2 cycles of the PWM control signal) in the full bridge mode followed by one full cycle in the half bridge mode, which is decoded into a "0". Further, the secondary winding has two full cycles (e.g., 4 cycles of the PWM control signal) in the full bridge mode and no cycles in the half bridge mode, which is decoded into a "1".

Figure 76:
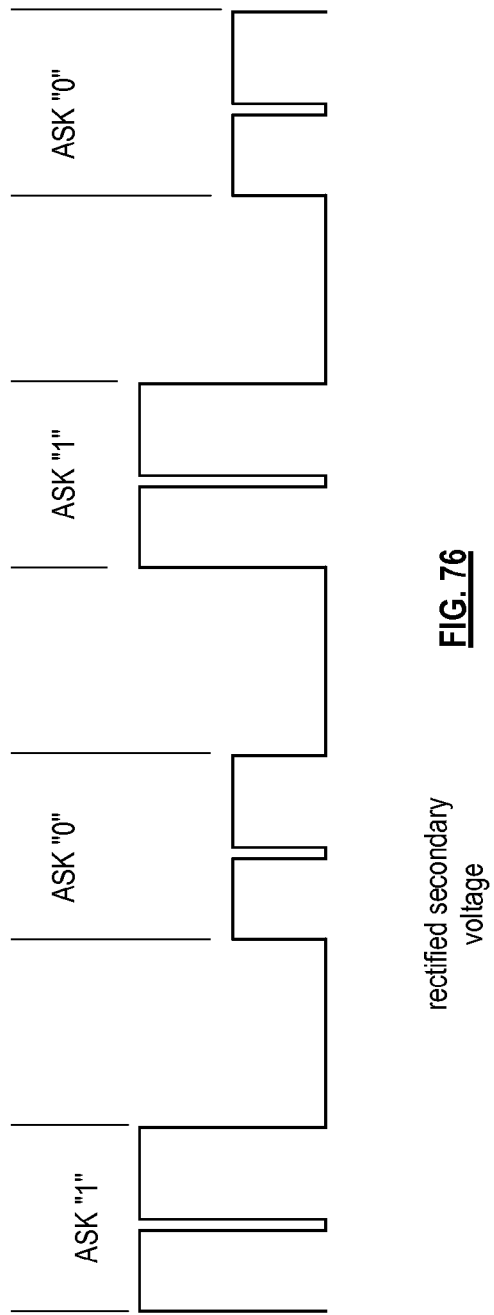
FIG. 76 is a diagram of another example of decoding a rectified secondary winding waveform within an MM RF unit in accordance with the present invention.

FIG. 76 is a diagram of another example of decoding a rectified modulated secondary voltage that corresponds the modulated primary voltage of FIG. 69. In this example, the power supply switching frequency is equal to the data rate. As a specific example, the power supply switching frequency may be 100 MHz and the data rate may be 100 Mbps (Mega bits per second). Accordingly, the secondary winding has one full cycle in the full bridge mode during an active portion of one cycle of the PWM control signal, which is decoded into a "1". Further, the secondary winding has one full cycle in the half bridge mode during an active portion of one cycle of the PWM control signal, which is decoded into a "0".

Figure 77:
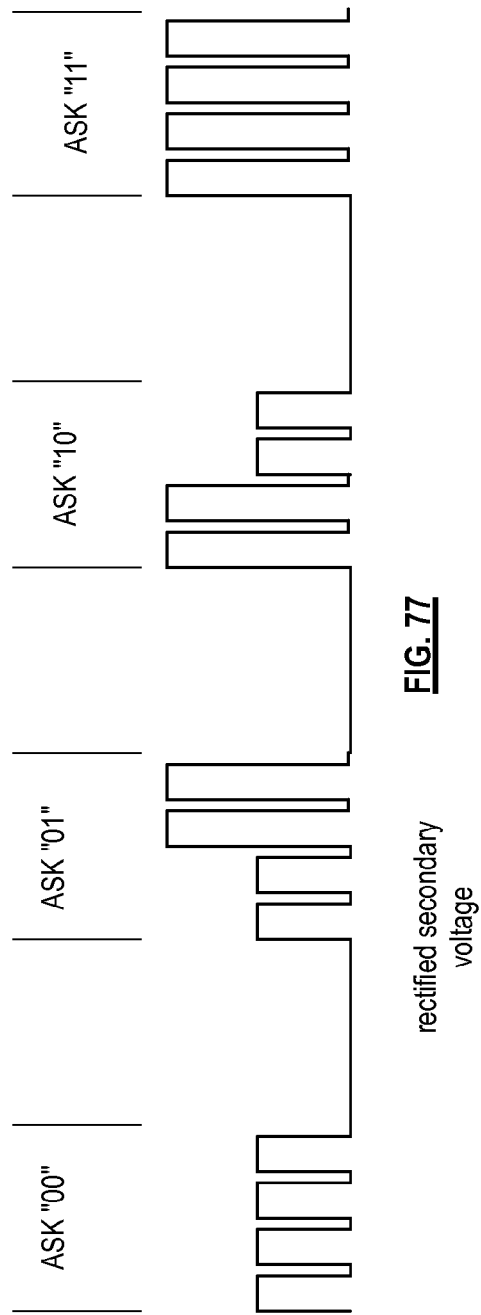
FIG. 77 is a diagram of another example of decoding a rectified secondary winding waveform within an MM RF unit in accordance with the present invention.

FIG. 77 is a diagram of another example of decoding a rectified modulated secondary voltage that corresponds the modulated primary voltage of FIG. 70. In this example, the power supply switching frequency is less than the data rate. As a specific example, the power supply switching frequency may be 100 MHz and the data rate is 200 Mbps (Mega bits per second). Accordingly, the second winding has two complete half bridge cycles during the active portion of one cycle of the PWM control signal, which is decoded as a "00"; the second winding has one complete half bridge cycle and one complete full bridge cycle during the active portion of one cycle of the PWM control signal, which is decoded a "01"; the second winding has one complete full bridge cycle and one complete half bridge cycle during the active portion of one cycle of the PWM control signal, which is decoded as a "10"; and the second winding has two complete full bridge cycles during the active portion of one cycle of the PWM control signal, which is decoded as a "11".

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A core module for a portable computing device, the core module comprises:
    wireless power receiver circuitry, when operable:
    receives a wireless power transmit signal; and
    converts the wireless power transmit signal into a supply voltage;
    battery power circuitry, when operable, outputs a battery voltage;
    power supply circuitry, when operable, converts the supply voltage or the battery voltage into one or more power supply voltages;
    a processor; and
    a radio frequency (RF) link interface operably coupled to the processor, wherein:
    the processor selects one of the battery voltage, the supply voltage, and one of the one or more power supply voltages to produce a selected voltage; and
    the RF link interface outputs the selected voltage onto an RF link of the portable computing device for providing power to one or more multi mode (MM) RF units within the portable computing device; and when an application selected for execution includes a wireless communication, the processor is operable to:
  determine a protocol for the wireless communication;
  allocate RF link communication resources of the RF link based on the protocol to produce allocated RF link communication resources;
  allocate the one or more multi mode (MM) RF units based on the protocol to produce allocated MM RF unit resources;
  when the processor executes the application:
    the processor is further operable to convert outbound data into an outbound symbol stream that addresses the allocated MM RF unit resources; and
    the RF link interface is operable to convert the outbound symbol stream into an outbound RF link signal in accordance with the allocated RF link communication resources.

2. The core module of claim 1, wherein the battery power circuitry comprises: a battery, when coupled, operable to output the battery voltage; and a battery charger, when operable, charges the battery.

3. The core module of claim 1, wherein the processor is further operable to: generate a control signal regarding power supply voltage generation for at least one of the one or more MM RF units; and send, via the RF link interface, the control signal to the at least one of the one or more MM RF units.

4. The core module of claim 1 further comprises:
  a wireless power transceiver operable to convert the supply voltage or the battery voltage into a second wireless power transmit signal.

5. The core module of claim 1, wherein the processor is further operable to:
  determine whether the wireless power transmit signal is present;
  when the wireless power transmit signal is present:
    enable the wireless power receiver circuitry to convert the wireless power transmit signal into the supply voltage;
    determine whether a battery of the battery power circuitry needs charging; and when the battery needs charging, enable a battery charge of the battery power circuitry.

6. The core module of claim 5 further comprises:
  when the wireless power transmit signal is not present:
    determine power needs of the core module;
    determine power needs of the one or more MM RF units;
    determine whether the battery can meet the power needs of the core module and of the one or more MM RF units;
    when the battery cannot meet the power needs of the core module and of the one or more MM RF units, determine a power saving mode of operation for at least one of the core module and the one or more MM RF units; and
    enable the power savings mode of operation.

7. A core module for a portable computing device, the core module comprises:
  wireless power receiver circuitry operable to:
    receives a wireless power transmit signal; and
    converts the wireless power transmit signal into a supply voltage;
  battery power circuitry operable to output a battery voltage;
  power supply circuitry, when operable, converts the supply voltage or the battery voltage into one or more power supply voltages;
  a processor; and
  a radio frequency (RF) link interface operably coupled to the processor, wherein:
    the processor selects one of the battery voltage, the supply voltage, and at least one of the power supply voltages to produce a selected voltage based on a power supply output control signal; and
    the RF link interface outputs the selected voltage onto an RF link of the portable computing device for providing power to at least one multi mode (MM) RF unit within the portable computing device; and when an application selected for execution includes a wireless communication, the
  processor is operable to:
    determine a protocol for the wireless communication;
    allocate RF link communication resources of the RF link based on the protocol to produce allocated RF link communication resources;
    allocate the at least one MM RF unit based on the protocol to produce allocated MM RF unit resources;
    when the processor executes the application:
      the processor is further operable to convert outbound data into an outbound symbol stream that addresses the allocated MM RF unit resources; and
      the RF link interface is operable to convert the outbound symbol stream into an outbound RF link signal in accordance with the allocated RF link communication resources.

8. The core module of claim 7, wherein the battery power circuitry comprises:
  a battery, when coupled, operable to output the battery voltage; and
  a battery charger, when operable, charges the battery.

9. The core module of claim 7, wherein the processor is further operable to:
  generate a control signal regarding power supply voltage generation for at least one of the one or more MM RF units; and
  send, via the RF link interface, the control signal to the at least one of the one or more MM RF units.

10. The core module of claim 7 further comprises:
  a wireless power transceiver operable to convert the supply voltage or the battery voltage into a second wireless power transmit signal.

11. The core module of claim 7, wherein the processor is further operable to:
  determine whether the wireless power transmit signal is present;
  when the wireless power transmit signal is present:
    enable the wireless power receiver circuitry to convert the wireless power transmit signal into the supply voltage;
    determine whether a battery of the battery power circuitry needs charging; and when the battery needs charging, enable a battery charge of the battery power circuitry.

12. The core module of claim 11 further comprises:
  when the wireless power transmit signal is not present:
    determine power needs of the core module;
    determine power needs of the one or more MM RF units;
    determine whether the battery can meet the power needs of the core module and of the one or more MM RF units;

when the battery cannot meet the power needs of the core module and of the one or more MM RF units, determine a power saving mode of operation for at least one of the core module and the one or more MM RF units; and enable the power savings mode of operation.

13. The core module of claim 7, wherein the wireless power receiver circuitry being tuned to a wireless power tone, the wireless power receiver circuitry converts the wireless power tone into the supply voltage.

14. The core module of claim 7, wherein the power supply circuitry comprises at least one of a:
capacitor;
a series of capacitors;
a DC-DC converter; and
a linear regulator.

15. A core module for a portable computing device comprising:
wireless power receiver circuitry operable to receive and convert a wireless power transmit signal into a supply voltage;
battery power circuitry operable to output a battery voltage;
power supply circuitry operable to convert either of the supply voltage and the battery voltage into a plurality of power supply voltages;
a processor operable to select one of the battery voltage, the supply voltage, and one of the plurality of power supply voltages to produce a selected voltage; and
a radio frequency (RF) link interface coupled to the processor, wherein the RF link interface outputs the selected voltage onto an RF link for providing power to at least one multi mode (MM) RF units;
the processor further operable, when an application selected for execution includes a wireless communication, to:
determine a protocol for the wireless communication;
allocate RF link communication resources of the RF link based on the protocol to produce allocated RF link communication resources;
allocate the one or more multi mode (MM) RF units based on the protocol to produce allocated MM RF unit resources;
when the processor executes the application:
the processor is further operable to convert outbound data into an outbound symbol stream that addresses the allocated MM RF unit resources; and
the RF link interface is operable to convert the outbound symbol stream into an outbound RF link signal in accordance with the allocated RF link communication resources.

16. The core module of claim 15 further comprises:
the battery power circuitry includes:
an external battery coupler operable to output the battery voltage; and
a battery charger, when operable, charges a battery via the external battery coupler.

17. The core module of claim 15, wherein the processor is further operable to:
generate a control signal regarding power supply voltage generation for at least one of the one or more MM RF units; and
send, via the RF link interface, the control signal to the at least one of the one or more MM RF units.

18. The core module of claim 15 further comprises:
a wireless power transmitter operable to convert the supply voltage and/or the battery voltage into a wireless power transmit signal.

19. The core module of claim 1, wherein the power supply circuitry comprises at least one of a:
capacitor;
a series of capacitors;
a DC-DC converter; and
a linear regulator.

20. The core module of claim 7, wherein the protocol for the wireless communication comprises at least one of a:
BLUETOOTH protocol;
IEEE 802.11 protocol;
cellular data protocol; and
cellular voice protocol.

* * * * *